United States Patent [19]
Yokota et al.

[11] Patent Number: 5,905,530
[45] Date of Patent: May 18, 1999

[54] IMAGE PICKUP APPARATUS

[75] Inventors: Hideo Yokota; Hiroyuki Hamano; Masaharu Suzuki; Yasuhiro Tamekuni; Takashi Kato, all of Kanagawa-ken; Katsumi Azusawa, Saitama-ken; Hidekage Sato, Kanagawa-ken, all of Japan

[73] Assignee: Canon Kabushiki Kaisha, Tokyo, Japan

[21] Appl. No.: 08/598,140

[22] Filed: Feb. 7, 1996

Related U.S. Application Data

[63] Continuation of application No. 08/103,091, Aug. 6, 1993, abandoned.

[30] Foreign Application Priority Data

| Aug. 24, 1992 | [JP] | Japan | 4-223994 |
| Nov. 18, 1992 | [JP] | Japan | 4-331204 |
| Nov. 18, 1992 | [JP] | Japan | 4-331205 |
| Dec. 11, 1992 | [JP] | Japan | 4-352358 |
| Dec. 11, 1992 | [JP] | Japan | 4-352359 |

[51] Int. Cl.$^6$ .......................... H04N 5/262; H04N 5/217; H04N 5/232

[52] U.S. Cl. .......................... 348/240; 348/241; 348/347; 348/358; 348/369; 396/76; 396/87

[58] Field of Search .................................... 348/207, 345, 348/347, 333, 240, 241, 151, 169, 187, 231, 360, 578, 222, 224, 228, 358, 369; 354/400, 402; 369/680, 708; 358/906, 909.1; 396/72, 76, 77, 79, 80, 82, 85, 87; H04N 5/225, 5/232, 5/335, 5/262, 5/217

[56] References Cited

U.S. PATENT DOCUMENTS

| 4,352,541 | 10/1982 | Minoura et al. | 359/206 |
| 4,589,029 | 5/1986 | Torimaru et al. | 348/333 |
| 4,695,133 | 9/1987 | Kitagishi et al. | 359/685 |
| 4,711,534 | 12/1987 | Matsushita et al. | 359/680 |
| 4,827,333 | 5/1989 | Iwabe | 348/263 |
| 4,843,475 | 6/1989 | Imai | 348/358 |
| 4,963,962 | 10/1990 | Kruegle et al. | 348/151 |
| 5,005,957 | 4/1991 | Kanamori et al. | 359/708 |
| 5,153,730 | 10/1992 | Nagasaki et al. | 348/231 |
| 5,161,025 | 11/1992 | Nakao | 348/333 |
| 5,172,234 | 12/1992 | Arita et al. | 348/240 |
| 5,196,880 | 3/1993 | Ishibashi et al. | 354/400 |
| 5,239,332 | 8/1993 | Muramatsu et al. | 354/402 |
| 5,241,372 | 8/1993 | Ohba | 348/578 |

FOREIGN PATENT DOCUMENTS

| 59-204817 | 11/1984 | Japan . | |
| 1238283 | 9/1989 | Japan | H04N 5/225 |
| 2252375 | 10/1990 | Japan . | |
| 4316286 | 6/1992 | Japan | H04N 5/232 |

OTHER PUBLICATIONS

Rebiai et al. Image Distortion from Zoom Lenses: Modeling and Digital Correction, Jul. 3–7, 1992, IBC Conf. Publ. No. 358 PTO 93–2414 Translation of JPI–238283.

*Primary Examiner*—Wendy Garber
*Assistant Examiner*—Ngoc-Yen Vu
*Attorney, Agent, or Firm*—Fitzpatrick, Cella, Harper & Scinto

[57] ABSTRACT

An image pickup apparatus is disclosed which is provided with a distortional-aberration memorizing element for memorizing distortional-aberration information about an objective lens, a state-of-objective-lens detecting circuit for detecting a state of the objective lens, an image correcting circuit for reading out distortional-aberration information about distortional aberration occurring during photography from the distortional-aberration memorizing element on the basis of information supplied from the state-of-objective-lens detecting circuit, and electrically correcting a distortion of an image due to the objective lens with a predetermined image height in a photographed image selected as a datum.

1 Claim, 48 Drawing Sheets

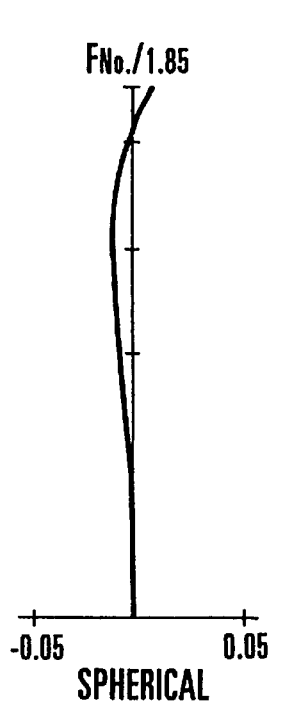
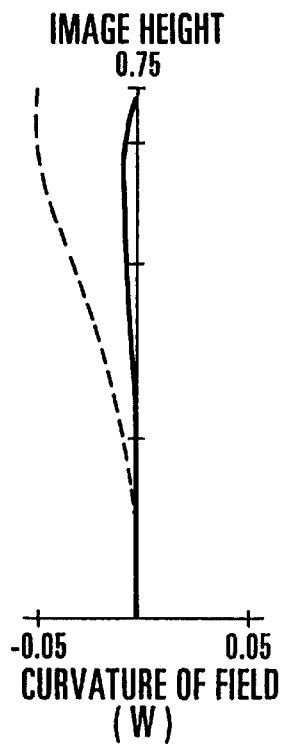
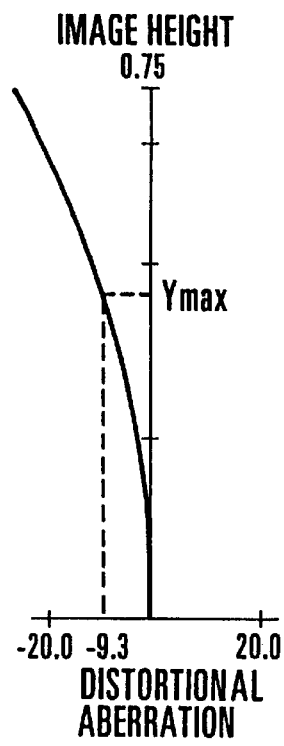
F I G.13(a)   F I G.13(b)   F I G.13(c)
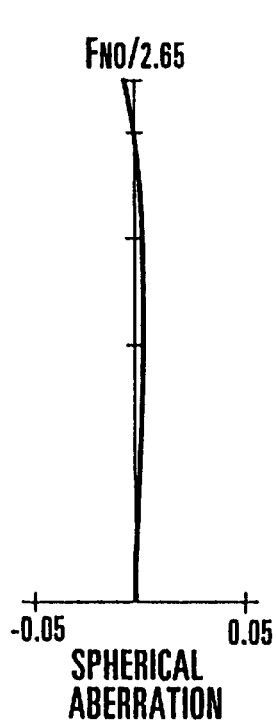
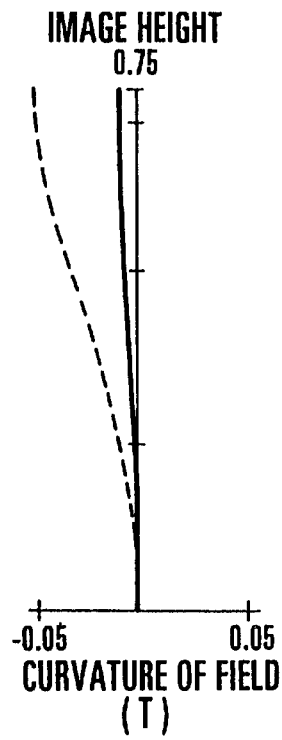
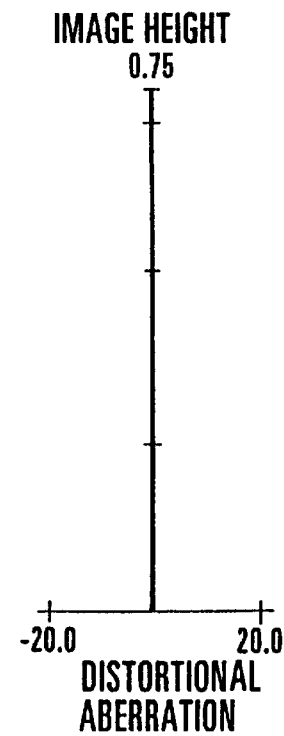
F I G.14(a)   F I G.14(b)   F I G.14(c)

FIG.15(a)

< NUMERICAL EXAMPLE >

F=1~5.66    FNO=1:1.85~2.65    IMAGE HEIGHT 0.75

| | | |
|---|---|---|
| r 1 = 99.5653 | d 1 = 0.4977 | n 1 = 1.60311 | ν 1 = 60.7 |
| r 2 = 5.7183 | d 2 = 1.9912 | | |
| r 3 = 9.6933 | d 3 = 0.2986 | n 2 = 1.80518 | ν 2 = 25.4 |
| r 4 = 3.9454 | d 4 = 1.4931 | n 3 = 1.58913 | ν 3 = 61.3 |
| r 5 = -14.0451 | d 5 = 0.0498 | | |
| r 6 = 4.3647 | d 6 = 0.6968 | n 4 = 1.80400 | ν 4 = 46.6 |
| r 7 = 193.8973 | d 7 = VARIABLE | | |
| r 8 = -7.1644 | d 8 = 0.1244 | n 5 = 1.88300 | ν 5 = 40.8 |
| r 9 = 1.4701 | d 9 = 0.5147 | | |
| r10 = -3.3919 | d10 = 0.1244 | n 6 = 1.51742 | ν 6 = 52.4 |
| r11 = 1.5737 | d11 = 0.4106 | n 7 = 1.84666 | ν 7 = 23.8 |
| r12 = 6.6811 | d12 = VARIABLE | | |
| r13 = 0.0000 (STOP) | d13 = 0.2986 | | |
| *r14 = 9.9724 | d14 = 0.7217 | n 8 = 1.58313 | ν 8 = 59.4 |
| r15 = -3.6206 | d15 = VARIABLE | | |
| r16 = 3.0913 | d16 = 0.1244 | n 9 = 1.84666 | ν 9 = 23.8 |
| r17 = 1.5845 | d17 = 0.0105 | | |
| r18 = 1.6097 | d18 = 0.9332 | n10 = 1.58313 | ν10 = 59.4 |
| *r19 = -3.7395 | d19 = VARIABLE | | |
| r20 = 0.0000 | d20 = 1.6175 | n11 = 1.51633 | ν11 = 64.2 |
| r21 = 0.0000 | | | |

* ASPHERIC

F I G. 15(b)

| VARIABLE SEPARATION | FOCAL LENGTH | | |
|---|---|---|---|
| | 1.00 | 2.55 | 5.66 |
| d 7 | 0.32 | 1.99 | 2.97 |
| d 12 | 2.68 | 1.01 | 0.03 |
| d 15 | 2.46 | 1.53 | 0.99 |
| d 19 | 1.24 | 2.18 | 2.71 |

F I G. 15(c)

| ASPHERIC COEFFICIENT | | | |
|---|---|---|---|
| SURFACE | B | C | D |
| r 14 | $-9.4890 \times 10^{-3}$ | $-9.5313 \times 10^{-4}$ | $-3.5873 \times 10^{-5}$ |
| r 19 | $-1.5696 \times 10^{-3}$ | $-1.4025 \times 10^{-3}$ | $-9.1864 \times 10^{-5}$ |

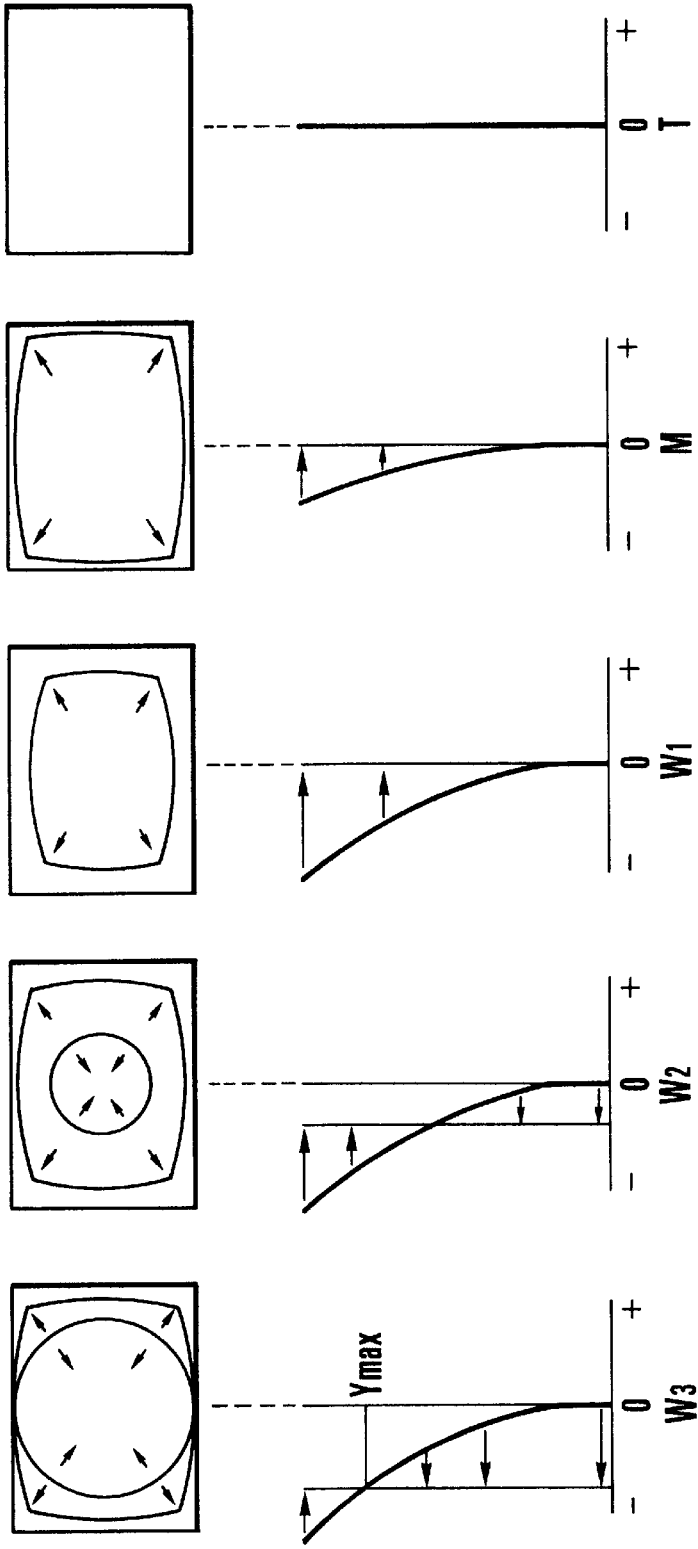

FIG.25(a) RELATED ART
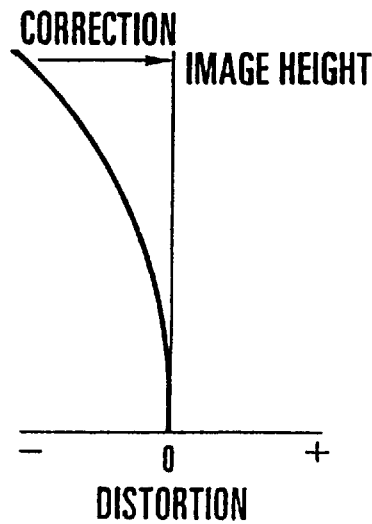
FIG.25(b) RELATED ART
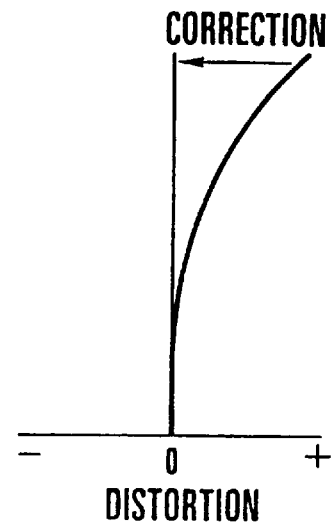
FIG.26(a) RELATED ART
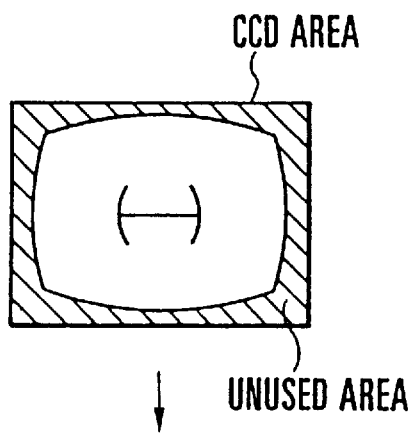
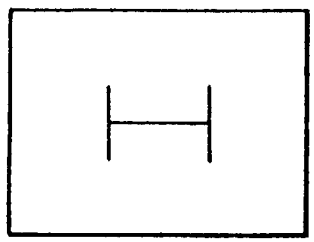
FIG.26(b) RELATED ART
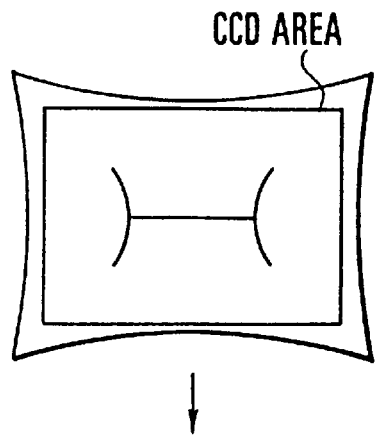
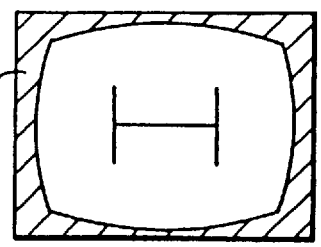

FIG.27(a)-2
WIDE-ANGLE 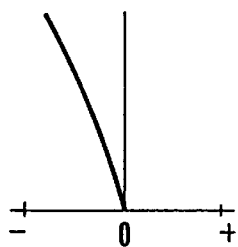 MIDDLE 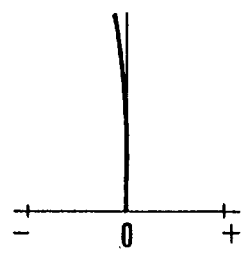 TELEPHOTO
FIG.27(a)-1    FIG.27(a)-3
FIG.27(b)-2
WIDE-ANGLE 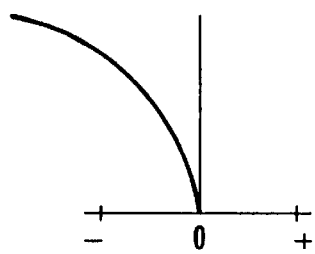 MIDDLE 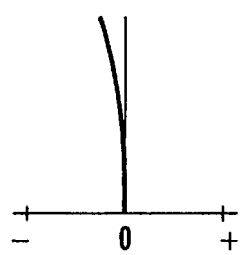 TELEPHOTO
FIG.27(b)-1    FIG.27(b)-3

PIXEL 41

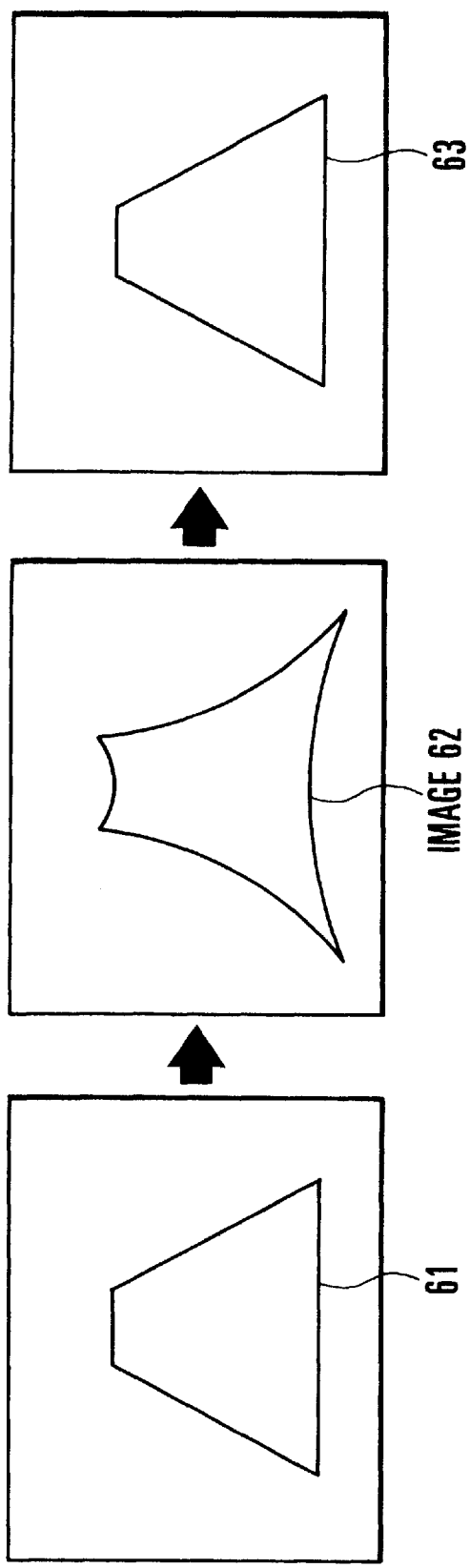

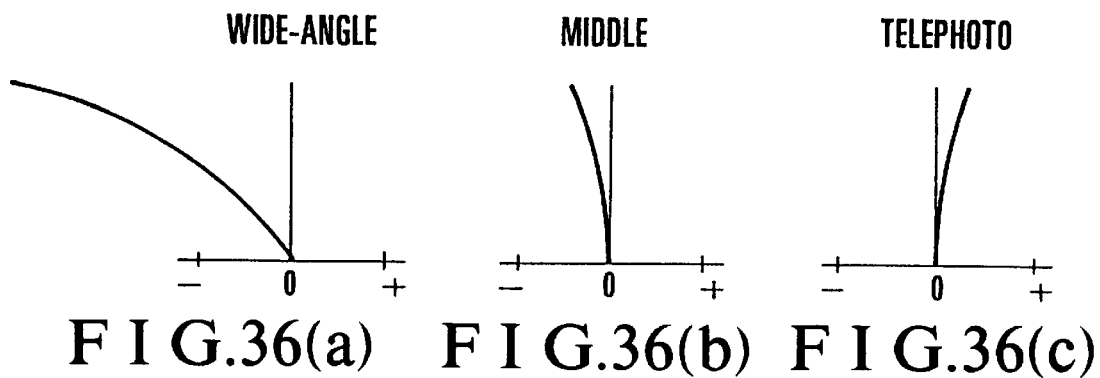
F I G.36(a)   F I G.36(b)   F I G.36(c)
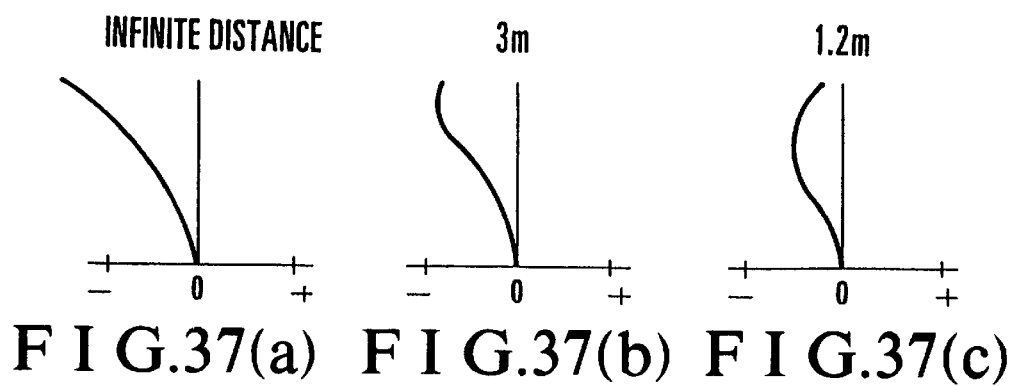
F I G.37(a)   F I G.37(b)   F I G.37(c)

231      IMAGE 232      233

ELECTRONIC-ZOOM FRAME

PHOTOGRAPHIC IMAGE PLANE

IMAGE PICKUP APPARATUS

This application is a continuation of application Ser. No. 08/103,091 filed Aug. 6, 1993, now abandoned.

BACKGROUND OF THE INVENTION

1. Field of the Invention

The present invention relates to improvements in an image pickup apparatus such as a video camera, a still camera or a silver-halide camera, an image reproducing apparatus for reproducing an image recorded by such an image pickup apparatus, and a video system formed by a combination of these apparatus.

2. Description of the Related Art

Conventionally, in an image pickup apparatus, the distortion of a photographic image occurs due to the distortional aberration of each individual photographic lens and a distortion which cannot be completely eliminated in every stage of the design of the photographic lens remains in an image as a residual distortional aberration. As one method for electronically eliminating the residual distortional aberration, it is known that an electron beam is made to scan in distorted form on the basis of the distortional aberration of a photographic lens in an image pickup apparatus using an image pickup tube such as the Plumbicon.

Japanese Laid-Open Patent Application No. Hei 2-252375 discloses another proposal to obtain image data from an image pickup device such as a CCD and correct the image data in the form of a digital signal.

However, the above-described conventional example has a number of problems. For example, since correction of image data is performed with the center (optical axis) of an image plane selected as a datum, on the basis of the focal length of the photographic lens, i.e., as shown in FIGS. 25(a) and 25(b), no image data present in the peripheral portion of the image plane is employed in the case of correction of a negative (barrel form) distortion, as shown in FIG. 26(a). In contrast, in the case of correction of a positive (pincushion form) distortion, image data present in the peripheral portion of the image plane is lost as shown in FIG. 26(b).

Another distortional-aberration correcting method has been proposed with respect to a camera provided with a solid-state image pickup device. According to this method, pixel signals are read out from the solid-state image pickup device in accordance with the geometrical deformation of an image which occurs in a photographic lens, and the read-out pixel signals are subjected to interpolation so that the distortional aberration of the image is corrected. However, in a case where a zoom lens is used as the objective lens, if correction of the distortional aberration of the zoom lens is to be performed at each photographing position thereof by using signal processing, an enormous amount of computing processing and an extremely long computing time as well as a large-scale signal processing circuit are needed for the signal processing. For this reason, although the utilization of this proposal is considered in an extremely limited field, such as a broadcasting station, which needs high-quality images, the aforesaid proposal has not currently been popular.

An art of carrying out electronic zooming by performing signal processing of a signal obtained from an image pickup device, such as a CCD, has also heretofore been known.

According to the known art, since it is necessary to position an image of an object to be electronically zoomed, in an electronic-zoom frame provided in the center of an image plane, the electronic zooming is not very useful in photographing a moving object to which the electronic zooming seems able to be advantageously applied. This is because it is necessary to move the entire image pickup apparatus in accordance with the movement of the object so that an image of the moving object can be positioned in the electronic-zoom frame at all times, with the result that an image shake easily occurs due to the movement of the entire image pickup apparatus.

For example, such an image pickup apparatus having an electronic-zoom function is arranged to perform coordinate transformation so as to enlarge an original image which is not electronically zoomed, as shown in the left-hand portion of FIG. 56, to a size equivalent to an electronic-zoom frame in which an object selected as a target is to be positioned. By performing the coordinate transformation, the image pickup apparatus can provide an enlarged image such as that shown in the right-hand portion of FIG. 56.

However, the above-described conventional example has the following problem. Since a photographer cannot obtain image information outside of the electronic-zoom frame while the electronic-zoom function is operating, the photographer encounters the problem that an object, particularly a moving object, occasionally leaves the image plane or that another foreign object suddenly enters the electronic-zoom frame and appears in the image plane. For this reason, it is difficult for the photographer to fully utilize the electronic-zoom function.

As is known in the art, the so-called electronic zoom is intended to achieve an apparent increase in the telephoto effect of an optical system when the optical system is set to its telephoto end, and to attain a large zoom effect without increasing the size of the optical system.

By sequentially executing the electronic zoom and optical zoom (or an optical zooming operation) capable of varying the focal length of the optical system, it is possible to achieve an effect equivalent to the zoom range of a zoom lens having a zoom ratio equal to a multiplication of the zoom ratio of the optical zoom and that of the electronic zoom.

For example, if the optical system has focal lengths of 8–80 mm and the electronic has a zoom ratio of 2 times, it is possible to obtain a lens having focal lengths equivalent to 8–160 mm.

However, in such an electronic zoom, although it is possible to enlarge an image, it is impossible to enlarge an angle of view. Accordingly, although it is possible to achieve "an increase in the telephoto effect", it is impossible to realize "an increase in a wide-angle effect".

Although a lens system may be beforehand designed to have a wide angle of view, there is the problem that the lens system becomes large.

A plurality of means for shifting the focal length of the lens system toward its wide-angle side have recently been proposed in light of the problem.

One well-known method for shifting the focal length of the lens system toward the wide-angle side is disclosed in, for example, Japanese Laid-Open Patent Application No. Sho 59-204817. In this method, an afocal converter made up of lenses having negative and positive refractive powers is disposed forward of the optical system so that the wide-angle effect of the lens system can be increased.

However, since the afocal converter is made up of two or three lenses, there is the problem that if the afocal converter is disposed forward of the optical system, the entire lens system increases in size.

According to another known method, a negative lens is inserted forward of a principal optical system, and the close-up photography capability of the principal optical system is utilized to achieve an increase in the wide-angle effect of the lens system.

However, if the focal length of the lens system is discontinuously converted from its wide-angle end toward a far wider-angle side, there is the problem that no photography can be performed at any angle of view between the wide-angle end and the far wider-angle side.

SUMMARY OF THE INVENTION

It is, therefore, a first object of the present invention to provide an apparatus for performing signal processing of an image signal obtained from an image pickup device and deforming an image into a desired form and enlarging the image up to a desired size.

A second object of the present invention is to provide an apparatus for correcting a distortion of an image necessarily occurring due to a photographic lens, i.e., distortional aberration, by using an electrical method.

A third object of the present invention is to provide an control device for controlling a so-called electronic zoom which is arranged to cause an image pickup device to receive an optical image formed by a photographic lens, perform signal processing of a signal output of the image pickup device, and vary the size of an image.

A fourth object of the present invention is to provide an image pickup apparatus which permits a photographer to confirm image information outside of an electronic-zoom frame during electronic zooming, thereby expanding a photographic opportunity and enabling the photographer to securely use the electronic zoom.

A fifth object of the present invention is to provide an image pickup apparatus capable of smoothly varying an angle of view during switching from optical zoom to electronic zoom or during switching from electronic zoom to optical zoom.

A sixth embodiment of the present invention is to provide a camera provided with a zoom function capable of continuously varying an angle of view from a wide-angle end toward an ultra-wide-angle side so that a photographer can smoothly perform photography even during zooming through the angles of view between the wide-angle end and the ultra-wide-angle side.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 13(a)–13(c) are views showing aberrations which occur at the wide-angle end of the lens shown in FIG. 12;

FIGS. 14(a)–14(c) are views showing aberrations which occur at the telephoto end of the lens shown in FIG. 12;

FIGS. 15(a) to 15(c) are views showing a numerical example of the lens shown in FIG. 12;

FIGS. 16(a) to 16(e) are views diagrammatically showing the manner of distortion correction performed according to the first embodiment of the present invention;

FIGS. 25(a) and 25(b) are views which serve to explain distortion correction performed in a conventional image pickup apparatus;

FIGS. 26(a) and 26(b) are views which serve to explain problems involved in the distortion correction performed in the conventional image pickup apparatus;

FIGS. 27(a)-1, 27(a)-2, and 27(a)-3, and FIGS. 27(b)-1, 27(b)-2, and 27(b)-3, are views respectively showing the optical performance of a photographic zoom lens according to a fifth embodiment of the present invention and that of a general photographic zoom lens;

FIG. 35 is a schematic view which serves to explain distortional-aberration correcting processing according to the fifth embodiment of the present invention;

FIGS. 36(a)–36(c) are views showing one example of the optical performance of a photographic zoom lens used in a sixth embodiment of the present invention;

FIGS. 37(a)–37(c) are views showing one example of a variation in distortional aberration depending on shooting distance, in the neighborhood of the wide-angle end of the photographic zoom lens used in the sixth embodiment of the present invention;

DETAILED DESCRIPTION OF THE PREFERRED EMBODIMENTS

Preferred embodiments of the present invention will be described below in detail with reference to the accompanying drawings.

Figure 1:
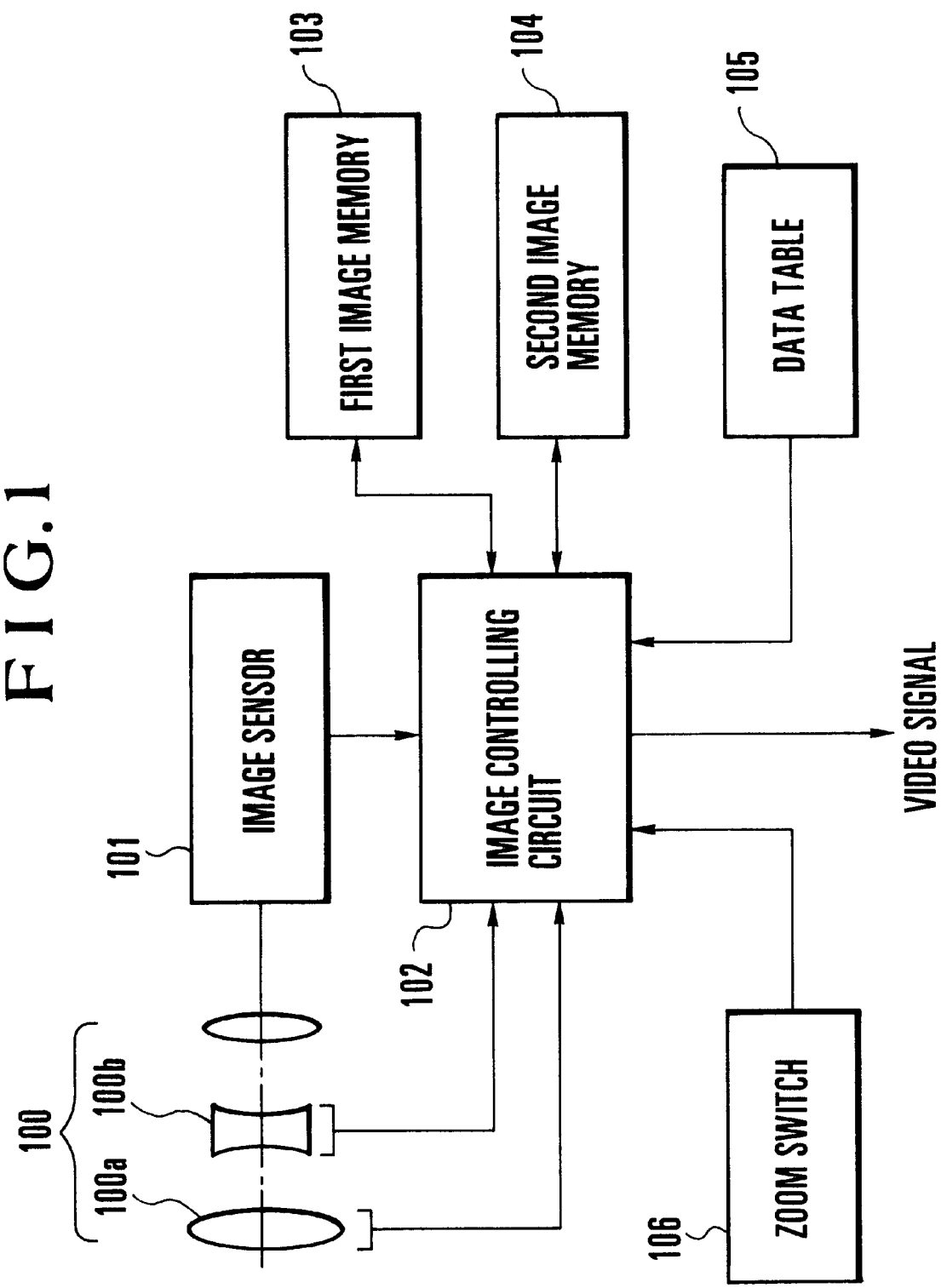
FIG. 1 is a block diagram schematically showing the arrangement of an image pickup apparatus according to a first embodiment of the present invention.

FIG. 1 is a block diagram schematically showing the arrangement of an image pickup apparatus according to a first embodiment of the present invention.

The arrangement shown in FIG. 1 includes a photographic lens 100 which is formed as a lens assembly provided with a focusing lens 100a and a variator lens 100b and capable of zooming, an image sensor 101 such as a CCD, an image controlling circuit 102 for performing control of various operations, such as correction of image distortion, a first image memory 103 for memorizing image data obtained from the image sensor 101, a second image memory 104 for memorizing image data the distortion of which is corrected, a data table 105 on which distortional-aberration information about the photographic lens 100 is memorized, and a zoom switch 106 for converting a zoom instruction given by a photographer into an electrical signal.

Figure 2:
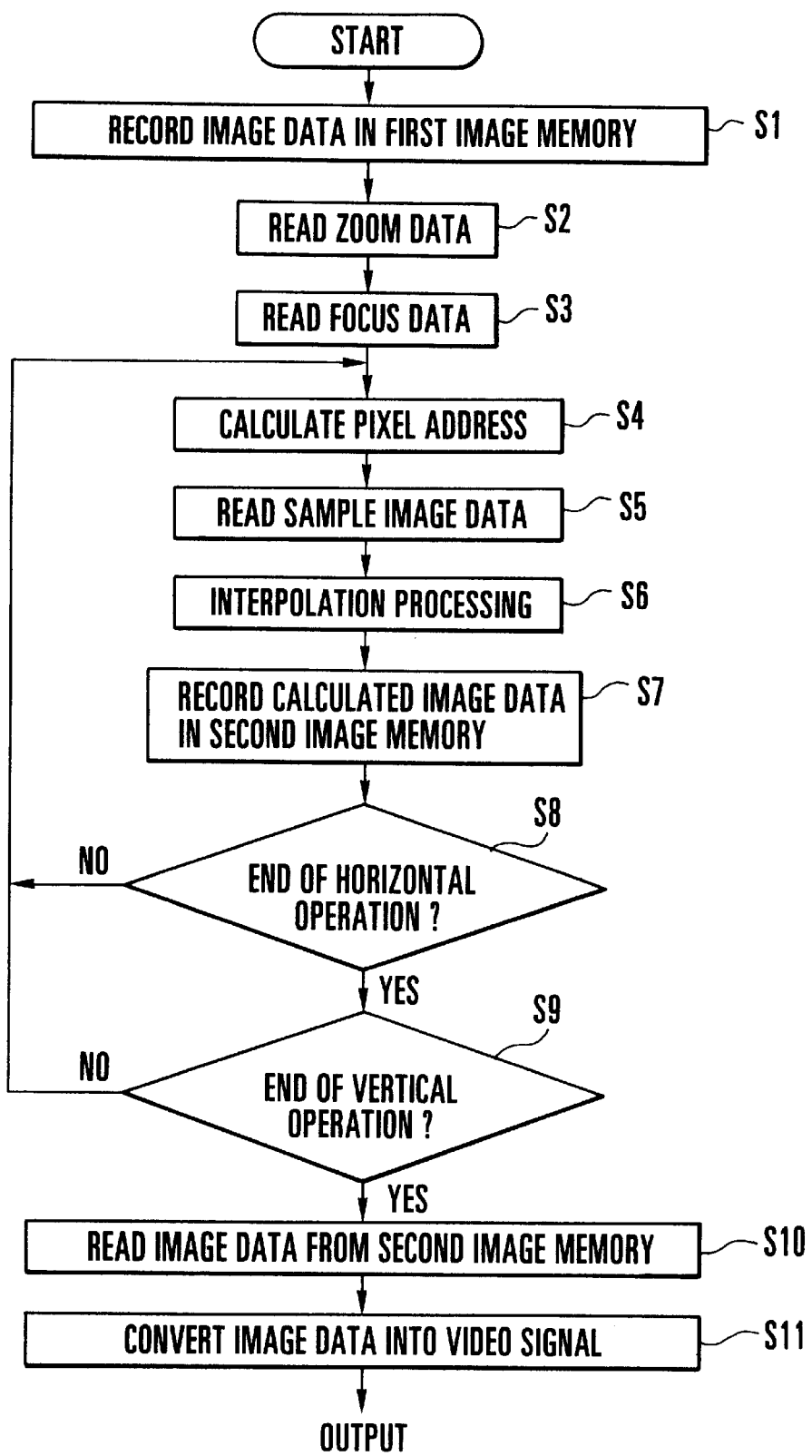
FIG. 2 is a flowchart showing the operation of the image controlling circuit 102.

FIG. 2 is a flowchart showing the operation of the image controlling circuit 102. The operation will be described below with reference to the flowchart.

[Step S1] The image controlling circuit 102 converts image data supplied from the image sensor 101 into a video signal and converts the video signal into a digital image signal by means of an A/D conversion circuit. The image controlling circuit 102 causes the first image memory 103 to memorize the digital image signal for one frame. The image obtained at this time is an image distorted by the distortional aberration of the photographic lens 100.

[Step S2] The focal length, i.e., the zoom position, of the photographic lens 100 is detected from the position of the variator lens 100b which is one constituent element of the photographic lens 100, and a zoom position which is aimed at by the photographer is read from the zoom switch 106.

The process of obtaining zoom information from the position of the variator lens 100b and the zoom switch 106 in this manner is intended to perform correction of image distortion with a datum in the correction of the image distortion arbitrarily set as will be described later.

[step S3] An object distance is detected from the focusing lens 100a which is one constituent element of the photographic lens 100.

This step is needed to perform image correction according to the status of the photographic lens 100 since the distortional aberration of the photographic lens 100 varies due to zooming and focusing.

[Step S4] The addresses of distorted pixels at which the addresses of undistorted pixels are located are calculated on the basis of data indicative of the amount of distortion which are memorized on the data table 105. The data indicative of the amount of distortion may be memorized in the form of raw data relative to each zoom position and each focus position, or may also be memorized in the form of the coefficient of a function which approximates the amount of distortional aberration. It is to be noted that the data indicative of the amount of distortion are prepared as values peculiar to the photographic lens 100.

Figure 3:
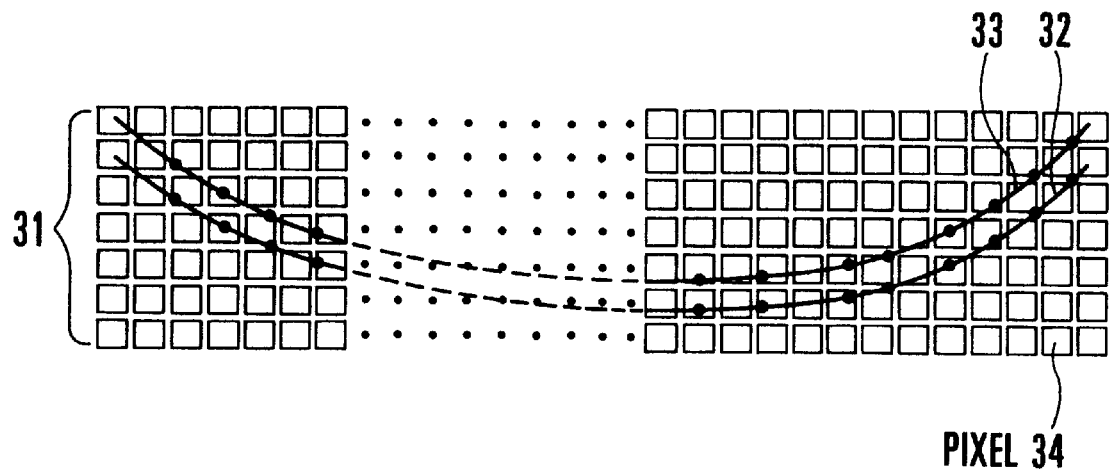
FIG. 3 is a view showing distorted scanning lines.
Figure 4:
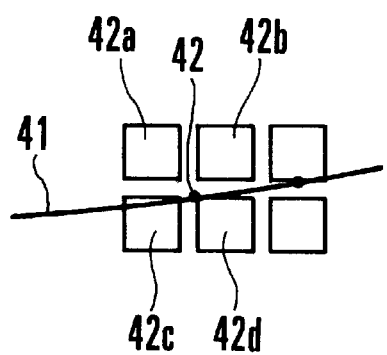
FIG. 4 is a fragmentary schematic view which serves to explain pixels used for interpolation processing.

The scanning lines of an undistorted image are typically formed as curved lines on a distorted image as shown in FIG. 3. Since the pixels on the undistorted image do not correspond to individual pixels on the distorted image, for example, a pixel 42a located on the top left in FIG. 4 is selected from the pixel 42a and pixels 42b, 42c and 42d which surround a corresponding position 42 of undistorted image data, and the address of the pixel 42a is calculated.

In FIG. 3, reference numeral 31 denotes a digital image data array, reference numerals 32 and 33 denote the scanning lines of the undistorted image, and reference numeral 34 denotes the position of image data corresponding to one pixel. In FIG. 4, reference numeral 41 denotes one scanning line of the undistorted image, and reference numeral 42 denotes the corresponding position of the undistorted image data.

[Step S5] A plurality of data (sample image data) for use in generating undistorted image data are copied to another memory on the basis of the pixel address calculated in Step S4. In the example shown in FIG. 4, data indicative of the pixels 42a, 42b, 42c and 42d are copied.

[Step S6] Data indicative of an undistorted image are generated, as by linear interpolation, from the coordinates of the respective pixels copied in Step S5 and the coordinates of newly generated pixels.

[Step S7] The image data generated in Step S6 are sequentially memorized into the second image memory 104.

[Step S8] It is determined whether all the operations which are executed in Steps S4 to S7 in the horizontal scanning direction have ended. If they have not yet ended, the process proceeds to Step S4. If it is determined that they have ended, the process proceeds to Step S9.

[step S9] It is determined whether all the operations which are executed in Steps S4 to S7 in the vertical scanning direction have ended. If they have not yet ended, the process proceeds to Step S4. If it is determined that they have ended, the process proceeds to Step S10.

[Step S10] The image data memorized in the second image memory 104 is read out, and the process proceeds to Step S11.

[Step S11] The image data is converted into a video signal conforming to the NTSC system or the like, and the video signal is outputted to an electronic viewfinder (not shown) and to an image recording device (not shown).

In the first embodiment, although an area memory is used as the second image memory 104, a line memory capable of storing image data for one horizontal scanning line may be substituted for the area memory. If the line memory is used, it is possible to adopt an arrangement in which each time generation of image data for one horizontal scanning line has ended, the image data is converted into a video signal, and which executes control so that this processing operation is repeated for all the vertical scanning lines. Such an arrangement is capable of providing a substantial memory saving.

Figure 5:
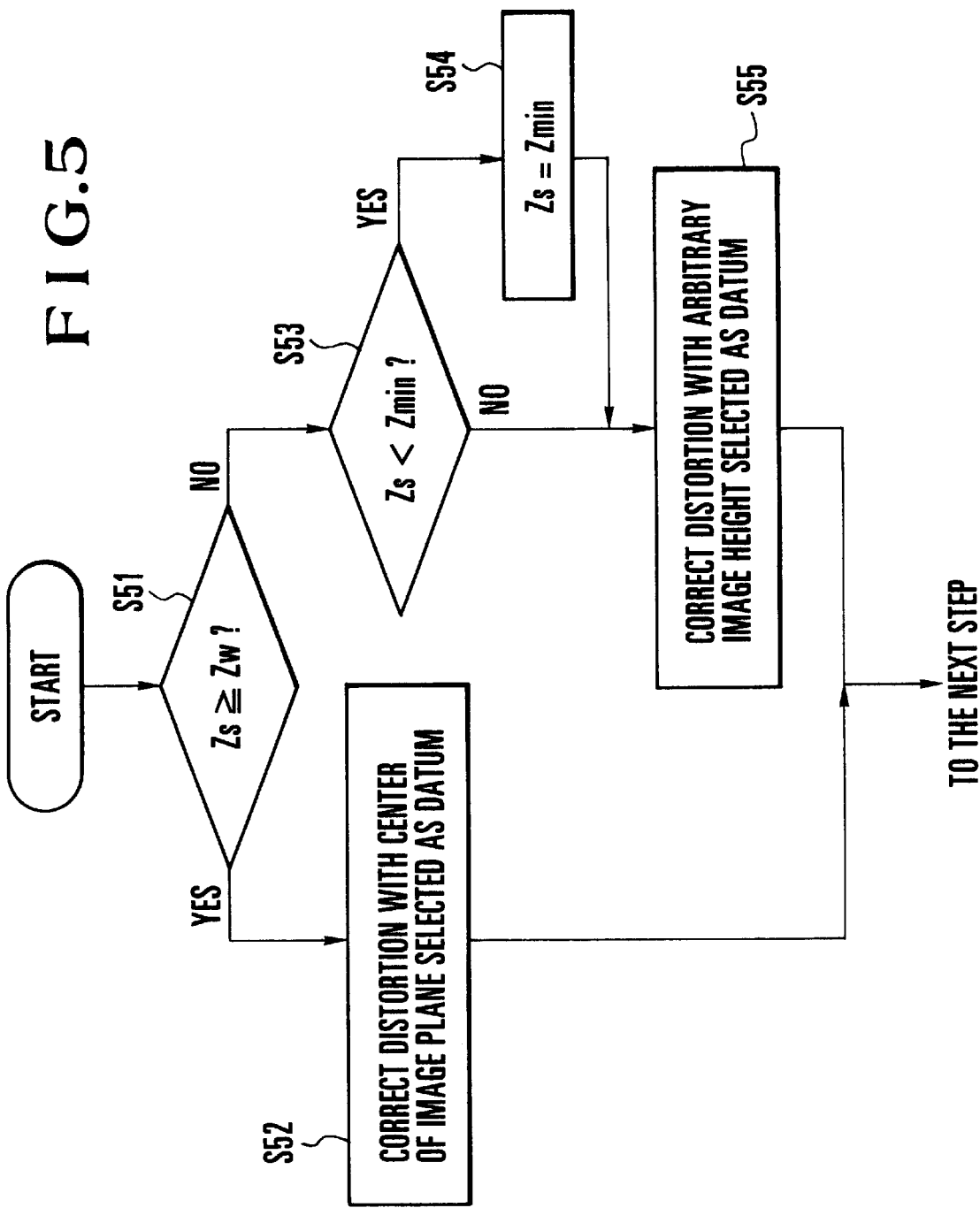
FIG. 5 is a flowchart showing a distortion correcting operation according to the first embodiment of the present invention.

An algorithm for calculating pixel addresses will be described below with reference to FIG. 5.

In the following description of the algorithm, it is assumed that the distortional aberration of the photographic lens 100 is "0" at the telephoto end and the distortional aberration becomes more negative toward the wide-angle end, and that image correction is performed with respect to the negative distortional aberration. It is also assumed that Z represents the zoom position of the photographic lens 100 and Zw and Zt (Zw<Zt) represent the zoom positions of the photographic lens 100 at the wide-angle end and the telephoto end, respectively. It is also assumed that Zs represents the zoom position specified by the photographer through the zoom switch 106 and Zmin represents a virtual zoom position at the wide-angle end which is acceptable in terms of the effect of image correction.

The relationship between Zs and Z is Zs=Z until the photographic lens 100 mechanically reaches the wide-angle position.

[Step S51] A comparison is made between the zoom position Zs which is aimed at by the photographer and the zoom position Zw which can be taken by the photographic lens 100 at the wide-angle end. If Zs is not less than Zw, i.e., in the case of the relationship of Zs≧Zw, the process proceeds to Step S52. In the case of the relationship of Zs<Zw, the process proceeds to Step S53.

[Step S52] Since the relationship of Zs≧Zw is established, distortion correction is performed with the center of an image plane selected as a datum. The process proceeds to the next step.

If it is determined in Step S51 that the relationship of Zs<Zw is established, it is determined that the zoom position of the photographic lens 100 has entered the area of the virtual zoom position, and the process proceeds to Step S53 as described previously.

[Step S53] It is determined whether the zoom position Zs which is aimed at by the photographer is less than the virtual zoom position Zmin at the wide-angle end which is acceptable in terms of the effect of image correction. If the zoom position Zs is less than the virtual zoom position Zmin, i.e., in the case of the relationship of Zs<Zmin, the process proceeds to Step S54. In the case of the relationship of Zs≧Zmin, the process proceeds to Step S55.

[Step S54] Since the zoom position Zs which is aimed at by the photographer is less than the virtual zoom position Zmin at the wide-angle end which is acceptable in terms of the effect of image correction, the value of Zmin is substituted into Zs, and the process proceeds to Step S55.

[Step S55] Distortion correction is performed with an arbitrary image height selected as a datum.

A distortional aberration D occurring due to the photographic lens 100 is approximated by a function, i.e., a quadratic function of the image height, and if a coefficient "a" of the quadratic function is a linear function of the zoom position Z of the photographic lens 100, the following relationships are obtained:

$$D = D(L) = a * L^2$$

$$a = a(Z) = b * Z$$

Figures 6A, 6B, 6C:
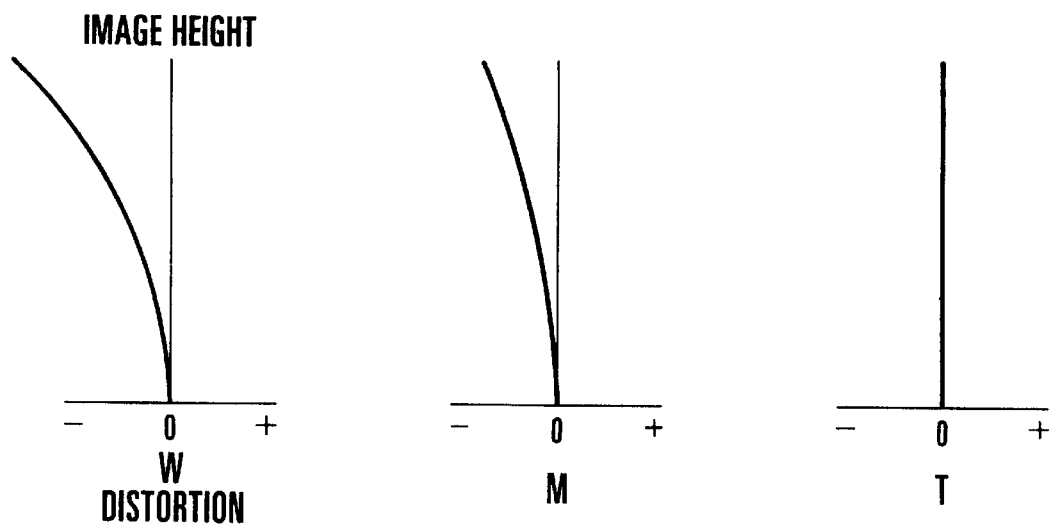
FIGS. 6(a), 6(b) and 6(c) are views aiding in explaining the manner of correction of distortional aberration with reference to FIG. 5.

These relationships are shown in FIGS. 6(*a*) to 6(*c*). In FIGS. 6(*a*) to 6(*c*), W, M and T respectively represent distortional aberrations occurring at the wide-angle end, a middle angle position, and the telephoto end when photographic lens 100 is set to the zoom position Z.

An optical distortional aberration (D %) is defined as the following value:

$$D \% = \{(L - L_0)/L_0\} \times 100 \qquad (1)$$

$$= \{(L/L_0 - 1)\} \times 100$$

where $L_0$ represents an ideal image height and L represents an actual image height.

Figure 7:
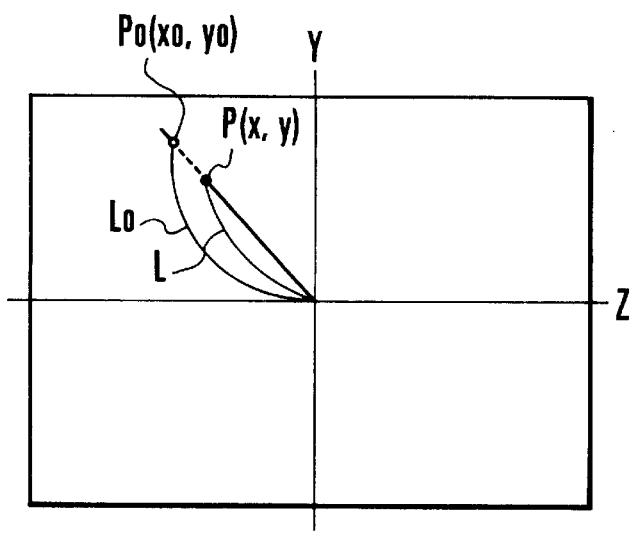
FIG. 7 is a view aiding in explaining the manner of correction of distortional aberration with reference to FIG. 5.

In the distortion correction (Step S52) which is performed with the center of the image plane selected as a datum, if $P_0(x_0, y_0)$ represents the ideal image point of an arbitrary point $P(x, y)$ on the image plane as shown in FIG. 7, the ratio of the distance between the ideal image point $P_0(x_0, y_0)$ and the center of the image plane to the distance between the arbitrary point $P(x, y)$ and the center of the image plane becomes an expansion-to-contraction ratio $\alpha$:

$$\alpha = L_0/L \qquad (2)$$

$$= (1 + D/100)^{-1}$$

From the expression (2), the coordinates of the ideal image point $P_0$ are calculated as follows:

$$x_0 = \alpha \cdot x$$

$$y_0 = \alpha \cdot y \qquad (3)$$

In practice, an inverse form of function for obtaining the coordinates of an actual image point from the coordinates of an ideal image point is prepared to determine an actual pixel address which corresponds to the scanning of a pixel point.

The distortion correction which is performed with an arbitrary image height selected as a datum (the operation of Step S55) will be described below with reference to FIGS. 8 and 9.

If an image height used as a datum is Ys, the distortion correction performed with an arbitrary image height selected as a datum is defined as distortion correction which is performed so that the amount of distortion correction is made "0" along the circumference of a circle of radius Ys about the center of the image plane. FIG. 8 is an aberration diagram showing this distortion correction. As shown in FIG. 8, if the amount of distortional aberration at the image height Ys is represented as $D_0$, the image is corrected so that the amount of distortional aberration occurring at each image height can be made equal at the position of $D_0$. In other words, correction is performed in such a manner that, as shown in FIG. 9, the image-point area outside of the circle of radius Ys is expanded, whereas the image-point area inside of the circle of radius Ys is contracted.

Figure 8:
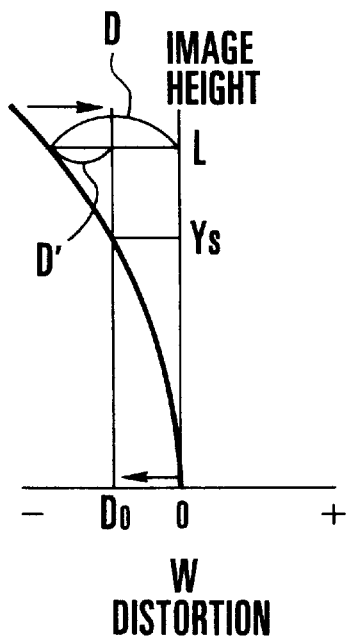
FIG. 8 is a view aiding in explaining the manner of correction of distortional aberration with reference to FIG. 5.
Figure 9:
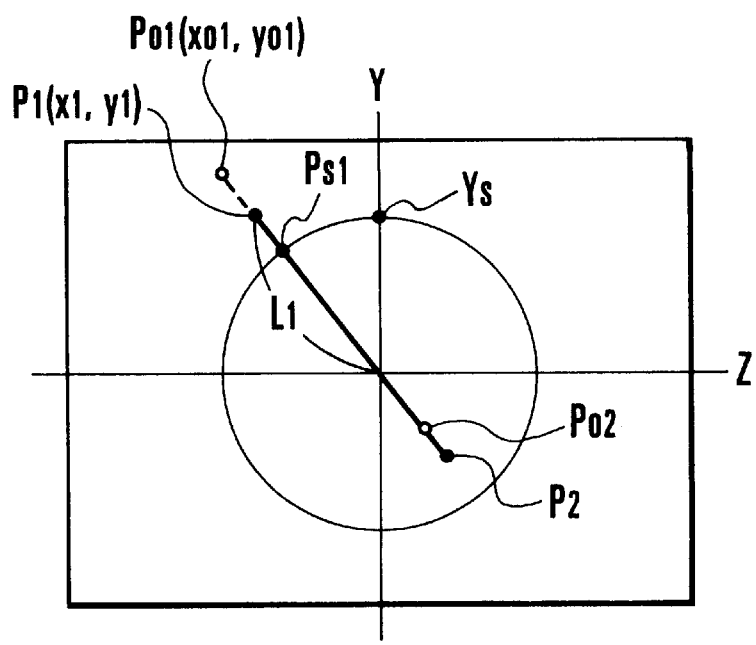
FIG. 9 is a view aiding in explaining the manner of correction of distortional aberration with reference to FIG. 5.

If D represents the optical distortional aberration at that time and D' represents the corrected distortional aberration, the following relationship is established from FIG. 8:

$$D' = D - D_0 \qquad (4)$$

If $L_1$ represents the distance (image height) on the image plane of an arbitrary image point $P_1(x_1, y_1)$ from the center of the image plane and $Ps_1(xs_1, ys_1)$ represents an intersection point of the circle of radius Ys and a straight line which connects the center of the image plane and the image point $P_1$, the coordinates of $Ps_1(xs_1, ys_1)$ are as follows:

$$xs_1 = (Ys/L_1) \cdot x_1$$

$$ys_1 = (Ys/L_1) \cdot y_1 \qquad (5)$$

Since this intersection point forms a datum point for expansion and contraction, an expansion-to-contraction ratio $\alpha'$ is as follows:

$$\alpha' = (1 + D'/100)^{-1} \qquad (6)$$

The coordinates $P_{01}(x_{01}, y_{01})$ of an ideal image height are as follows:

$$x_{01} = xs + \alpha' \cdot \Delta x_1$$

$$y_{01} = ys + \alpha' \cdot \Delta y_1 \qquad (7)$$

where $$\Delta x_1 = x_1 - xs_1$$

$$\Delta y_1 = y_1 - ys_1 \qquad (8)$$

Although an image point $P_2$ is an image point inside of the circle of radius Ys, an ideal image point $P_{02}$ is obtained in a similar manner.

If distortion correction is to be performed with the center of the image plane selected as a datum, "0" is substituted into $D_0$ so that the expressions (7) become the same as the expressions (3). Accordingly, whether distortion correction is performed with the center of the image plane selected as a datum or with an arbitrary image height selected as a datum, the amount of correction of distortion aberration can be obtained through processing utilizing the same function which uses $D_0$ as a parameter.

By selecting an arbitrary image height as a datum for distortion correction, it is possible to reduce the amount of correction of the negative distortional aberration. Accordingly, an image whose distortion is corrected becomes an image which covers a wider area on an image pickup plane than an image whose distortion is corrected with the center of the image plane selected as a datum. This signifies that a photographic angle of view is apparently widened toward the wide-angle side.

Figure 10:
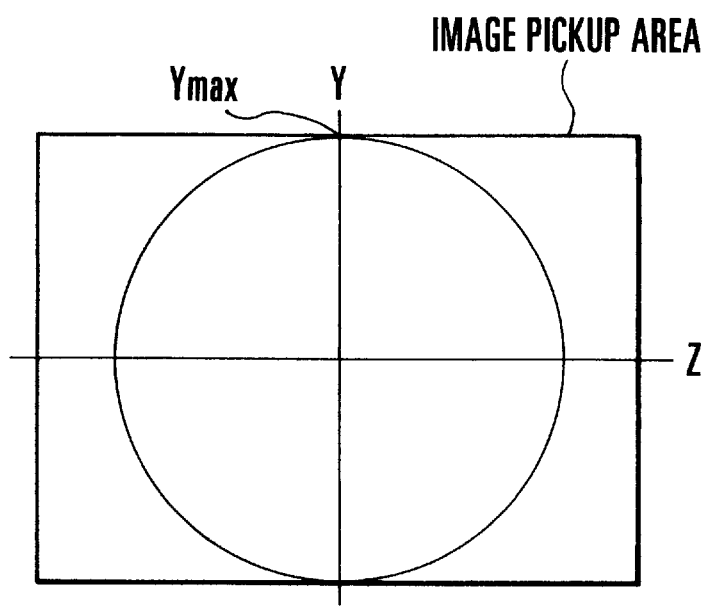
FIG. 10 is a view aiding in explaining the manner of correction of distortional aberration with reference to FIG. 5.
Figure 11:
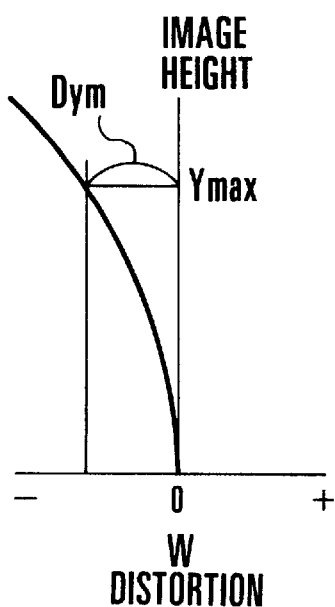
FIG. 11 is a view aiding in explaining the manner of correction of distortional aberration with reference to FIG. 5.

The distortion correction performed with an arbitrary image height selected as a datum reaches its maximum limit when an image pickup area is inscribed in a circle selected as the datum, as shown in FIG. 10. The zoom position in this case is a virtual wide-angle end. If the radius of the circle in this case is represented as Ymax (maximum datum image height), an ideal image height $Ymax_0$ relative to this image height Ymax becomes as follows:

$$Ymax_0 = (1 + Dym/100)^{-1} \cdot Ymax \qquad (9)$$

where Dym represents the amount of distortional aberration occurring at the image height Ymax (refer to FIG. 11).

The maximum image height in the Y direction which is based on distortion correction performed with the center (optical axis) of the image plane selected as a datum is Ymax, and an angle of view which can be photographed is expanded by $Ymax_0/Ymax$ times by performing the above-described distortion correction.

From the expression (9), "$Ymax_0/Ymax$" is determined by the amount of distortional aberration occurring at the image height Ymax. Accordingly, it will be understood that the amount of expansion of the photographic angle of view is determined by the amount of distortional aberration occurring at the wide-angle end of a photographic lens and the angle of view expands as the negative value of the distortional aberration becomes larger.

A design example of a lens which produces, at its wide-angle end, a large negative distortional aberration suitable for the above-described image correction will be described below.

Figure 12:
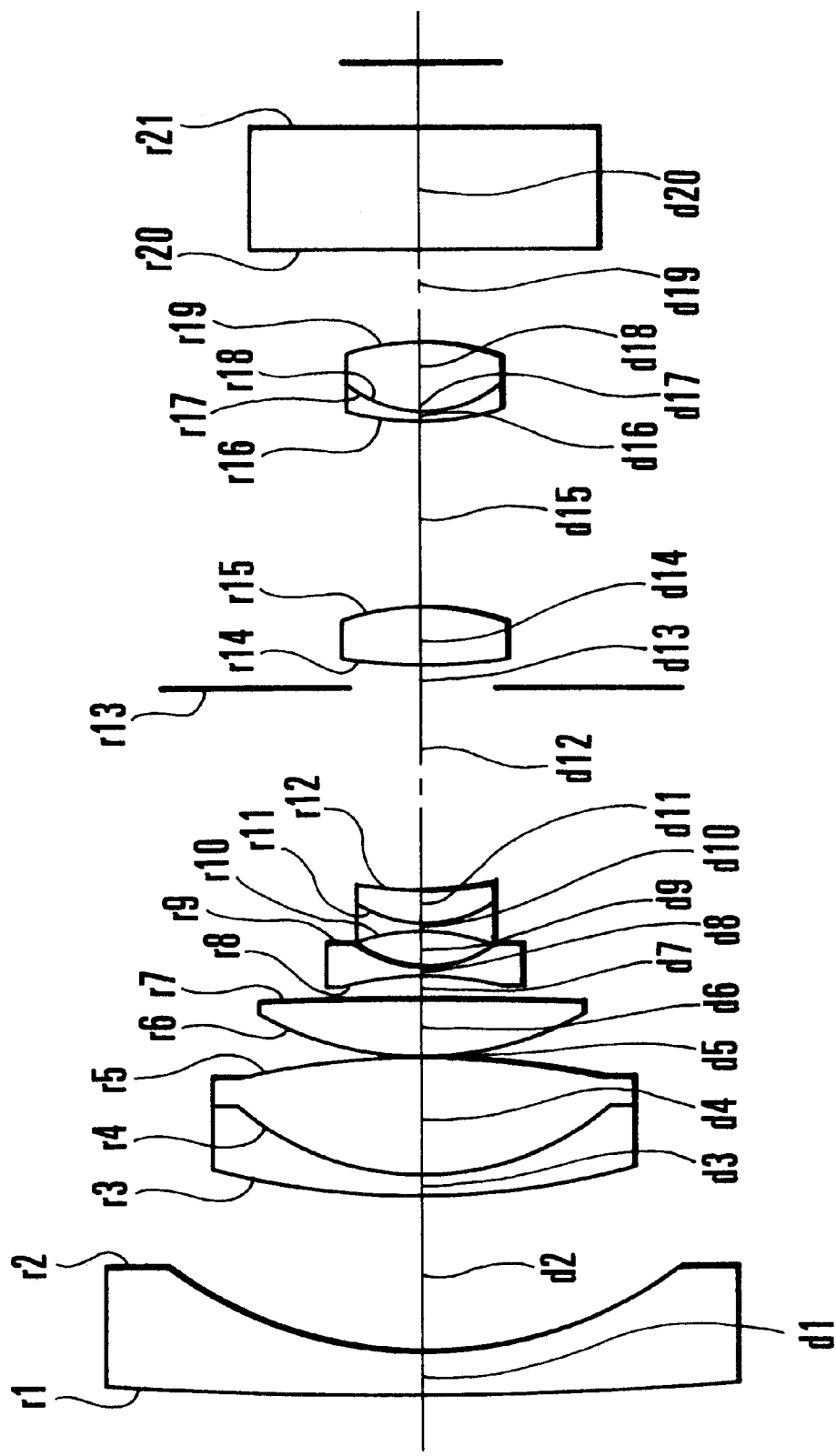
FIG. 12 is a cross sectional view of a lens, suitable for image correction, which produces a large negative distortional aberration on its wide-angle side.

FIG. 12 is a cross sectional view of the lens, and FIGS. 13(a)–13(c) and 14(a)–14(c) are aberration diagrams respectively showing aberrations which occur at the wide-angle end and the telephoto end of the lens.

FIGS. 15(a) to 15(c) show a numerical example.

In the numerical example, "ri" represents the radius of curvature of the i-th lens surface as viewed from an object side, "di" represents the i-th lens thickness or air separation as viewed from the object side, and "ni" and "vi" respectively represent the refractive index and the Abbe number of the glass of the i-th lens element as viewed from the object side.

In the numerical example, r20 and r21 represent a glass block such as a face plate. If the z axis is taken in the direction of the optical axis; the H axis is taken in the direction perpendicular to the optical axis; the direction of propagation of light is positive; R represents the radius of the osculating sphere; and B, C, D and E represent aspheric coefficients, respectively, the shape of the aspheric surface is represented as the following expression:

$$X = (1/R)H^2 / \left[1 + \sqrt{\{1 - (H/R)^2\}}\right] + BH^4 + CH^8 + DH^8 + EH^{10}$$

In this numerical example, an optical angle of view $\omega_0$ is a total of approximately 74°. In the case of an image sensor having an image size of 4:3, the above-described maximum datum image height Ymax is represented as:

Ymax=maximum image height×0.6

Since the amount of distortional aberration Dym at this time is −9.3%, the following relationship is obtained:

$$Ymax_0 / Ymax = (1 + Dym/100)^{-1}$$
$$= 1.10$$

Thus, the photographic angle of view becomes 10% wider, and the maximum angle of view is approximately 81° in total.

FIGS. 16(a) to 16(e) diagrammatically show the manner of distortion correction performed according to the first embodiment.

Figure 17:
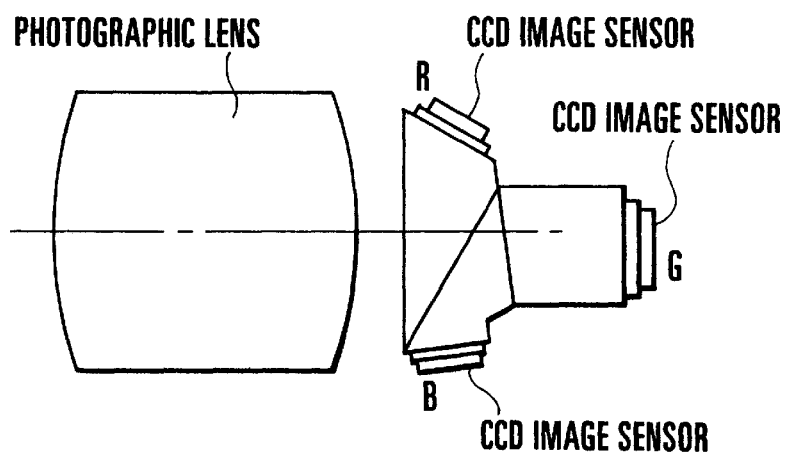
FIG. 17 is a view schematically showing the essential portions of an image pickup apparatus to which the first embodiment of the present invention can be applied and which is arranged to separate incident light into three color components and pick up a color image.

Although the above description of the first embodiment has referred to the image pickup apparatus using a single image sensor, the present invention is also applicable to an image pickup apparatus arranged to separate incident light into R, G and B components and pick up R, G and B images as shown in FIG. 17.

In such an arrangement, since different image distortions occur in the respective color components, data indicative of the amounts of distortion corresponding to the respective color components are prepared, and image processing for distortion correction is performed for each of the color components. By converting the result of the image processing into a video signal, not only the distortion of the image plane but also lateral chromatic aberration is corrected so that a far higher-quality image can be picked up.

A second embodiment of the present invention will be described below.

Although the arrangement of the second embodiment is substantially identical to that of the first embodiment, the second embodiment adopts a image processing method different from that of the first embodiment.

Figures 18A, 18B, 18C:
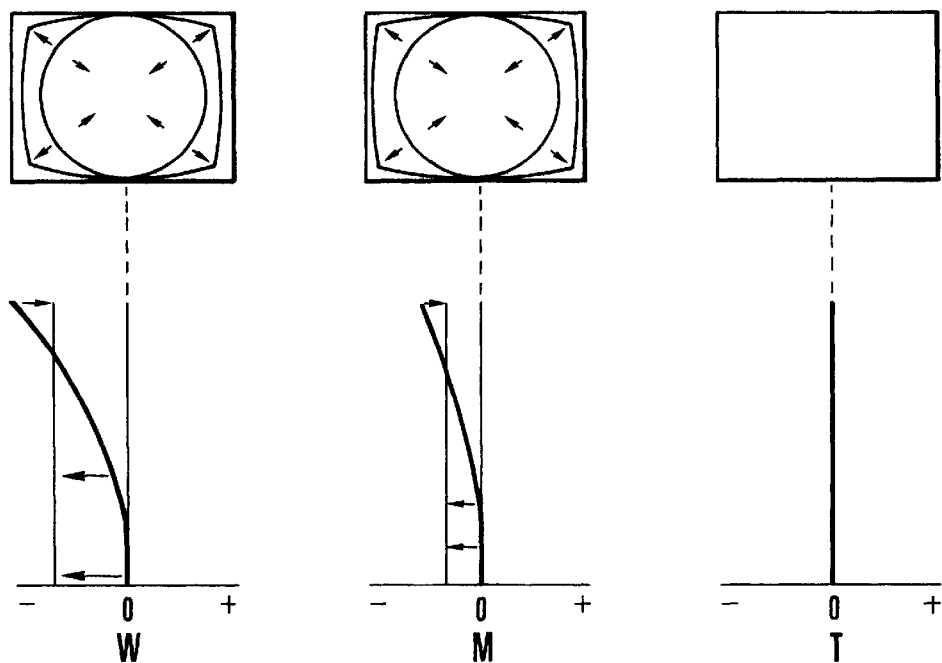
FIGS. 18(a) to 18(c) are views diagrammatically showing the manner of distortion correction performed according to the second embodiment of the present invention.

The first embodiment adopts an algorithm according to which an angle of view is first widened by using a photographic lens and, after the photographic lens has reached its wide-angle end, the angle of view is widened to a further extent by using image processing. In contrast, the second embodiment adopts an algorithm according to which if a negative distortional aberration occurs in the photographic lens, not only distortion correction but also widening of the angle of view is performed. FIGS. 18(a) to 18(c) diagrammatically show the manner of the distortion correction.

For example, if an arbitrary image height which is selected as a datum for distortion correction is fixed to the maximum datum image height Ymax and correction is sequentially performed, to whichever zoom position the photographic lens is set, the image pickup area can be utilized to the maximum extent.

The adoption of this method makes it possible to prevent the amount of distortion correction from varying to extremes. In the case of the above-described image processing, during zooming, as the angle of view of the photographic lens approaches the wide-angle end, the rate at which the angle of view widens increases. In this case, it is desirable that as the angle of view of the photographic lens approaches the wide-angle end, the speed of zooming of the photographic lens be decreased so that it is possible to achieve zooming which is felt smooth by the photographer.

A third embodiment of the present invention will be described below.

The third embodiment relates to an example which is arranged to perform distortion correction of a photographic lens which produces a positive distortional aberration on its telephoto side. The arrangement of the apparatus is substantially identical to that of the first embodiment.

Figure 19:
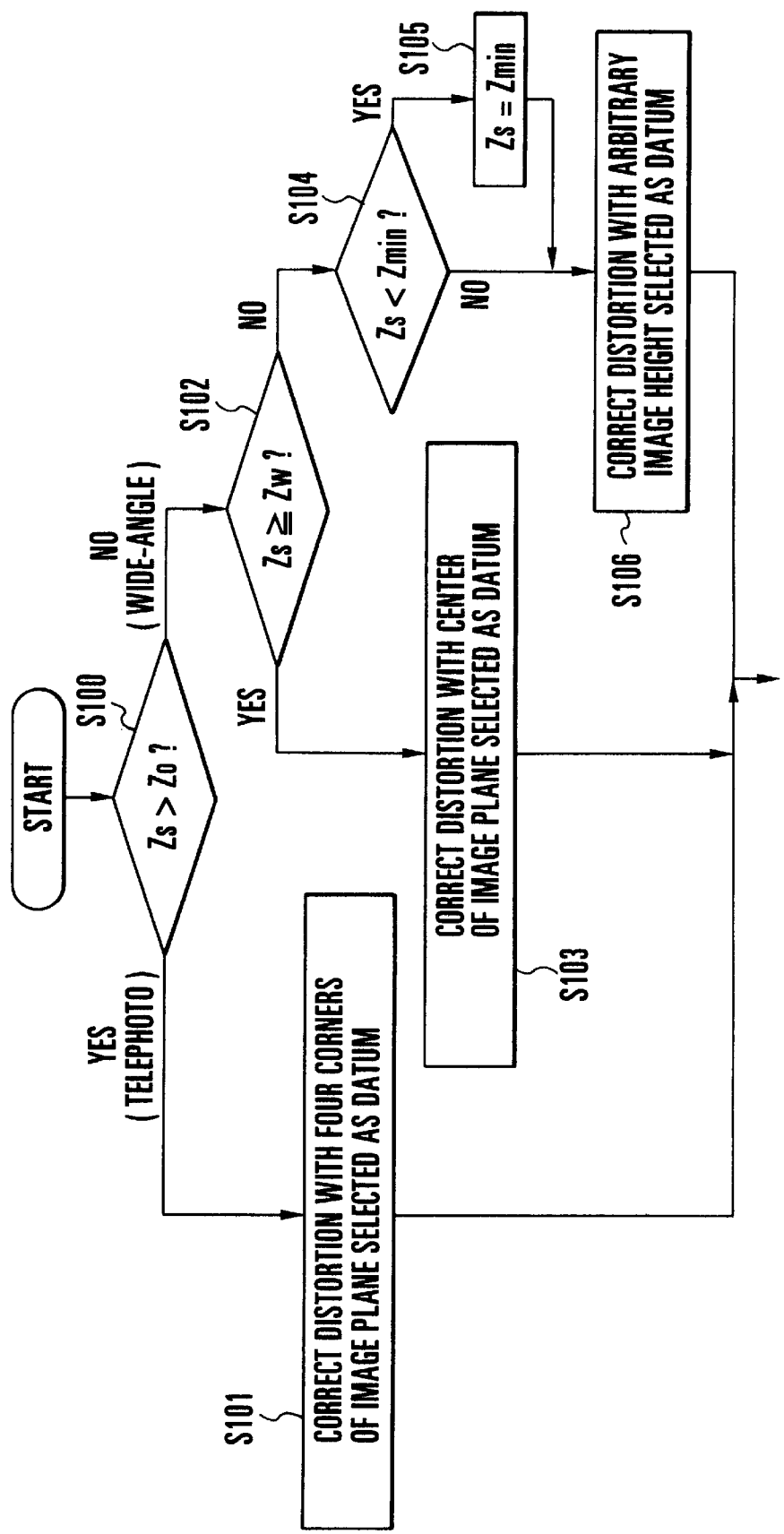
FIG. 19 is a flowchart showing a distortion correcting operation according to the second embodiment of the present invention.

FIG. 19 is a flowchart showing an algorithm for calculating addresses according to the third embodiment. It is assumed that $Z_0$ represents the zoom position at which the distortional aberration of the photographic lens is "0".

[step S100] It is determined whether the zoom position of the photographic lens is closer to the wide-angle end or the telephoto end with respect to $Z_0$. If the zoom position of the photographic lens is closer to the wide-angle end, i.e., in the case of the relationship of $Zs \leq Z_0$, the process proceeds to Step S102. If the zoom position of the photographic lens is closer to the telephoto end ($Zs > Z_0$), the process proceeds to Step S101.

[Step S101] Distortion correction is performed with the four corners of the image plane selected as a datum (as will be described later in more detail).

[Step S102] A comparison is made between the zoom position Zs which is aimed at by the photographer and the zoom position Zw which can be taken by the photographic lens 100 at the wide-angle end. If Zs is not less than Zw, i.e., in the case of the relationship of Zs≧Zw, the process proceeds to Step S103. In the case of the relationship of Zs<Zw, the process proceeds to Step S104.

[Step S103] Since the relationship of Zs≧Zw is established, distortion correction is performed with the center of the image plane selected as a datum, in a manner similar to that executed in Step S52 described previously in connection with the first embodiment. The process proceeds to the next step.

If it is determined in Step S102 that the relationship of Zs<Zw is established, it is determined that the zoom position of the photographic lens 100 has entered the area of the virtual zoom position, and the process proceeds to Step S104 as described previously.

[Step S104] It is determined whether the zoom position Zs which is aimed at by the photographer is less than the virtual zoom position Zmin at the wide-angle end which is acceptable in terms of the effect of image correction. If the zoom position Zs is less than the virtual zoom position Zmin, i.e., in the case of the relationship of Zs<zmin, the process proceeds to Step S105. In the case of the the relationship of Zs≧Zmin, the process proceeds to Step S106.

[step S105] Since the zoom position Zs which is aimed at by the photographer is less than the virtual zoom position Zmin at the wide-angle end which is acceptable in terms of the effect of image correction, the operation of substituting the value of Zmin into Zs is performed.

[Step S106] Distortion correction is performed with an arbitrary image height selected as a datum, in a manner similar to that executed in step S55 described previously in connection with the first embodiment.

Figure 20:
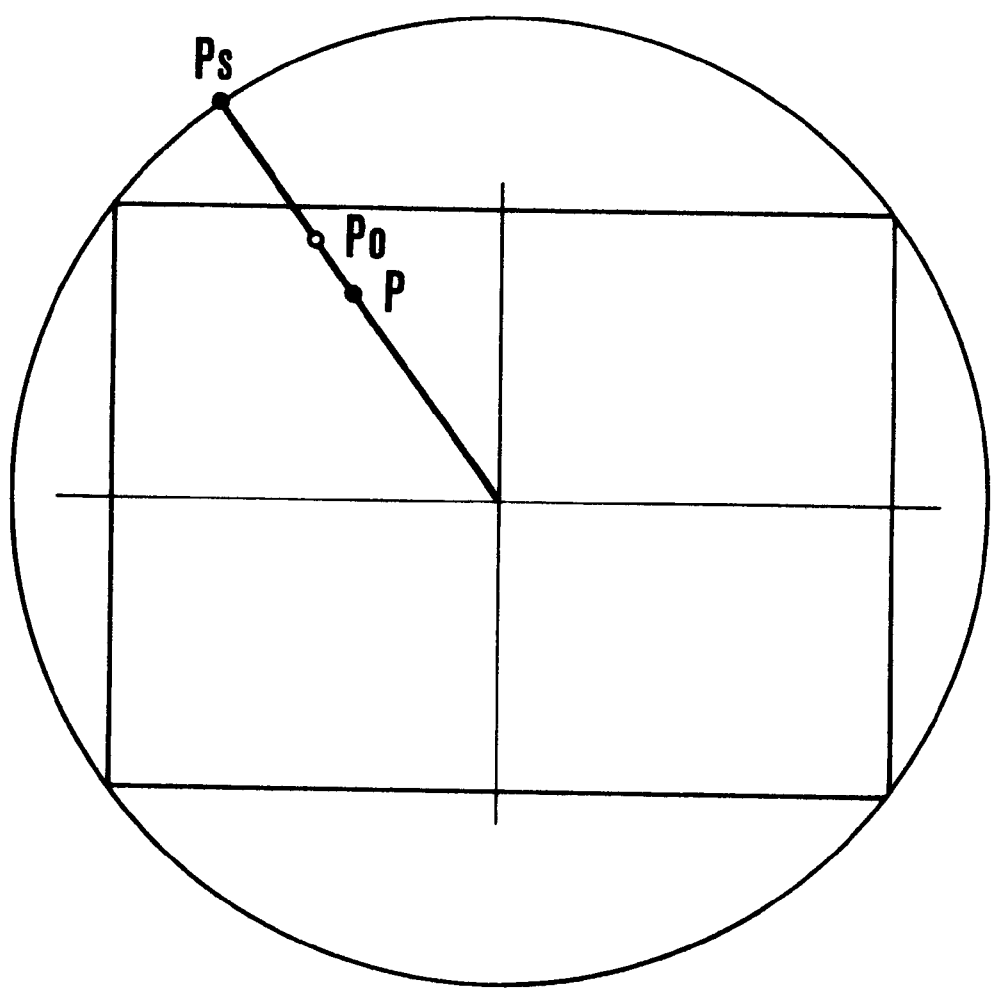
FIG. 20 is a view aiding in explaining the manner of correction of distortional aberration with reference to FIG. 19.

The "distortion correction with the four corners of the image plane selected as a datum", which is executed in Step S101, will be described below with reference to FIG. 20.

If distortion correction with the center of an image plane selected as a datum is performed when a positive distortional aberration occurs, image data in the peripheral portion of the image plane is lost so that an imperfect image occurs, as described previously in the description of the related art. To prevent the occurrence of the imperfect image, the circle referred to in the first embodiment, which is used as a datum for distortion correction, is replaced with a circle which circumscribes a photographic area, and if the coordinates of the ideal image point $P_0(x_0, y_0)$ are represented as follows:

$$x_0=(1+D/100)^{-1}\cdot(x-xs)+xs$$

$$y_0=(1+D/100)^{-1}\cdot(y-ys)+ys \quad (10)$$

the coordinates can be calculated through the expressions used in the first embodiment. In this case, since the sign of the distortional aberration is reversed, the image inside of the circle is expanded in a manner reverse to that described previously in connection with the first embodiment.

Figure 21:
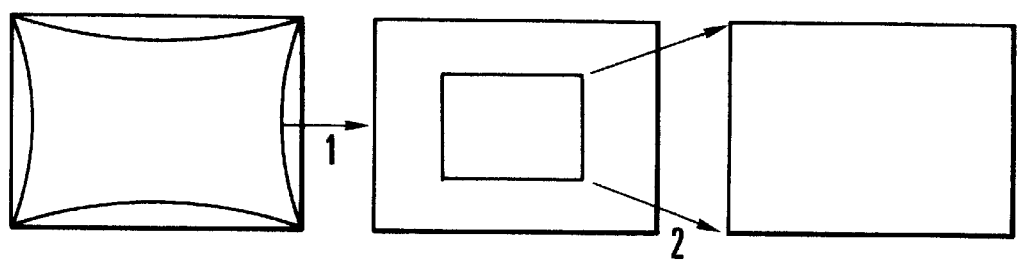
FIG. 21 is a schematic view showing the manner of distortion correction which is performed by an arrangement in which an electronic-zoom function is added to the apparatus according to the third embodiment of the present invention.

Electronic zoom is known as a method for enlarging an image beyond the zoom range of a photographic lens when the zoom position of the photographic lens is set to its telephoto side. The electronic zoom can be effectively combined with a method of correcting telephoto-side distortion according to the present invention. FIG. 21 shows the manner of this combination method. First, the above-described distortion correction with four corners selected as a datum is performed, and the resultant image data is partially trimmed and absent image data is prepared by linear interpolation processing, so that it is possible to obtain an image which is virtually zoomed up.

Figure 22:
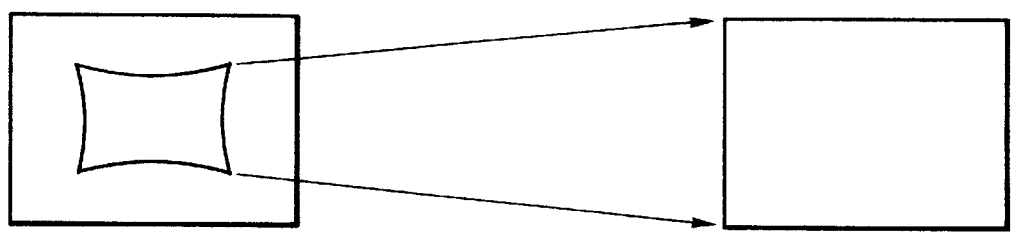
FIG. 22 is a schematic view showing the manner of another distortion correction which is performed by the arrangement in which the electronic-zoom function is added to the apparatus according to the third embodiment of the present invention.

According to another method, if Zr represents a virtual zoom-up ratio, it is possible to simultaneously perform calculations on distortion correction and electronic zoom-up by replacing $(x_0, y_0)$ in the above-described expressions (10) with $(x_0/Zr, y_0/Zr)$ and determining "x" and "y". FIG. 22 shows the manner of the distortion correction and the electronic zoom-up performed by this method.

A fourth embodiment of the present invention will be described below.

Figure 23:
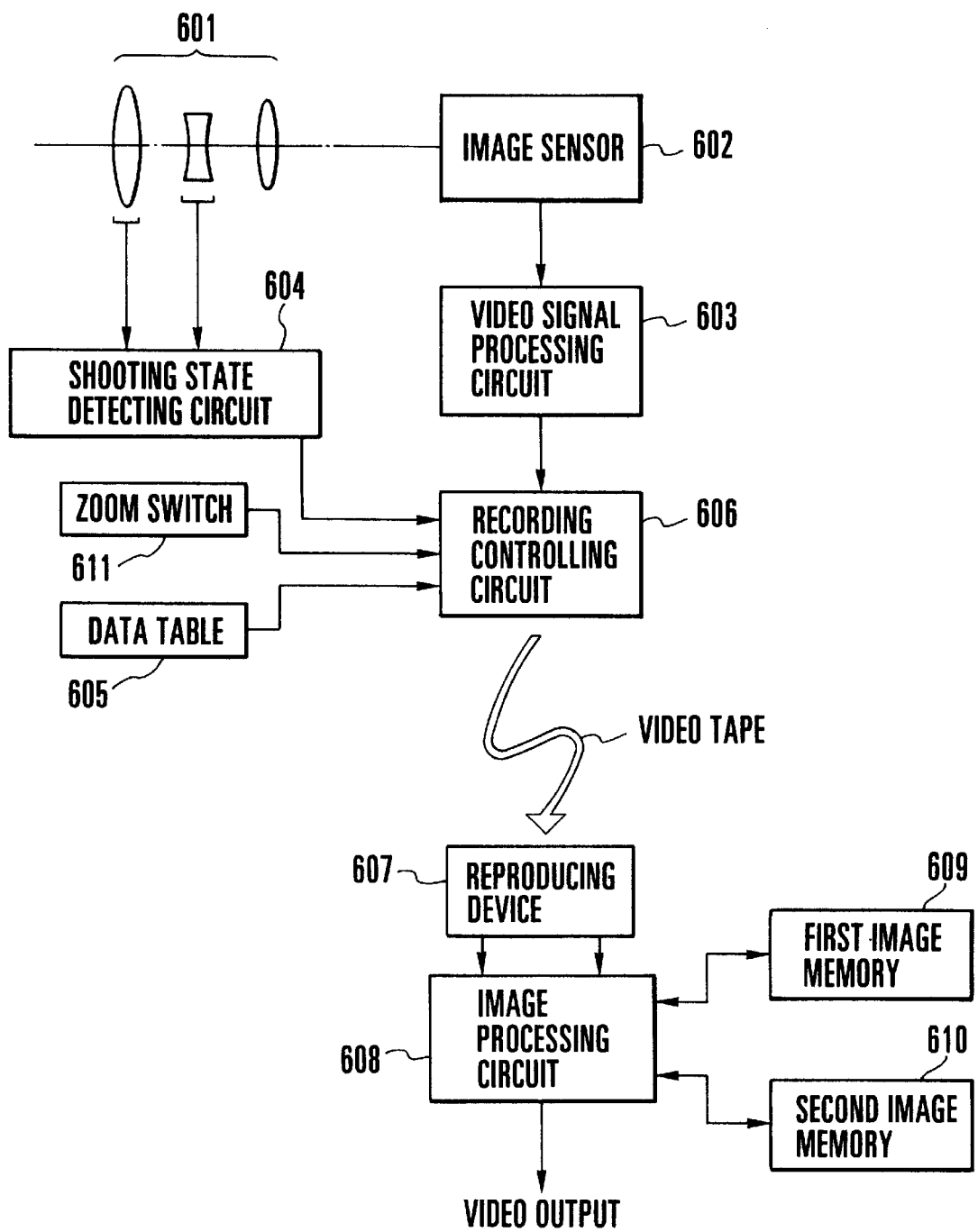
FIG. 23 is a block diagram showing a video system according to a fourth embodiment of the present invention.

FIG. 23 is a block diagram showing the arrangement of an apparatus according to the fourth embodiment of the present invention, and shows a video system arranged to perform the above-described distortion correction during reproduction of an image.

The arrangement shown in FIG. 23 includes a photographic lens 601 which is formed as a lens assembly capable of zooming, an image sensor 602 such as a CCD, a video signal processing circuit 603 for converting an image pickup signal into a video signal, a shooting state detecting circuit 604 for detecting the shooting state of the photographic lens 601 from the position of a variator lens or the position of a focusing lens, and a data table 605 on which data about distortional aberrations according to the shooting state of the photographic lens 601 are recorded.

A recording controlling circuit 606 is provided for simultaneously recording, on a recording medium such as a video tape, a video signal and an audio signal as well as an information signal for use in performing distortion correction of a recorded video image frame with an arbitrary image height selected as a datum, which information signal is obtained from information about a shooting state supplied from the shooting state detecting circuit 604, information about a zoom position which is aimed at by the photographer, which information is inputted from a zoom switch 611, and information about distortional aberration memorized on the data table 605.

The shown arrangement also includes a reproducing device 607 for reproducing from the recording medium the video signal, the audio signal and the information signal for use in performing distortion correction of a video image frame with an arbitrary image height selected as a datum, an image processing circuit 608 for correcting the distortion of an image, a first image memory 609 for memorizing the image data obtained from the reproducing device 607, and a second image memory 610 for memorizing image data indicative of the image whose distortion is corrected.

The recording controlling circuit 606 takes out information about distortional aberration from the data table 605 in the form of a coefficient (distortion coefficient) obtained from approximation using a function, on the basis of the information about the shooting state supplied from the shooting state detecting circuit 604, and makes a comparison between the information about the zoom position supplied from the shooting state detecting circuit 604 and the information about the zoom position which is aimed at by the photographer, supplied from the zoom switch 611. Thus, the recording controlling circuit 606 obtains an image height which is used as a datum in distortion correction (datum image height), and records a distortion coefficient and a datum image height.

The reproducing device 607 reads out the distortion coefficient and the datum image height, and sends them to the image processing circuit 608 together with a video signal. In the image processing circuit 608, an undistorted image is formed according to the sequence of the above-described distortion correction.

The recording medium may also be a magnetic disk or an optical disk. A subject to be recorded is not limited to a moving image, and a still image such as a still video image can also be recorded.

Figure 24:
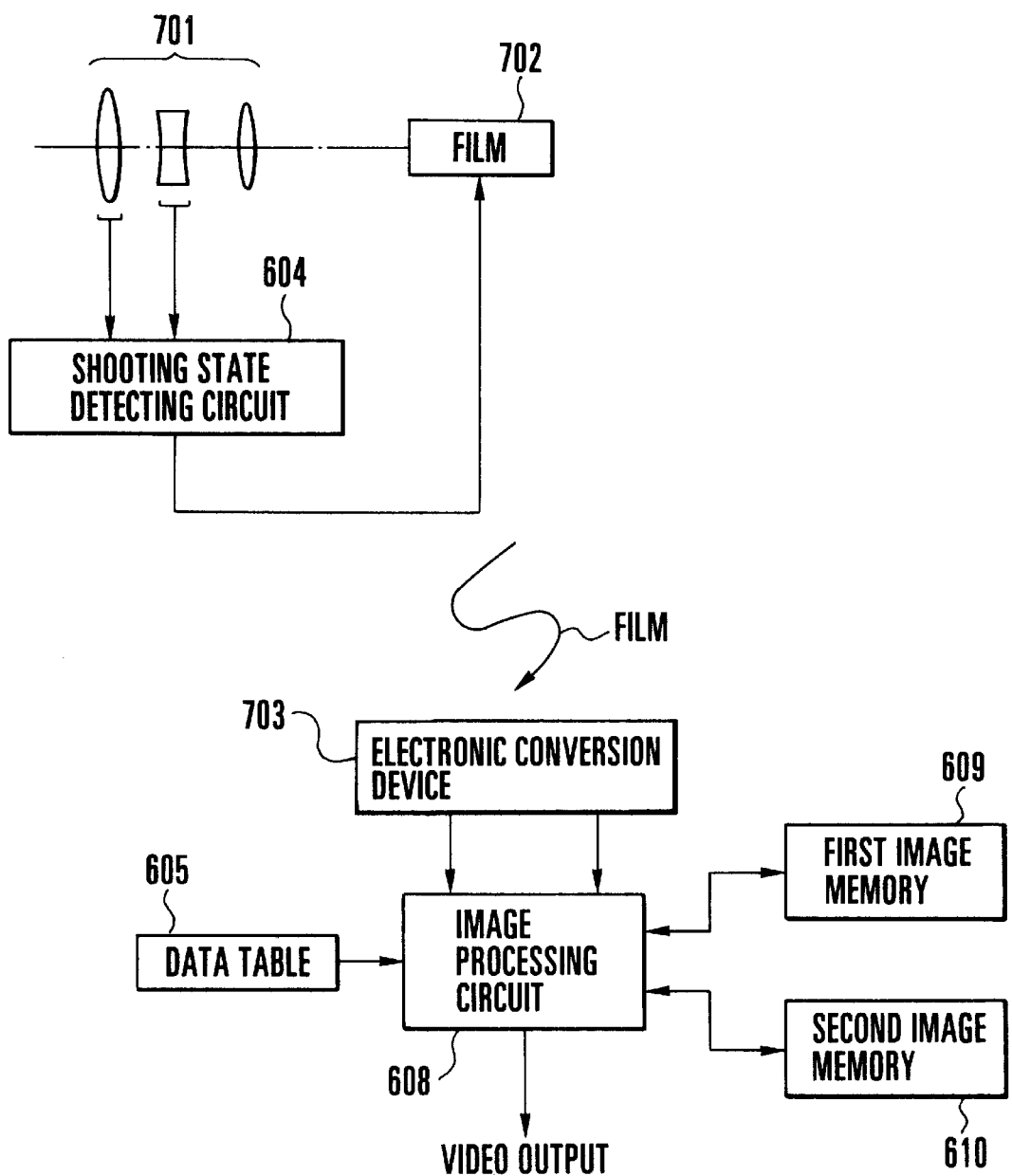
FIG. 24 is a video system in which the imaging apparatus of FIG. 23 is replaced with a silver-halide camera.

A similar system can also be constructed as shown in FIG. 24. According to the system shown in FIG. 24, in a silver-halide camera, data is recorded on a film on which an image is recorded, by optical or magnetic means. The image recorded on the film is converted into a digital signal by a scanner or the like and the recorded data is read out from the film at the same time or by a separate readout device. A video output may be converted into a video signal conforming to the NTSC or HDTV system so that it can be displayed on a display device, or may be outputted as an image copy from a color printer.

Incidentally, in FIG. 24, reference numeral 701 denotes a photographic lens, reference numeral 702 denotes a film and reference numeral 703 denotes an electronic conversion device. In FIG. 24, the other reference numerals which are identical to those shown in FIG. 23 denote circuits having functions identical to those of the corresponding circuits shown in FIG. 23.

According to the arrangement shown in FIG. 24, the information about the shooting state is recorded on the recording medium, and the information about the distortional aberration is recorded on the data table 605 of the reproducing device. However, similarly to FIG. 23, the data table on which the information about the distortional aberration is recorded may be provided in a photographic apparatus or in a lens barrel which is separable from the photographic apparatus.

The information about the shooting state of the distortional-aberration information may be recorded not on the recording medium (film) but in another memory device of the photographic apparatus.

According to the first to fourth embodiments, since an image is corrected with an arbitrary image height from the center (optical axis) of an image plane selected as a datum, an image obtained from a photographic lens can be effectively used to photograph an image of quality which exceeds the specifications of a photographic lens.

As is apparent from the above description, according to the first to fourth embodiments, one preferred form of arrangement is provided with distortional-aberration memorizing means for memorizing distortional-aberration information about a photographic lens, state-of-photographic-lens detecting means for detecting a state of the photographic lens, distortional-aberration detecting means for detecting distortional-aberration information about distortional aberration occurring during photography, on the basis of information supplied from the state-of-photographic-lens detecting means, and image correcting means for correcting a distortion of an image due to the photographic lens with an arbitrary image height in a photographed image selected as a datum.

Another preferred form of arrangement includes an image pickup apparatus which is provided with distortional-aberration memorizing means for memorizing distortional-aberration information about a photographic lens; state-of-photographic-lens detecting means for detecting a state of the photographic lens; distortional-aberration detecting means for detecting distortional-aberration information about distortional aberration occurring during photography, on the basis of information supplied from the state-of-photographic-lens detecting means; and distortional-aberration recording means for recording the distortional-aberration information supplied from the distortional-aberration detecting means on a recording medium, and an image reproducing apparatus which is provided with distortional-aberration readout means for reading out the distortional-aberration information recorded on the recording medium and image correcting means for correcting a distortion of an image due to the photographic lens with an arbitrary image height in a photographed image selected as a datum.

Yet another preferred form of arrangement includes an image pickup apparatus which is provided with state-of-photographic-lens detecting means for detecting a state of a photographic lens; and state-of-photographic-lens information recording means for recording state-of-photographic-lens information supplied from the state-of-photographic-lens detecting means on a recording medium, and an image reproducing apparatus which is provided with state-of-photographic-lens readout means for reading out the state-of-photographic-lens information recorded on the recording medium; distortional-aberration memorizing means for memorizing distortional-aberration information about the photographic lens; distortional-aberration detecting means for detecting distortional-aberration information about distortional aberration occurring during photography, on the basis of the state-of-photographic-lens information supplied from the state-of-photographic-lens readout means; and image correcting means for correcting a distortion of an image due to the photographic lens with an arbitrary image height in a photographed image selected as a datum, on the basis of the distortional-aberration information supplied from the distortional-aberration detecting means.

According to any of the aforesaid preferred forms, the amount of distortion of an image is corrected on the basis of the distortional-aberration information about the photographic lens with an arbitrary image height from the center (optical axis) of the image plane of the photographic lens selected as a datum.

Accordingly, the image obtained from the photographic lens can be effectively used to provide an image of quality which exceeds the specifications of the photographic lens.

An embodiment of a control device will be described below which electronically corrects the distortion of an image not over the entire zoom range but in a particular zoom range in which an outstanding distortional aberration occurs, so that zoom speeds can be prevented from being substantially influenced.

FIGS. 27(*a*)-1, 27(*a*)-2, and 27(*a*)-3, and FIGS. 27(*b*)-1, 27(*b*)-2, and 27(*b*)-3 are views respectively showing the optical performance of a photographic zoom lens according to a fifth embodiment of the present invention and that of a general photographic zoom lens.

FIGS. 27(*b*)-1, 27(*b*)-2, and 27(*b*)-3, show the distortional aberration of the general zoom lens. As shown, when the zoom lens is set to a wide-angle position, a large distortional aberration occurs on the negative side, whereas when the zoom lens is set to a telephoto position, a distortional aberration occurs on the positive side.

If a zoom lens is to be designed so that requirements such as reduced size, reduced weight and compactness can be satisfied, it is extremely difficult to reduce distortional aberrations at the wide-angle end and the telephoto end of the zoom lens. For this reason, the zoom lens is generally designed in such a way that its distortional aberration is distributed so that the amount of distortional aberration at the wide-angle end and the amount of distortional aberration at the telephoto end become approximately equal to each other. As a result, the absolute amount of the distortional aberration of the zoom lens is not reduced. However, as can be seen from FIG. 27(b)-1, 27(b)-2 and 27(b)-3, although the distortional aberration is large in the neighborhood of the wide-angle end and the telephoto end, the distortional aberration occurring in a middle angle position varies substantially monotonously and is small compared to the distortional aberration occurring at either of the wide-angle end and the telephoto end.

For this reason, according to the fifth embodiment, optical design is adopted which is capable of concentrating the distortional aberration on a particular photographing position as shown in FIG. 27(a)-1, 27(a)-2, and 27(a)-3. More specifically, the design is such that, as described above, the amount of distortional aberration at the wide-angle end and the amount of distortional aberration at the telephoto end are made approximately equal to each other and the distortional aberration at middle focal lengths varies monotonously.

During a photographic operation, the photographing position of a photographic zoom lens which is being operated is detected. If it is determined that the photographing position is close to a photographing position in which a large distortional aberration occurs, which photographing position is memorized in a memory part, a geometrical deformation of an image which has occurred due to the photographic zoom lens is interpolated on the basis of image data read out from a solid-state image sensor in accordance with the geometrical deformation. Thus, the distortional aberration is corrected so that an image free of distortional aberration can be obtained.

In other words, according to the fifth embodiment, a photographing position in which correction is to be performed of distortional aberration is specified in advance, and the optical design of a zoom lens is determined while taking account of the specified photographing position. During a photographic operation, a detection is made as to the photographing position of the zoom lens which is currently being operated, and only if correction of the distortional aberration of the zoom lens is needed (in the fifth embodiment, correction is performed of a distortional aberration occurring only in the neighborhood of the wide-angle end and the telephoto end), pixel data for a plurality of lines are used to calculate the pixel signals of each scanning line affected by the geometrical deformation, thereby correcting the distortional aberration due to the photographic zoom lens. Accordingly, it is possible to achieve high image quality by using a comparatively inexpensive lens.

Figure 28:
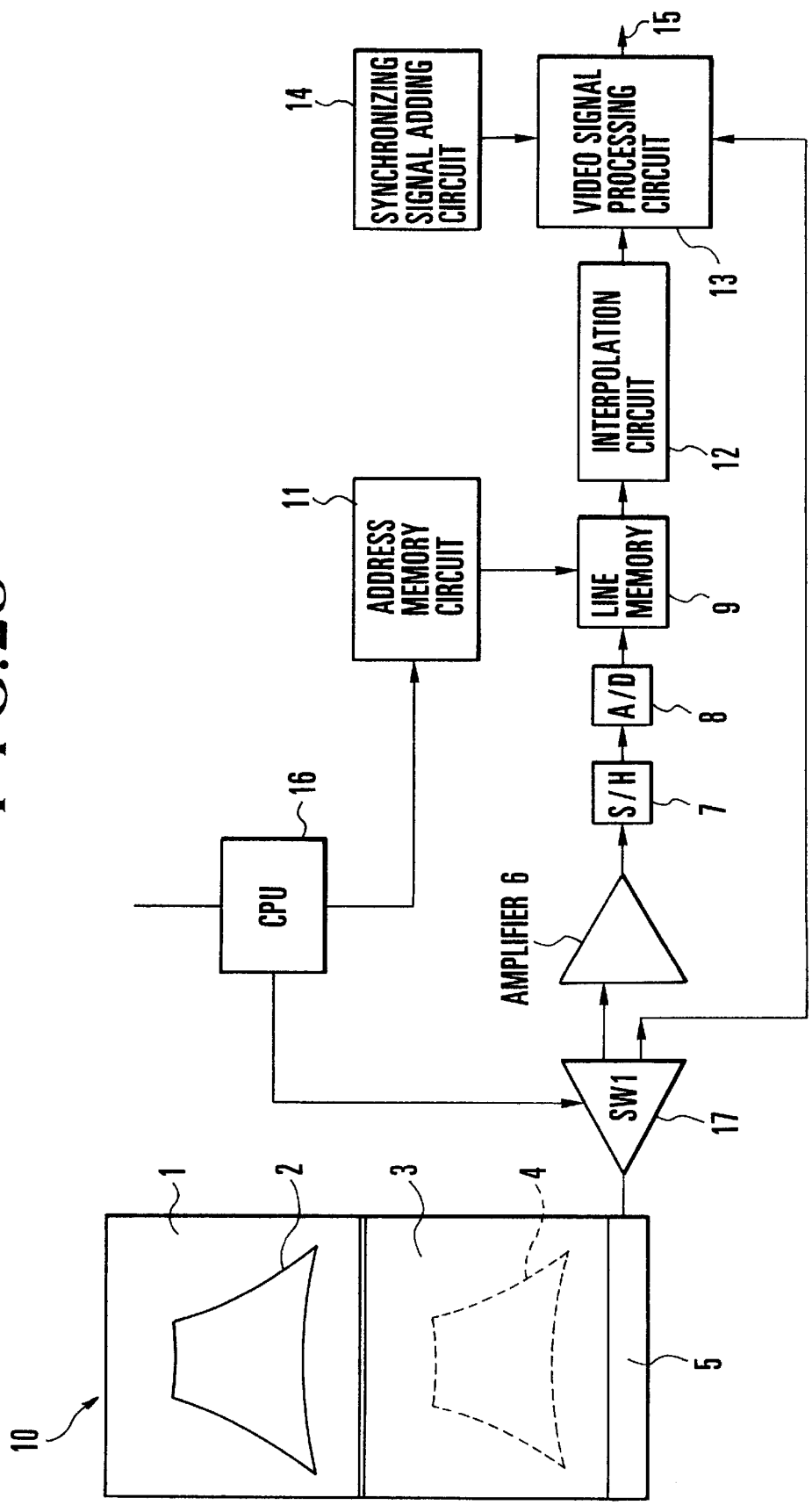
FIG. 28 is a block diagram schematically showing the arrangement of a solid-state image pickup camera according to the fifth embodiment of the present invention.

FIG. 28 is a block diagram schematically showing the arrangement of a solid-state image pickup camera provided with a photographic zoom lens having the above-described optical performance.

The arrangement shown in FIG. 28 includes a CCD 10 which is a solid-state image sensor, and the CCD 10 is made up of a photoelectric conversion part 1, a storage part 3 and a shift register 5. Reference numeral 2 denotes an example of an image pattern formed on the photoelectric conversion part 1, and reference numeral 4 denotes a charge pattern.

The shown arrangement also includes a switch 17 for selectively transmitting a signal supplied from the CCD 10, in accordance with a command from a CPU 16, an amplifier 6, a sample-and-hold (S/H) circuit 7, an analog/digital (A/D) converter 8, and a line memory 9 having a memory capacity capable of memorizing an output for several lines from the CCD 10.

An address memory circuit 11 contains two kinds of address information for use in executing readout from the line memory 9, and either of the two kinds is memorized for correction of distortional aberration at the wide-angle end, while the other kind is memorized for correction of distortional aberration at the telephoto end. The address memory circuit 11 has the function of causing the line memory 9 to send out data (information indicative of the amount of correction of distortional aberration) (by outputting address information to the line memory 9). The CPU 16 controls the operation of the present system, and applies to the switch 17 (SW1) ON-OFF information indicating whether a distortional-aberration correcting operation is to be performed, on the basis of focal length information indicative of the current focal length of a photographic zoom lens. If the distortional-aberration correcting operation is to be performed, the CPU 16 selects information indicative of the amount of correction of distortional aberration at the wide-angle or telephoto end via the address memory circuit 11, and causes the line memory 9 to send out the corresponding data.

The shown arrangement also includes an interpolation circuit 12, a video signal processing circuit 13 and a synchronizing signal adding circuit 14. Reference numeral 15 denotes a video signal outputted from the video signal processing circuit 13.

Although the operation of each of the above-described circuits is controlled by a timing controlling circuit, an illustration of the timing controlling circuit, control signals and the like is omitted for the sake of simplicity.

Figure 29:
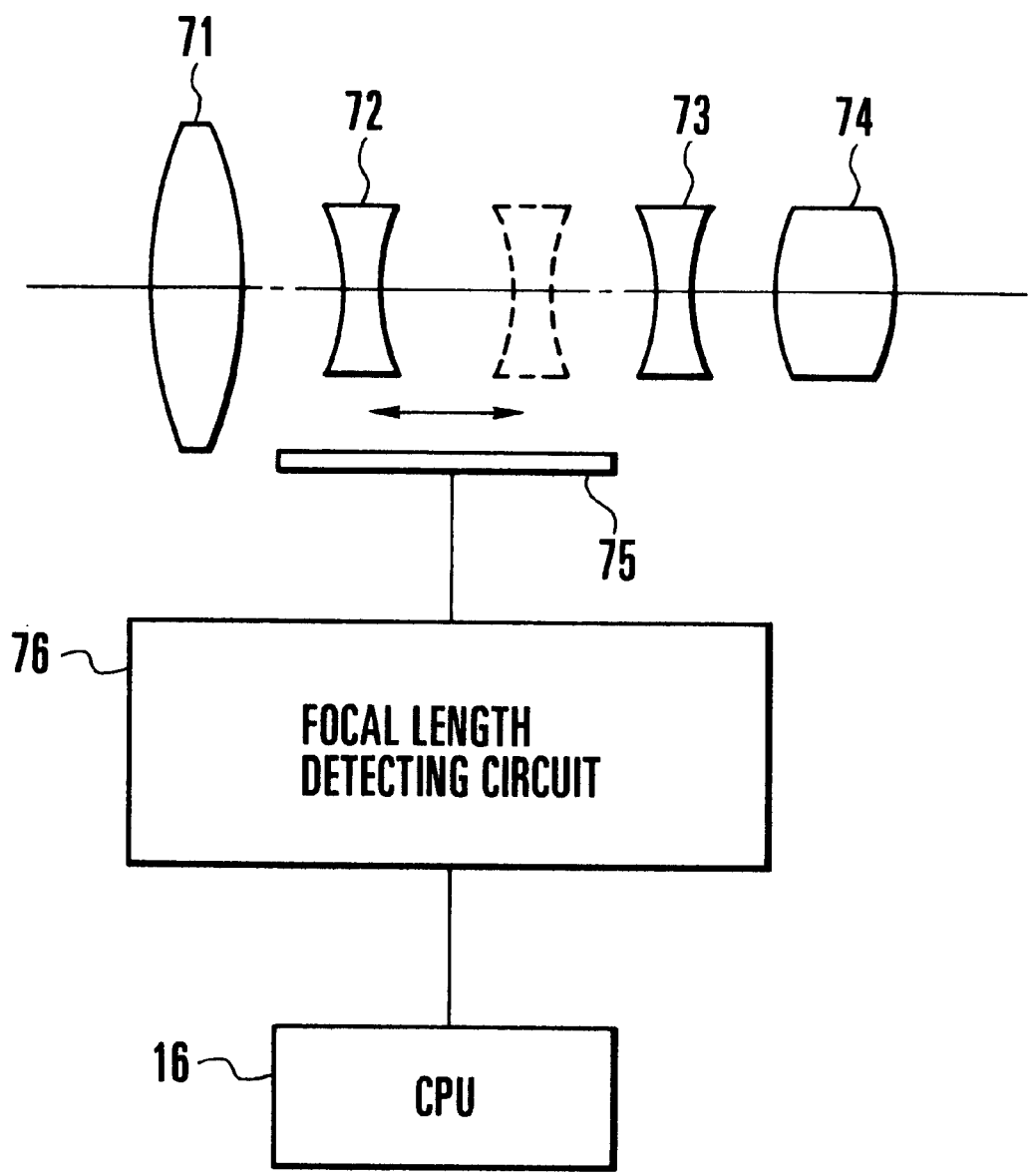
FIG. 29 is a mechanism diagram showing the photographic zoom lens and a focal length detecting part of the solid-state image pickup camera shown in FIG. 28.

FIG. 29 is a mechanism diagram showing the photographic zoom lens and a focal length detecting part of the above-described solid-state image pickup camera.

The photographic zoom lens shown in FIG. 29 includes a first lens group (focusing lens) 71 for focus adjustment, a second lens group (variator lens) 72 having a zooming function, a third lens group (compensator lens) 73 for correcting a focus position, and a fourth lens group 74 having an image forming function.

The focal length detecting part shown in FIG. 29 includes a position detector 75 for detecting the position of the variator lens 72 having the zooming function, and a focal length detecting circuit 76 for calculating a focal length from the position information supplied from the position detector 75 (position information about the variator lens 72) and sending out the resultant focal length information to the CPU 16.

Figure 30:
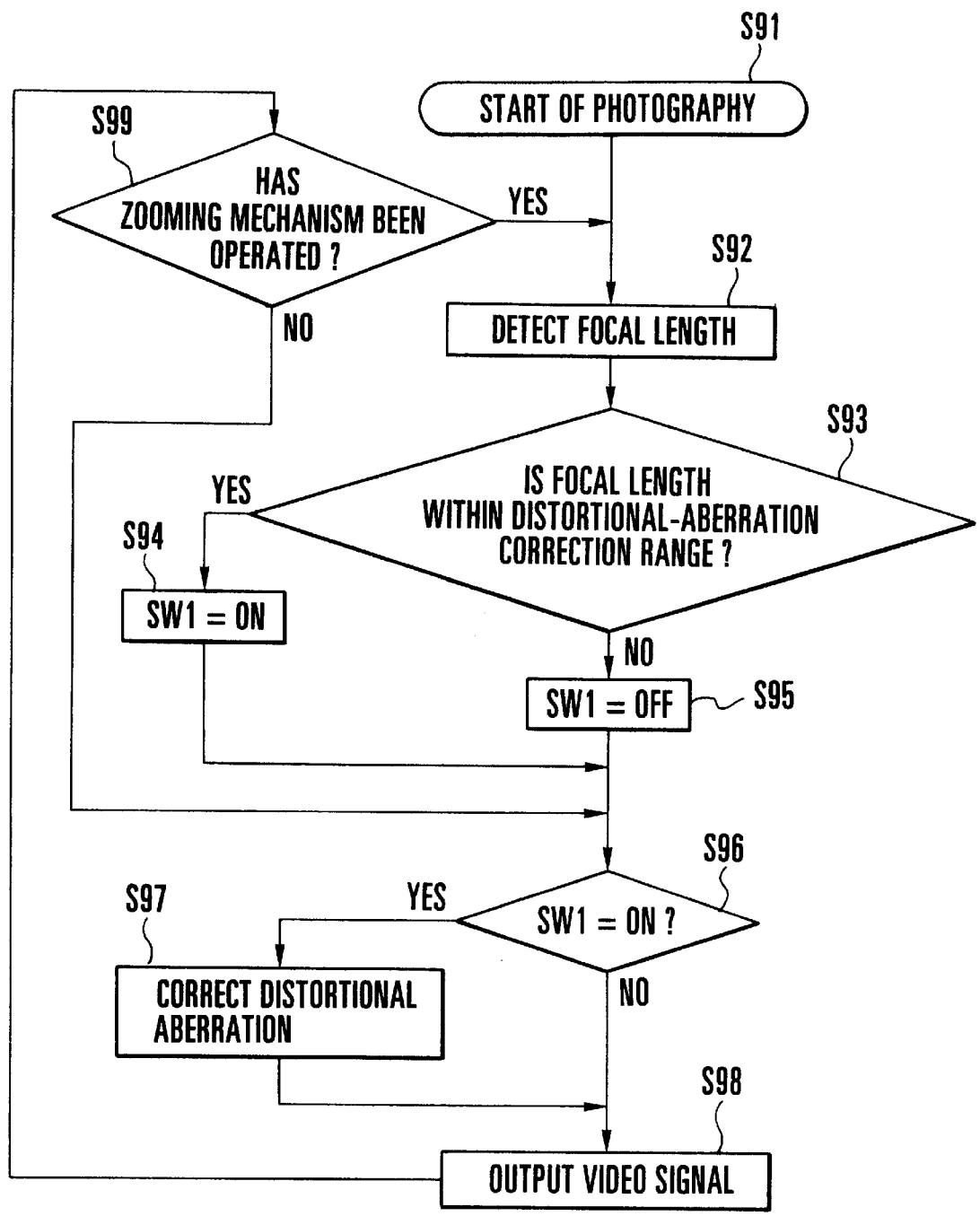
FIG. 30 is a flowchart showing the operation of the solid-state image pickup camera shown in FIG. 28.

FIG. 30 is a flowchart showing the operation of the solid-state image pickup camera according to the fifth embodiment of the present invention. The operation of the solid-state image pickup camera will be described below with reference to the flowchart.

[step S91] A photographic operation is started.

[Step S92] Focal length information is detected via the focal length detecting circuit 76, and the current focal length information is obtained.

[Step S93] It is determined whether the focal length information corresponds to a focal length which lies within a predetermined distortional-aberration correction range in the neighborhood of the wide-angle end or the telephoto end. If the focal length information corresponds to the focal length which lies within the predetermined distortional-aberration correction range, the process proceeds to Step S94. Otherwise, the process proceeds to Step S95.

[Step S94] Since the current focal length information about the photographic zoom lens (to be exact, the variator lens 72) corresponds to the focal length which lies within the predetermined distortional-aberration correction range, a variable SW1 is turned on. Thus, the switch Sw1 is turned on and a signal from the CCD 10 is coupled to the amplifier 6.

[Step S95] Since the current focal length information about the photographic zoom lens corresponds to a focal length which lies outside the predetermined distortional-aberration correction range, the variable SW1 is turned off. Thus, the switch SW1 is turned off and a signal from the CCD 10 is directly coupled to the video signal processing circuit 13.

[step S96] It is determined whether the variable SW1 is on or off. If it is on, the process proceeds to Step S97, whereas if it is off, the process proceeds to Step S98.

[Step S97] A distortional-aberration correcting circuit which is made up of the amplifier 6, the circuit 7, the A/D converter 8, the line memory 9 and the interpolation circuit 12 is activated to perform distortional-aberration correction on the basis of the signal from the CCD 10 and address information from the address memory circuit 11. (The operation of each of these circuits will be described later in detail.) Then, the process proceeds to Step S98.

[Step S98] The video signal processing circuit 13 is operated to generate a video signal on the basis of the signal from the aforementioned distortional-aberration correcting circuit or the CCD 10, and outputs the video signal.

[Step S99] It is determined whether an operation of a zooming mechanism has been performed. If the operation of the zooming mechanism has been performed, there is a possibility that the zooming mechanism may have been operated during the above-described computations and the focal length may have been varied from that obtained in Step S92. Accordingly, the process returns to Step S92 in which focal length information is newly detected, and the operations subsequent to Step S92 are performed. On the other hand, if the operation of the zooming mechanism has not been performed, it is determined that the focal length has not varied, and the process returns to Step S96 and the operations subsequent to Step S96 is performed.

Figure 31:
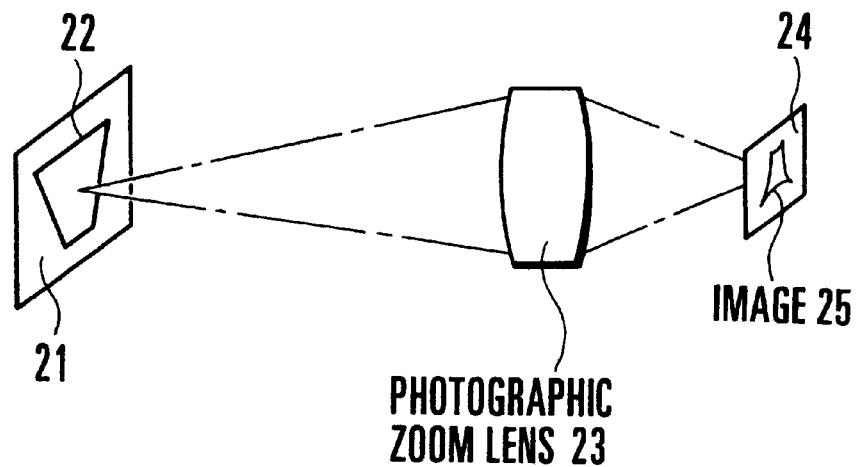
FIG. 31 is a schematic view which serves to explain the operation of the photographic zoom lens shown in FIG. 28.

FIG. 31 is a schematic diagram which serves to explain the operation of the photographic zoom lens.

In FIG. 31, reference numeral 21 denotes an object plane, and reference numeral 22 denotes an object. Reference numeral 23 denotes the photographic zoom lens made up of the aforementioned lens groups shown in FIG. 29. Reference numeral 24 denotes an image surface, and reference numeral 25 denotes an image.

An image of the object 22 in the object plane 21 is formed as the image 25 on the image surface 24 by the photographic zoom lens 23. The CCD 10 which is the solid-state image sensor is disposed on the image surface 24 for performing photoelectric conversion of the image 25. The photographic zoom lens 23 has a distortional aberration which is set to a value larger than a normal allowable value. Accordingly, the image 25 is distorted compared to the object 22 as shown in FIG. 31.

However, in lens design, it is well known that if the allowable value of a particular aberration is made greater than those of the other aberrations, it is possible to facilitate correction of the other aberrations. Accordingly, it is possible to achieve various advantages such as a reduction in the size of the photographic zoom lens 23, a reduction in the number of lens elements to be incorporated therein, and utilization of an inexpensive glass material.

Referring again to FIG. 28, the image pattern 2 corresponding to the image 25 formed by the photographic zoom lens 23 is produced on the photoelectric conversion part 1 of the CCD 10. The CCD 10 used in the fifth embodiment is of a frame transfer type. More specifically, the image pattern 2 obtained by photoelectric conversion in the photoelectric conversion part 1 is transferred to the storage part 3 as the charge pattern 4, and the charge pattern 4 is read out by the shift register 5 on line-by-line basis.

Figure 32:
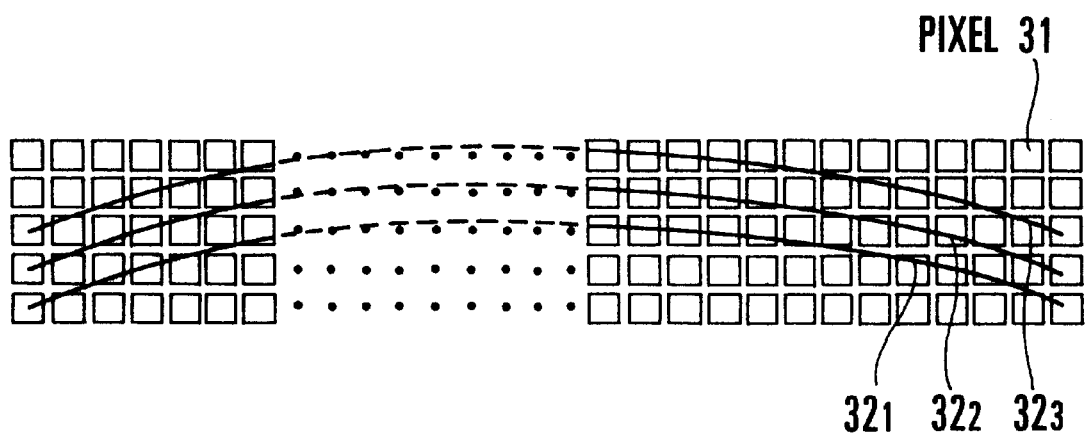
FIG. 32 is a schematic diagram showing the relationship between the pixels of a CCD and an image formed thereon.

FIG. 32 is a schematic diagram showing the relationship between the image and the CCD.

In FIG. 32, reference numeral 31 denotes each pixel of the CCD 10, and reference numerals $32_1$, $32_2$ and $32_3$ denote first, second and third scanning lines, respectively.

The first to third scanning lines $32_1$, $32_2$ and $32_3$ represent the first three scanning lines. Although they should originally constitute straight lines, they are formed as curved lines by the influence of distortional aberration. In other words, the shape of each of these curved lines corresponds to the shape of a curved line which occurs due to distortional aberration when an image of a horizontal straight line which extends in the object plane 21 of the photographic zoom lens 23 is formed on the image surface 24.

The charge pattern 4 is sequentially read out on line-by-line basis and on pixel-by-pixel basis for each line. Regarding the manner of reading out the pixels 31, the rightmost pixel on the lowermost line (as viewed in FIG. 32) is first read out, and the left-hand adjacent pixel is then read out. Thus, the pixels for one line are sequentially read out. Then, the pixel signals on the second lowermost line are sequentially read out from the rightmost pixel. A similar readout operation is performed on the third lowermost line et seqq.

Referring to FIG. 28, the pixel signals read out from the shift register 5 of the CCD 10 are, as described above, directly sent to the video signal processing circuit 13 if the switch SW1 is off.

If the switch SW1 is on, the switch SW1 outputs the pixel signals to the distortional-aberration correcting circuit. That is to say, the pixel signals are amplified by the amplifier 6, and the amplified pixel signals are held in the S/H circuit 7. The output from the S/H circuit 7 is digitized by the A/D converter 8, and the digital output from the A/D converter 8 is supplied to and memorized in the line memory 9. The pixel signals for a plurality of lines of the CCD 10 are stored in the line memory 9 before a readout operation is started. This storing operation is carried out to read out pixel signals along a curved scanning line because the curved scanning line extends across a plurality of pixel lines.

The CCD 10 sends the kind of data required for distortional-aberration correction to the address memory circuit 11 on the basis of focal length information about the photographic zoom lens 23, and the address memory circuit 11 reads out shape data about a scanning line and generates address information for use in reading out the pixel signals memorized in the line memory 9. The shape data about the scanning line may be obtained by directly sampling the scanning line, or may be obtained as a coefficient by performing appropriate approximation using a function. The shape data about the scanning line which corresponds to the state of the photographic zoom lens 23 is obtained during the process of designing the photographic zoom lens 23 or by optical measurement performed after a trial production.

Since the positions of pixels at the CCD 10 generally do not coincide with those of pixels on such curved scanning lines, the positions of the pixels on the curved scanning line need to be subjected to interpolation processing. Accordingly, data for a plurality of pixels are read out from the line memory 9 and supplied to the interpolation circuit 12, in which the value of one pixel on the scanning line is calculated.

The memory capacity of the line memory 9 is determined in the following manner.

Figure 33:
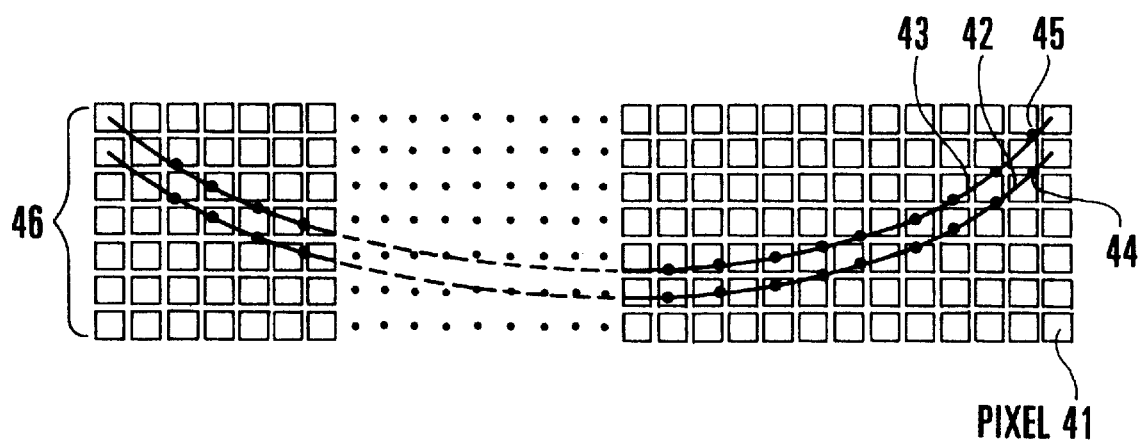
FIG. 33 is a schematic view showing the relationship between pixels of the line memory shown in FIG. 28 and scanning lines.

FIG. 33 is a view showing the relationship between the pixels of the line memory 9 and the scanning line.

In FIG. 33, each pixel is denoted by reference numeral 41. The pixels 41 correspond to the pixels of the CCD 10 in one-to-one relation. Reference numeral 42 denotes the most curved scanning line, i.e., a scanning line which extends across a greater number of pixel lines of the line memory 9 than any other scanning line. Reference numeral 43 denotes a scanning line next to the most curved scanning line 42. Reference numeral 44 denotes each pixel of the most curved scanning line 42, and reference numeral 45 denotes each pixel of the scanning line 43 next to the scanning line 42. In the shown example, it is necessary to calculate the values of pixel data at the position of each pixel 44 represented as a black dot on the most curved scanning line 42 and at the position of each pixel 45 represented as a black dot on the next scanning line 45.

The size of the line memory 9 is indicated at 46. The size 46 of the line memory 9 is selected as a memory capacity capable of memorizing data indicative of the pixels 31 of the CCD 10 which can be used to calculate the values of all the pixels 44 of the most curved scanning line 42. In other words, the size 46 of the line memory 9 corresponds to the number of lines obtained by adding, if necessary, the number of adjacent lines required for interpolation processing to the number of the pixels 31 of the CCD 10 across which the most curved scanning line 42 extends. Of course, the size 46 of the line memory 9 may be greater than the aforesaid number of lines.

If the line memory 9 has a memory capacity for the size 46, the values of all the pixels 44 on the most curved scanning line 42 can be calculated from the pixels 41 of the line memory 9.

When the values of the pixels 45 on the next scanning lines 43 are to be calculated, the pixel data on the lowermost line in the line memory 9 are discarded and the next line which has not yet memorized in the line memory 9, for example, pixel data on the uppermost line in FIG. 32, are read from the CCD 10. Since the size 46 of the line memory 9 is selected so that the line memory 9 can memorize a sufficient amount of pixel data 41 to calculate the values of all the pixels on any scanning line, the values of all the pixels 45 on the next scanning line 43 are also calculated. Similarly, the values of all the pixels on the other scanning lines are calculated.

If the shape of a scanning line differs from the above-described one, it may not be necessary to read out new pixel data before calculating the values of the pixels, or it may be necessary to read out pixel data for two or more lines. A timing controlling circuit (not shown) adjusts the manner of reading out pixel data in response to a signal from the address memory circuit 11. If the final output signal of the solid-state image pickup camera is a video signal, it is necessary to output pixel data for each line on line-by-line basis at intervals of a predetermined time period. Accordingly, as the case may be, it is also preferable to adopt an arrangement in which the line memory 9 is provided with a buffer memory for timing adjustment.

The interpolation processing performed by the interpolation circuit 12 will be described below with reference to FIG. 34.

Figure 34:
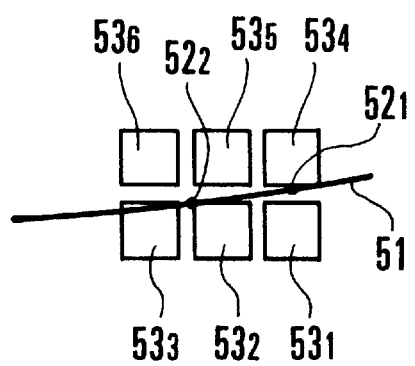
FIG. 34 is a schematic view showing interpolation processing performed by the interpolation circuit shown in FIG. 28.

In FIG. 34, reference numeral $52_1$ denotes a scanning line, and reference numerals $52_2$ and $53_5$ denote pixels of the scanning line $52_1$. Reference numerals $53_1$ $53_2$, . . . , $53_5$ denote pixels of the line memory 9.

To calculate the values of the pixels of the scanning line 51, since the positions of the pixels $52_1$ and $52_2$ differ from those of the pixels $53_1$ to $53_5$ of the line memory 9, it is necessary to calculate the values of the pixels $52_1$ and $52_2$ as interpolated values. The simplest method is to select pixels closest to the respective pixels $52_1$ and $52_2$ from the pixels $53_1$ to $53_5$ of the line memory 9 and obtain the values of the closest pixels as the values of the pixels $52_1$ and $52_2$. Specifically, the values of the pixels $52_1$ and $52_2$ of the scanning line 51 are respectively obtained as the values of the pixels $53_4$ and $53_2$ of the line memory 9. It is also preferable to adopt an arrangement in which, in the above-described processing, the address memory circuit 11 is made to determine appropriate addresses so that the interpolation processing is performed during a readout from the line memory 9. With such an arrangement, the special interpolation circuit 12 can be omitted.

Another approximation method is to calculate interpolated values from adjacent four pixels in the line memory 9 by linear approximation. Specifically, the values of the pixels $52_1$ and $52_2$ of the scanning line 51 are respectively calculated by sending the four pixels $53_1$, $53_2$, $53_4$, $53_5$ and the four pixels $53_2$, $53_3$, $53_5$, $53_4$ to the interpolation circuit 12 and performing linear approximation using the corresponding four pixels.

Still another approximation method is a "cubic convolution method". The cubic convolution method is a method of performing interpolation on the basis of the value of neighboring pixels by using a cubic spline curve. In this method, sixteen neighboring pixels are needed for calculation of one pixel.

Referring again to FIG. 28, the output signal from the interpolation circuit 12 is sent to the video signal processing circuit 13, in which the signal is converted into a signal of predetermined format, such as an NTSC television signal or a high-definition television signal. A synchronizing signal is supplied from the synchronizing signal adding circuit 14 to the video signal processing circuit 13, whereby a final video signal is formed. The video signal 15 outputted from the video signal processing circuit 13 is displayed on a monitor, supplied to the succeeding processing circuit, and so on, according to the entire system arrangement.

Distortional-aberration correcting processing will be described below with reference to FIG. 35.

In FIG. 35, an object is indicated by reference numeral 61, and an image of the object 61 is indicated by reference numeral 62. The image 62 is obtained through the photographic zoom lens 23, and a charge pattern on the CCD 10 also has the same shape as the image 62. Reference numeral 63 denotes an image formed by an output video signal.

In FIG. 35, the three patterns 61, 62 and 63 are exaggeratedly depicted in such a manner that the relationship in size between the three patterns 61, 62 and 63 differs from the relationship between the actual scales of them.

The image 62 is distorted with respect to the object 61 by the distortional aberration of the photographic zoom lens 23. However, since distortional-aberration correction is electrically performed as described previously, the image 63 formed by the output video signal 15 is obtained as an image similar to the object 61 as shown in FIG. 35.

FIGS. 36(a)–36(c) are views showing one example of the optical performance of a photographic zoom lens used in a sixth embodiment of the present invention.

As shown in FIGS. 36(a)–36(c), the photographic zoom lens used in the sixth embodiment has a distortional aberration the amount of which is extremely large at its wide-angle end and approximately equivalent at the telephoto end and the middle angle position. The distortional aberration monotonously varies over the focal lengths between the middle angle position and the telephoto end. For this reason, in the sixth embodiment, correction is performed of a distortional aberration occurring in the neighborhood of the wide-angle end.

FIGS. 37(a)–37(c) are views showing one example of a variation in distortional aberration depending on shooting distance in the neighborhood of the wide-angle end. FIGS. 37(a)–37(c) show from the left-hand side distortional aberrations occurring in photography at infinity, at an object distance of 3 m, and at the shortest shooting distance (1.2 m).

It is understood from FIGS. 37(a)–37(c) that even if the same focal length is selected, the distortional aberration greatly varies depending on the shooting distance. For this reason, in the sixth embodiment, as will be described below, not only focal length information but also shooting distance information is used as discrimination information for distortional-aberration correction.

Figure 38:
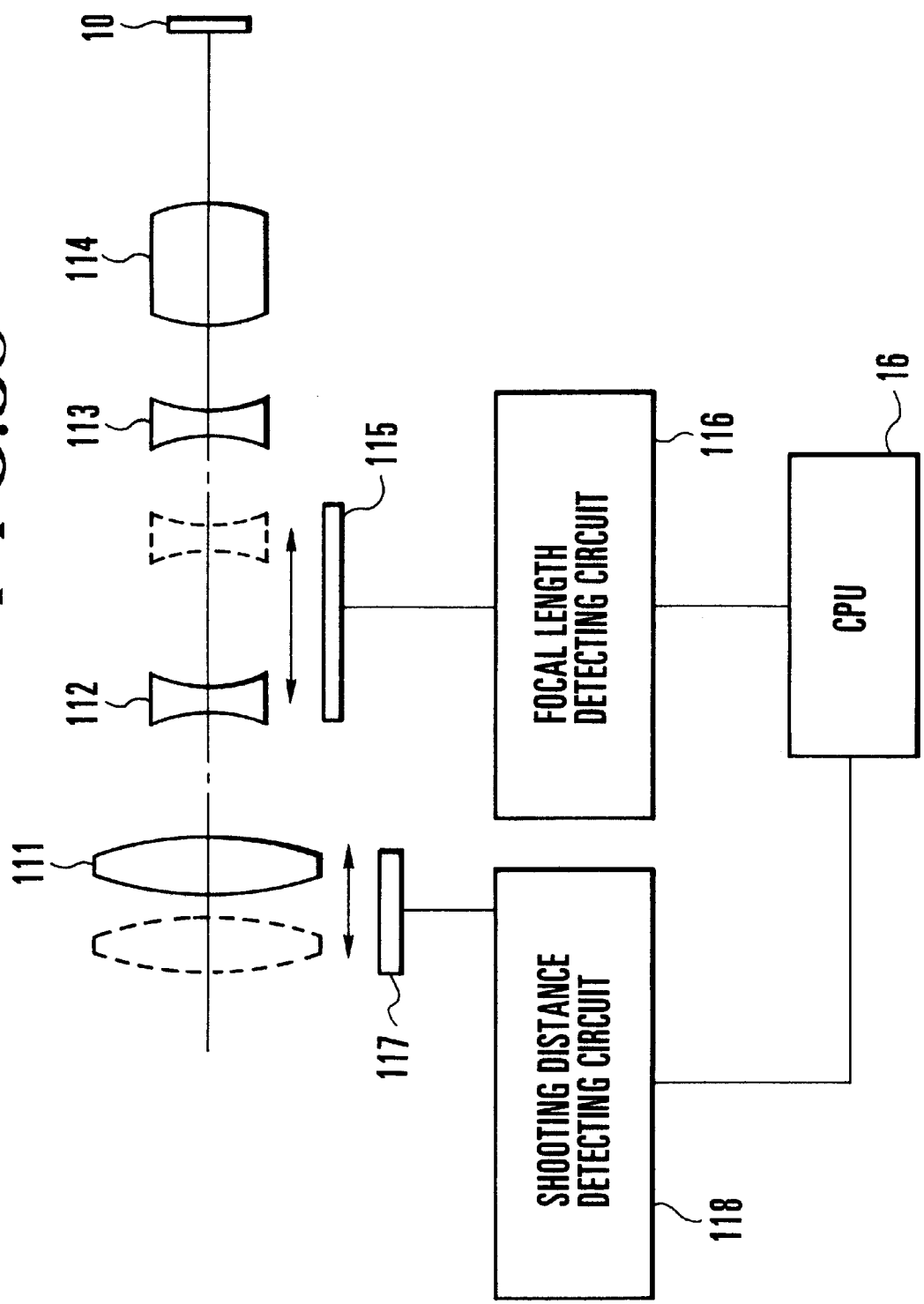
FIG. 38 is a block diagram schematically showing the focal length detecting part and the shooting distance detecting part of a solid-state image pickup camera according to the sixth embodiment of the present invention.

FIG. 38 is a block diagram schematically showing the focal length detecting part and the shooting distance detecting part of a solid-state image pickup camera according to the sixth embodiment of the present invention. Since the arrangement of the other constituent elements is similar to that shown in FIG. 28, an illustration thereof is omitted.

The photographic zoom lens shown in FIG. 38 includes a first lens group (focusing lens) 111 having a focus-position adjusting function, a second lens group (variator lens) 112 having a zooming function, a third lens group (compensator lens) 113 having a focus-position correcting function, and a fourth lens group 114 having an image forming function.

The arrangement shown in FIG. 29 also includes a detector 115 for detecting the position of the variator lens 112, and a focal length detecting circuit 116 for calculating a focal length from the position of the variator lens 112 and sending out the resultant focal length information to the CPU 16, a detector 117 for detecting the position of the focusing lens 111, and a shooting distance detecting circuit 118 for calculating a shooting distance from the position of the focusing lens 111 and sending out the resultant shooting distance information to the CPU 16.

Figure 39:
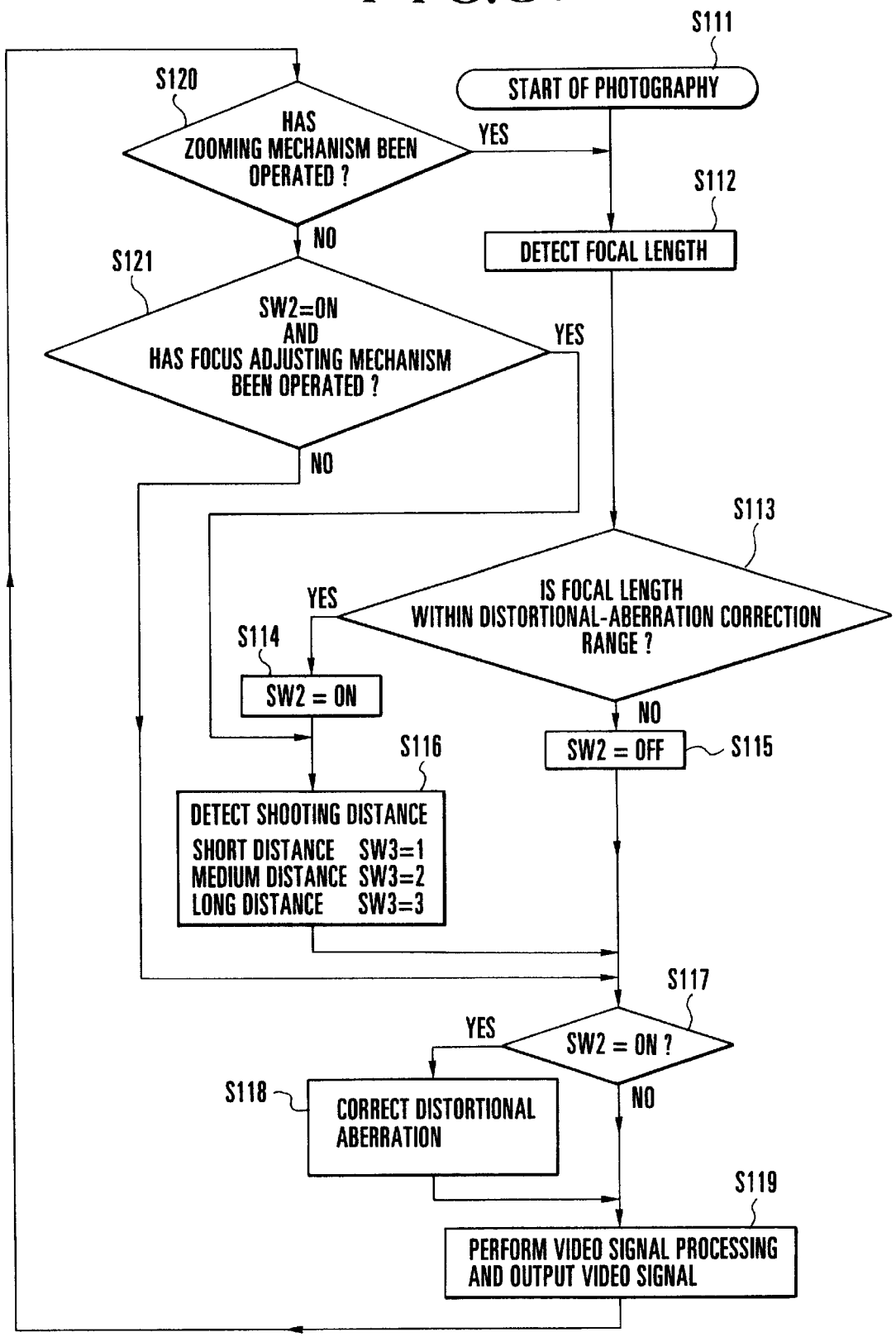
FIG. 39 is a flowchart showing the operation of the solid-state image pickup camera shown in FIG. 38.

FIG. 39 is a flowchart showing the operation of the above-described solid-state image pickup camera. The operation thereof will be described below with reference to the flowchart.

[Step S111] A photographic operation is started.

[Step S112] Detection of a focal length is performed by the focal length detecting circuit 116, and the current focal length information is obtained.

[Step S113] It is determined whether the focal length information corresponds to a focal length which lies within a predetermined distortional-aberration correction range in the neighborhood of the wide-angle end. If the focal length information corresponds to the focal length which lies within the predetermined distortional-aberration correction range, the process proceeds to Step S114. Otherwise, the process proceeds to Step S115.

[Step S114] Since the current focal length information about the photographic zoom lens (to be exact, the variator lens 112) corresponds to the focal length which lies within the predetermined distortional-aberration correction range, a variable SW2 is turned on. Thus, the switch SW2 is turned on and a signal from the CCD 10 is coupled to the amplifier 6. Then, the process proceeds to Step S116.

[Step S115] Since the current focal length information about the photographic zoom lens corresponds to a focal length which lies outside the predetermined distortional-aberration correction range, the variable SW2 is turned off. Thus, the switch SW2 is turned off and a signal from the CCD 10 is directly coupled to the video signal processing circuit 13. Then, the process proceeds to Step S117.

[Step S116] The current shooting distance information is detected by the shooting distance detecting circuit 118, and it is determined to which of a predetermined shooting distance zone the shooting distance corresponds. The result of this decision is memorized as a variable SW3. Then, the process proceeds to Step S117.

In Step S116, a decision result indicative of short distance is memorized as the variable SW3=1, a decision result indicative of medium distance is memorized as the variable Sw3=2, and a decision result indicative of long distance is memorized as the variable SW3=3.

[Step S117] It is determined whether the variable SW2 is on or off. If it is on, the process proceeds to Step S118, whereas if it is off, the process proceeds to Step S119.

[Step S118] The distortional-aberration correcting circuit which is made up of the amplifier 6, the circuit 7, the A/D converter 8, the line memory 9 and the interpolation circuit 12 is activated to perform distortional-aberration correction on the basis of the signal from the CCD 10 and address information selected on the basis of the shooting distance data (the kind of signal of the variable SW3). Then, the process proceeds to Step S119.

[Step S119] The video signal processing circuit 13 is operated to generate a video signal on the basis of the signal from the aforementioned distortional-aberration correcting circuit or the CCD 10, and outputs the video signal. Then, the process proceeds to Step S120.

[Step S120] It is determined whether an operation of a zooming mechanism has been performed. If the operation of the zooming mechanism has been performed, there is a possibility that after the video signal has been outputted, the zooming mechanism may have been operated to vary the focal length. Accordingly, the process returns to Step S112 in which focal length information is newly detected, and the operations subsequent to Step S112 are performed. On the other hand, if the operation of the zooming mechanism has not been performed, the process proceeds to Step S121.

[Step S121] It is determined whether the variable SW2 is on (i.e., whether the focal length is within the distortional-aberration correction range) and whether a focus adjusting mechanism is in operation. If both conditions are satisfied, the process proceeds to Step S116. If both conditions are not satisfied, the process proceeds to Step S117 and the operations subsequent to Step S117 are performed.

The above-described operations are repeatedly performed.

According to the above-described fifth and sixth embodiments, during optical design, the photographic zoom lens is designed so that photographic conditions under which to perform distortional-aberration correction during photography are restricted to extremely limited photographic patterns selected from all possible photographic patterns. During photography, the photographing position of the photographic zoom lens which is being operated is detected, and only when distortional-aberration correction is needed, i.e., only when the focal length is within the distortional-aberration correction range, correction is performed of a distortional aberration due to the photographic zoom lens. Accordingly, it is possible to reduce the scale of a signal processing circuit which is used for performing the distortional-aberration correction during photography, and it is possible to materially improve the signal processing capability to perform various signal processings during photography. Further, it is possible to design a light-weight, compact photographic zoom lens which uses a reduced number of lens elements, whereby it is possible to provide a far more inexpensive solid-state image pickup camera of further reduced size.

FIG. 31 is a schematic diagram showing a photographic zoom lens according to a seventh embodiment of the present invention.

In FIG. 31, reference numeral 21 denotes an object plane, and reference numeral 22 denotes an object. Reference numeral 23 denotes the photographic zoom lens made up of the aforementioned lens groups shown in FIG. 29. Reference numeral 24 denotes an image surface, and reference numeral 25 denotes an image.

An image of the object 22 in the object plane 21 is formed as the image 25 on the image surface 24 by the photographic zoom lens 23. A CCD 216 which is a solid-state image sensor to be described later is disposed on the image surface 24 for performing photoelectric conversion of the image 25. The photographic zoom lens 23 has a distortional aberration which is set to a value larger than a normal allowable value. Accordingly, the image 25 is distorted compared to the object 22 as shown in FIG. 31.

However, in lens design, it is well known that if the allowable value of a particular aberration is made greater than those of the other aberrations, it is possible to facilitate correction of the other aberrations. Accordingly, it is possible to achieve various advantages such as a reduction in the size of the photographic zoom lens 23, a reduction in the number of lens elements to be incorporated therein, and utilization of an inexpensive glass material.

Figure 40:
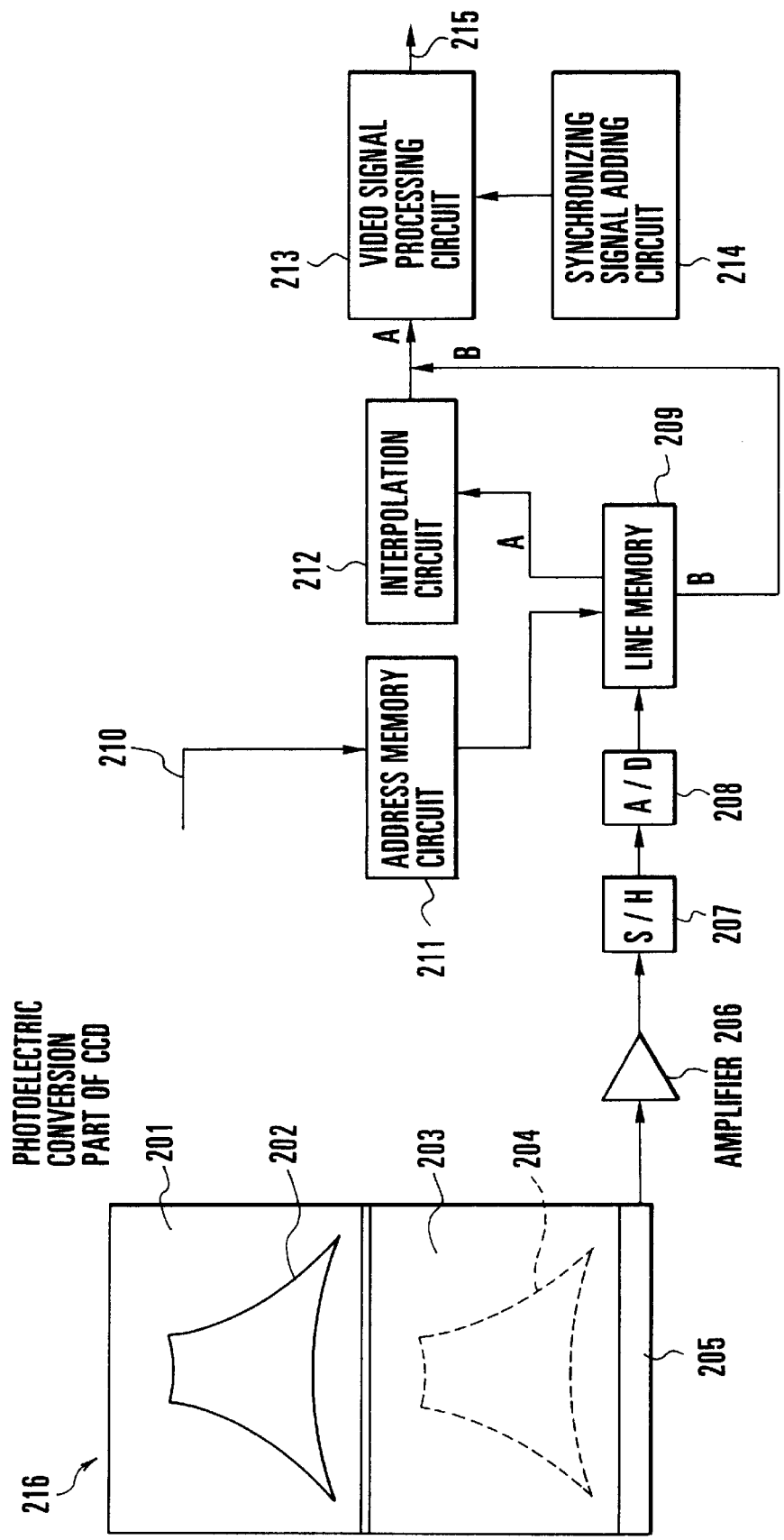
FIG. 40 is a block diagram schematically showing the arrangement of a solid-state image pickup camera according to a seventh embodiment of the present invention.

FIG. 40 is a block diagram schematically showing the arrangement of a solid-state image pickup camera provided with the above-described photographic zoom lens.

The arrangement shown in FIG. 40 includes the CCD 216 which is a solid-state image sensor, and the CCD 216 is made up of a photoelectric conversion part 201, a storage part 203 and a shift register 205. Reference numeral 202 denotes an example of an image pattern formed on the photoelectric conversion part 201, and reference numeral 204 denotes a charge pattern.

The shown arrangement also includes an amplifier 206, a sample-and-hold (S/H) circuit 207, an analog/digital (A/D) converter 208, and a line memory 209 having a memory capacity capable of memorizing an output for several lines from the CCD 216. A lens state signal 210 indicates the current state of the photographic zoom lens 23 (i.e., the lens state), and contains information about the state of zooming, the state of focus, a zooming speed and the like. The shown arrangement also includes an address memory circuit 211 for outputting address information for use in executing readout from the line memory 209, an interpolation circuit 212, a video signal processing circuit 213 and a synchronizing signal adding circuit 214. An output video signal is denoted by reference numeral 215.

Although the operation of each of the above-described circuit elements is controlled by a timing controlling circuit, an illustration of the timing controlling circuit, control signals and the like is omitted for the sake of simplicity.

The operation of the above-described solid-state image pickup camera will be described below.

Referring to FIG. 40, signals indicative of pixels of the CCD 216, which are read out from the shift register 205, are amplified by the amplifier 206. The amplified signals are supplied to and held by the S/H circuit 207. The output from the S/H circuit 207 is digitized by the A/D converter 208, and the digital output from the A/D converter 208 is supplied to and memorized in the line memory 209. The signals for a plurality of lines of the CCD 216 are stored in the line memory 209 before a readout operation is started. This storing operation is carried out to read out pixel signals along a curved scanning line because the curved scanning line extends across a plurality of pixel lines. If the lens state signal 210 is inputted to the address memory circuit 211, the address memory circuit 211 can detect the current lens state.

The address memory circuit 211 includes a built-in ROM (read-only memory) in which shape data about scanning lines corresponding to various lens states are memorized. The shape data about scanning lines corresponding to various lens states may be obtained by directly sampling the scanning lines, or may be obtained as a coefficient by performing appropriate approximation using a function. The shape data about the scanning lines which correspond to the states of the photographic zoom lens 23 are obtained during the process of designing the photographic zoom lens 23 or by optical measurement performed after a trial production.

If zooming is inoperative, the address memory circuit 211 reads out data from the aforesaid ROM in accordance with the state of the photographic zoom lens 23, and generates from the read-out data an address for reading out a pixel signal from the line memory 209. The read-out pixel signal is outputted to the video signal processing circuit 213 as a corrected version of the signal obtained at the CCD 216.

Since the positions of pixels obtained at the CCD 216 generally do not coincide with those of pixels on a curved scanning line, the positions of the pixels on the curved scanning line need to be subjected to interpolation processing. Accordingly, data for a plurality of pixels are read out from the line memory 209 and supplied to the interpolation circuit 212, in which the value of one pixel on the scanning line is calculated.

Figure 41:
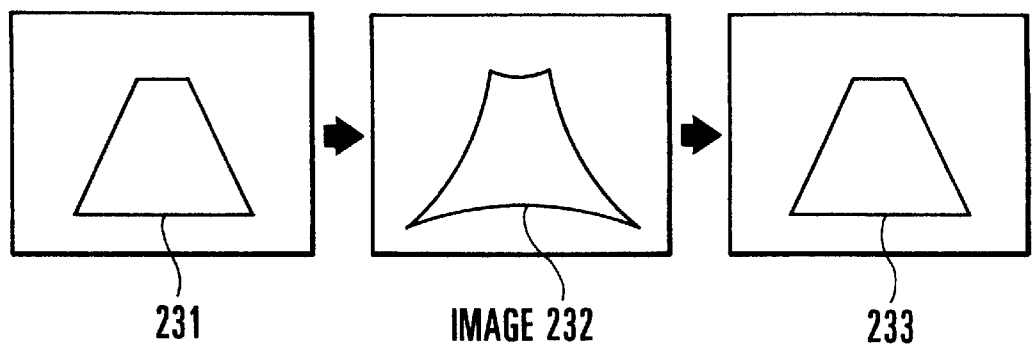
FIG. 41 is a view which serves to explain distortional-aberration correcting processing according to the seventh embodiment of the present invention.

FIG. 41 is an explanatory view of distortional-aberration correcting processing.

In FIG. 41, an object is indicated by reference numeral 231, and an image of the object 231 is indicated by reference numeral 232. The image 232 is obtained through the photographic zoom lens 23, and a charge pattern on the CCD 216 also has the same shape as the image 232. Reference numeral 233 denotes an image formed by the output video signal 215.

In FIG. 41, the three patterns 231, 232 and 233 are exaggeratedly depicted in such a manner that the relationship in size between the three patterns 231, 232 and 233 differs from the relationship between the actual scales of them.

The image 232 is distorted with respect to the object 231 by the distortional aberration of the photographic zoom lens 23. However, since distortional-aberration correction is electrically performed as described previously, the image 233 formed by the output video signal 15 is obtained as an image similar to the object 231 as shown in FIG. 41.

During a zooming operation, the above-described image-distortion correcting data which is part of the ROM data is not used and, hence, no interpolation is performed, so that a distorted image obtained at the CCD 216 is outputted along a path B.

Figure 42:
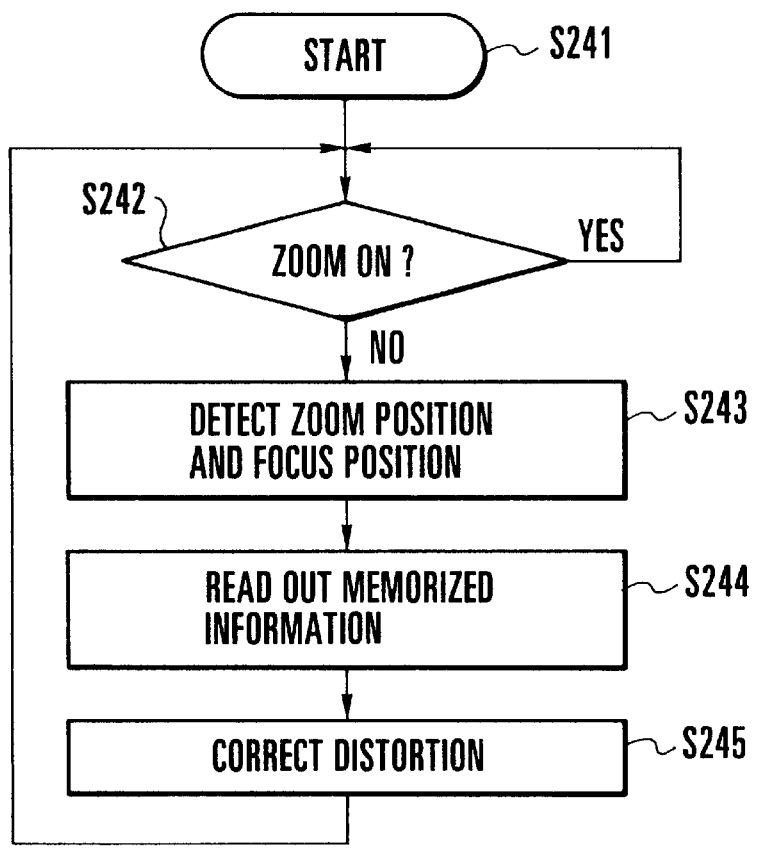
FIG. 42 is a flowchart showing the distortion correcting operation of the solid-state image pickup camera according to the seventh embodiment of the present invention.

The above-described distortion correcting operation will be described below with reference to the flowchart of FIG. 42.

[step S241] A photographic operation is started.

[Step S242] It is determined whether the zoom is on or off. If the zoom is on, since no distortion correction is performed, the process stays in Step S242. If the zoom is off, the process proceeds to Step S243 to perform distortion correction.

[Step S243] A zoom position and a focus position are detected, and the process proceeds to Step S244.

[Step S244] Shape data about a scanning line which corresponds to the aforesaid lens state is taken out, and the process proceeds to Step S245.

[Step S245] Interpolation processing is performed on the basis of the shape data about the scanning line, thereby performing the distortion correction.

It is to be noted that although the distortional aberration has been referred to herein as a geometrical distortion by way of example, the seventh embodiment can, of course, be applied to another kind of geometrical aberration.

It is also preferable to adopt an arrangement in which when the zoom is on, an image formed at the CCD 216 is directly outputted to the video signal processing circuit 213 by an analog circuit.

According to the above-described seventh embodiment, since no distortion correction is performed during a zooming operation, it is possible to achieve simplified computing processing and rapid zooming.

Figure 43:
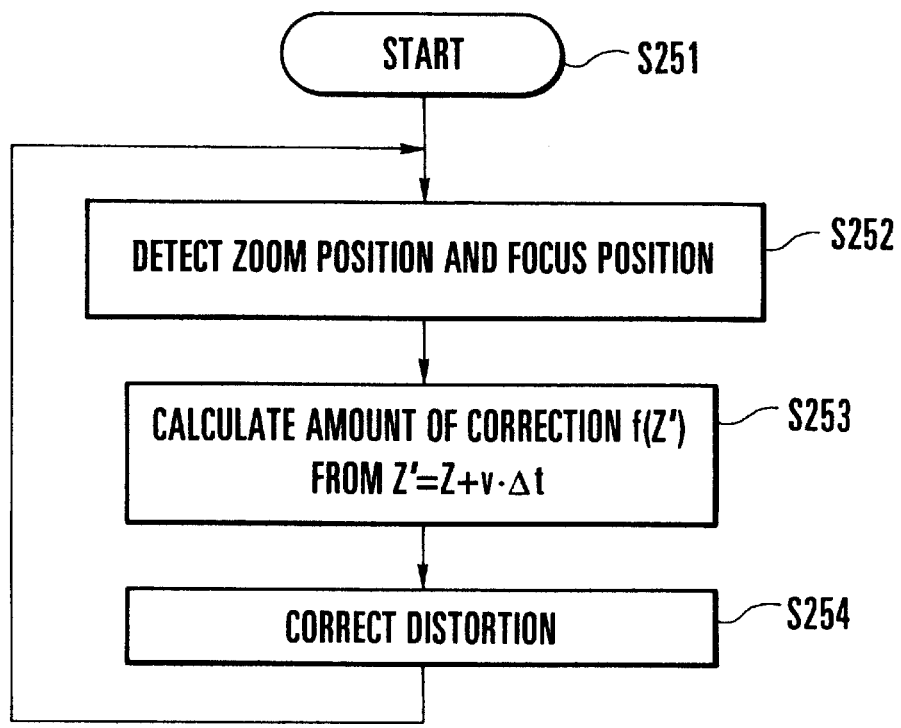
FIG. 43 is a flowchart showing the distortion correcting operation of a solid-state image pickup camera according to an eighth embodiment of the present invention.
Figure 44:
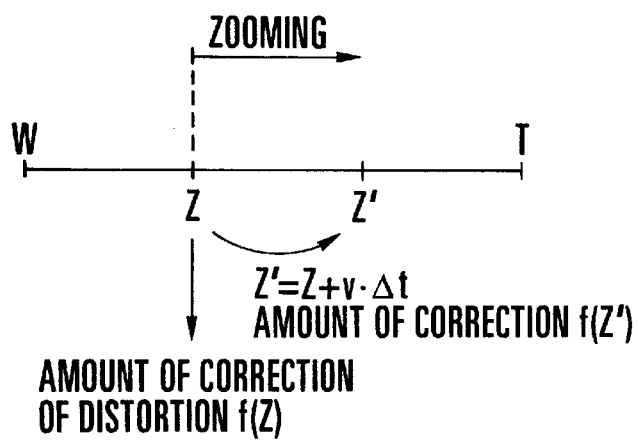
FIG. 44 is an explanatory view which serves to explain the manner of calculation of the amount of correction performed in Step S253 of FIG. 43.

FIG. 43 is a flowchart showing the distortion correcting operation of a solid-state image pickup camera according to an eighth embodiment of the present invention. FIG. 44 is a view which serves to explain the manner of calculation of the amount of correction in Step S253 of FIG. 43.

When the zoom is off, if a focal length f is f=Z, distortion correction is performed from scanning-line shape data based on the lens state at that time by means of the interpolation circuit.

However, if the zoom is on, the amount of correction, f(Z'), for a focal length Z' to which the current focal length Z will have varied with the elapse of Δt owing to zooming is beforehand obtained by:

$$Z'=Z+v \cdot \Delta t$$

where v represents a zooming speed and Δt represents the time required for distortion correction computation processing. When the focal length Z' is reached during the zooming, distortion correction is performed at the same time.

Steps S251 to S254 of FIG. 43 show the above-described operation performed when the zoom is on.

By performing the above-described control, it is possible to solve, without decreasing the zooming speed, the degradation of image quality due to the problem that distortion correction occasionally becomes unable to follow the zooming speed during zooming.

According to the above-described eighth embodiment, since distortion correction is performed on the basis of the zooming speed during zooming, it is possible to provide an undistorted image at real time.

As described above, in accordance with the fifth to eighth embodiments of the present invention, there is provided an arrangement which includes a photographic zoom lens which is formed in such a manner that its distortional aberration is concentrated on a specific photographing position, detecting means for detecting a photographing position of the photographic zoom lens, and correcting means for correcting, if the detecting means detects that the photographing position of the photographic zoom lens during photography is located within a position where a large distortional aberration occurs, a geometrical deformation of an image occurring due to the photographic zoom lens by reading out image data from the solid-state image sensor on the basis of the geometrical deformation. During optical design, the photographic zoom lens is formed in such a manner that the distortional aberration is concentrated on the specific shooting position. During photography using the photographic zoom lens, if the photographing position of the photographic zoom lens enters the position where the large distortional aberration occurs, the image data is read out from the solid-state image pickup device on the basis of the geometrical deformation of the image occurring due to the photographic zoom lens, and distortional-aberration correction is performed of the geometrical deformation.

Accordingly, it is possible to improve image quality and to provide not only an inexpensive photographic zoom lens but also a low-cost image pickup circuit.

Also, control means is provided for switching the manner of correction of the geometrical deformation according to whether a zooming operation is being performed, so that, during the zooming operation, the operation of correcting the geometrical deformation is not performed or the operation of correcting the deformation is performed by using zooming speed information.

Accordingly, it is possible to improve the zooming speed and to provide an undistorted output image.

An embodiment which will be described later discloses a control device which is arranged to display, during electronic zooming, a video image corresponding to the entire area of the image sensor on a portion of a display so that a user can visually confirm which portion of the entire image plane corresponds to an object image picked up by electronic zooming.

Figure 45:
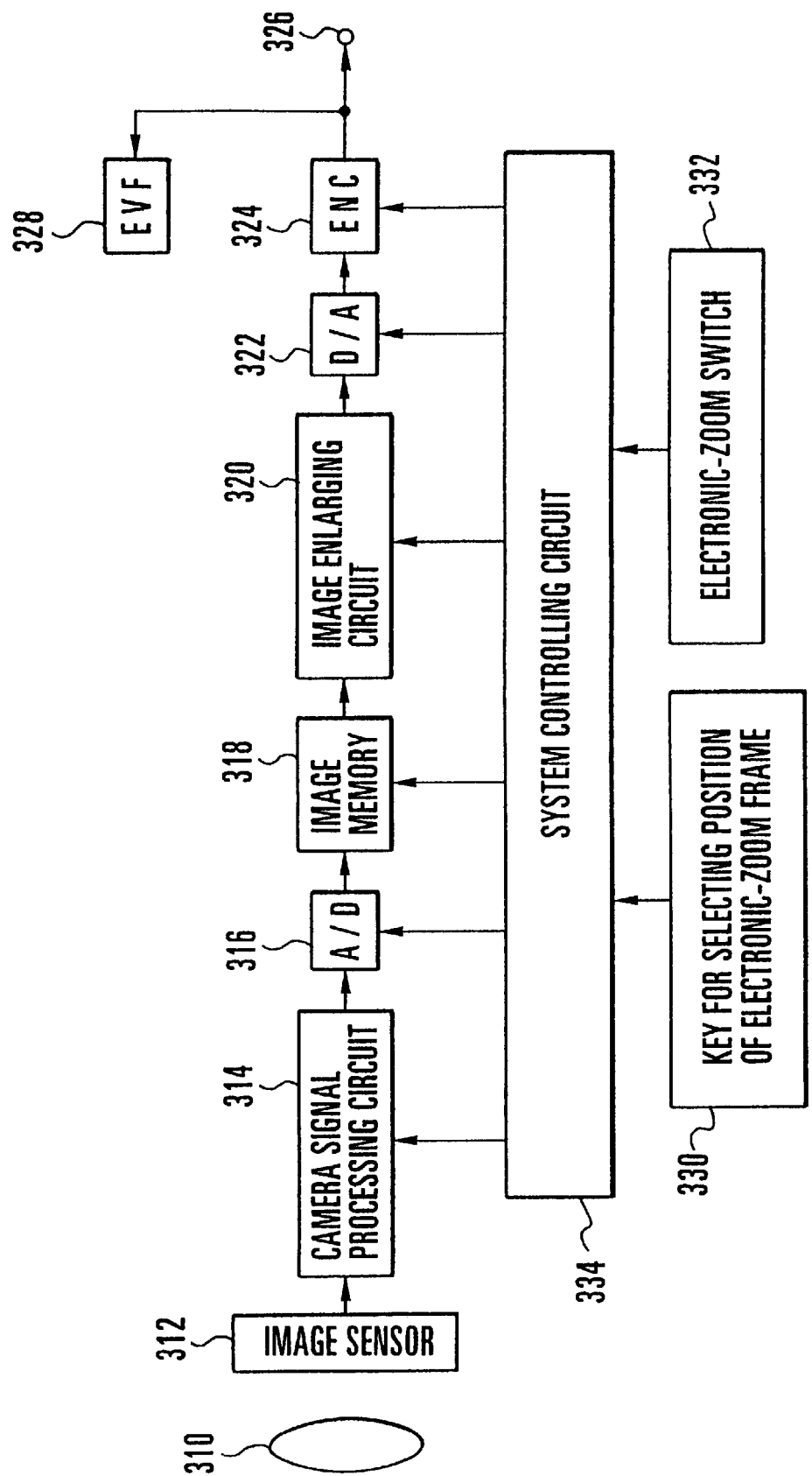
FIG. 45 is a block diagram schematically showing the arrangement of a ninth embodiment of the present invention.

FIG. 45 is a block diagram schematically showing the arrangement of a ninth embodiment of the present invention. The shown arrangement includes a photographic lens 310, an image sensor 312 for converting an optical image formed by the photographic lens 310 into an electrical signal, a camera signal processing circuit 314 for subjecting the output of the image sensor 312 to camera signal processing such as gamma correction or color adjustment and outputting luminance and color-difference signals (or RGB signals), and an A/D converter 316 for converting the analog output of the camera signal processing circuit 314 into a digital signal.

The shown arrangement also includes an image memory 318 having a memory capacity for at least one image plane for temporarily memorizing image data outputted from the A/D converter 316, and an image enlarging circuit 320 for electrically enlarging a specified area of an image memorized in the image memory 318 to a predetermined size by means of coordinate transformation. Incidentally, if the specified area corresponds to the entire size of the image plane, the image enlarging circuit 320 provides an output of equal magnification.

The shown arrangement also includes a D/A converter 322 for converting the output data of the image enlarging circuit 320 into an analog signal, and a video encoder 324 for converting the image signal outputted from the D/A converter 322 into a predetermined video format, for example, a video signal conforming to the NTSC system. The output of the video encoder 324 is applied to an output terminal 326 and to an electronic viewfinder (EVF) 328. A video image recording device, such as a video tape recorder or a video cassette recorder, is connected to the output terminal 326.

An electronic-zoom frame position selecting key 330 is provided for selecting a position of an electronic-zoom frame within a photographic image plane displayed in the electronic viewfinder 328, and is formed by, for example, a key switch for inputting an instruction indicative of any of upward, downward, rightward and leftward movements. An electronic-zoom switch 332 is provided for turning on or off an electronic zoom. A system controlling system 334 controls the entire arrangement and, specifically, controls the electronic realized by the image memory 318 and the image enlarging circuit 320, in accordance with the electronic-zoom frame position selecting key 330 and the electronic-zoom switch 332.

Figure 48:
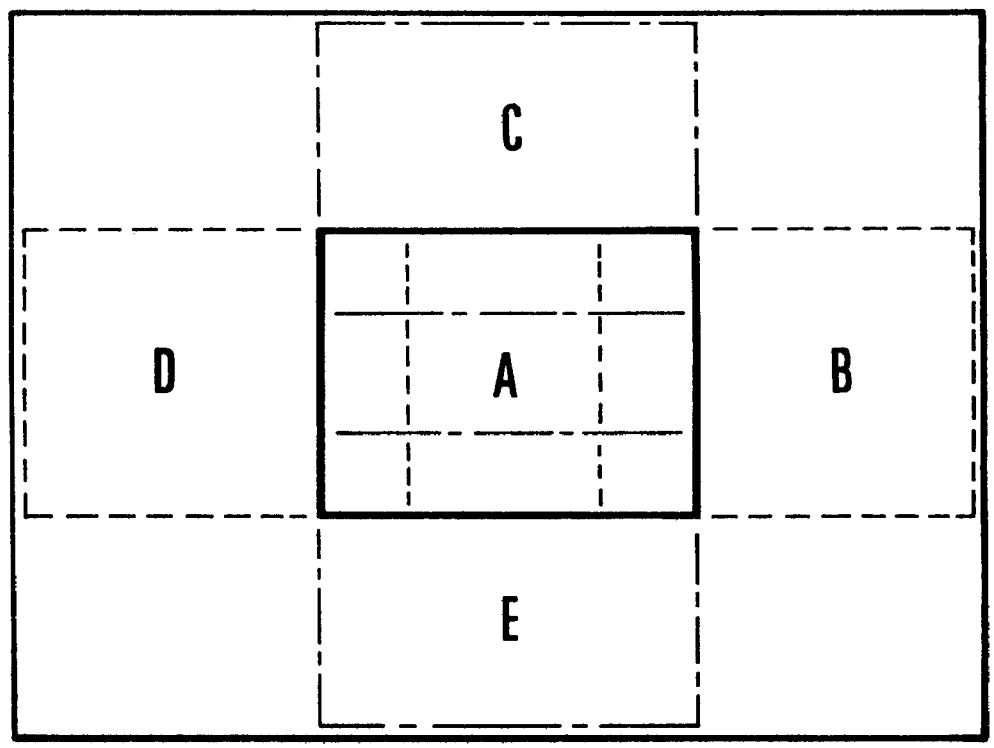
FIG. 48 shows an area to which an electronic-zoom frame is to be moved according to the ninth embodiment of the present invention.

According to the ninth embodiment, as shown in FIG. 48, five areas A, B, C, D and E are set in the photographic image plane, and the electronic-zoom frame can be moved to any of the five areas A, B, C, D and E. The areas A, B, C, D and E may have the same size or different sizes. The reason why the electronic-zoom frame is made to move to any of the aforesaid fixed positions is to simplify a control system. Of course, it is possible to adopt an arrangement capable of continuously moving the electronic zoom within the photographic image plane. In this arrangement, the key switch 330 may be replaced with an operating member such as a cross-shaped lever which is easier to operate.

As a matter of course, it is also possible to adopt an arrangement capable of recognizing or memorizing the feature of an object and causing the electronic-zoom frame to move automatically so as to track a specific object.

Figure 49:
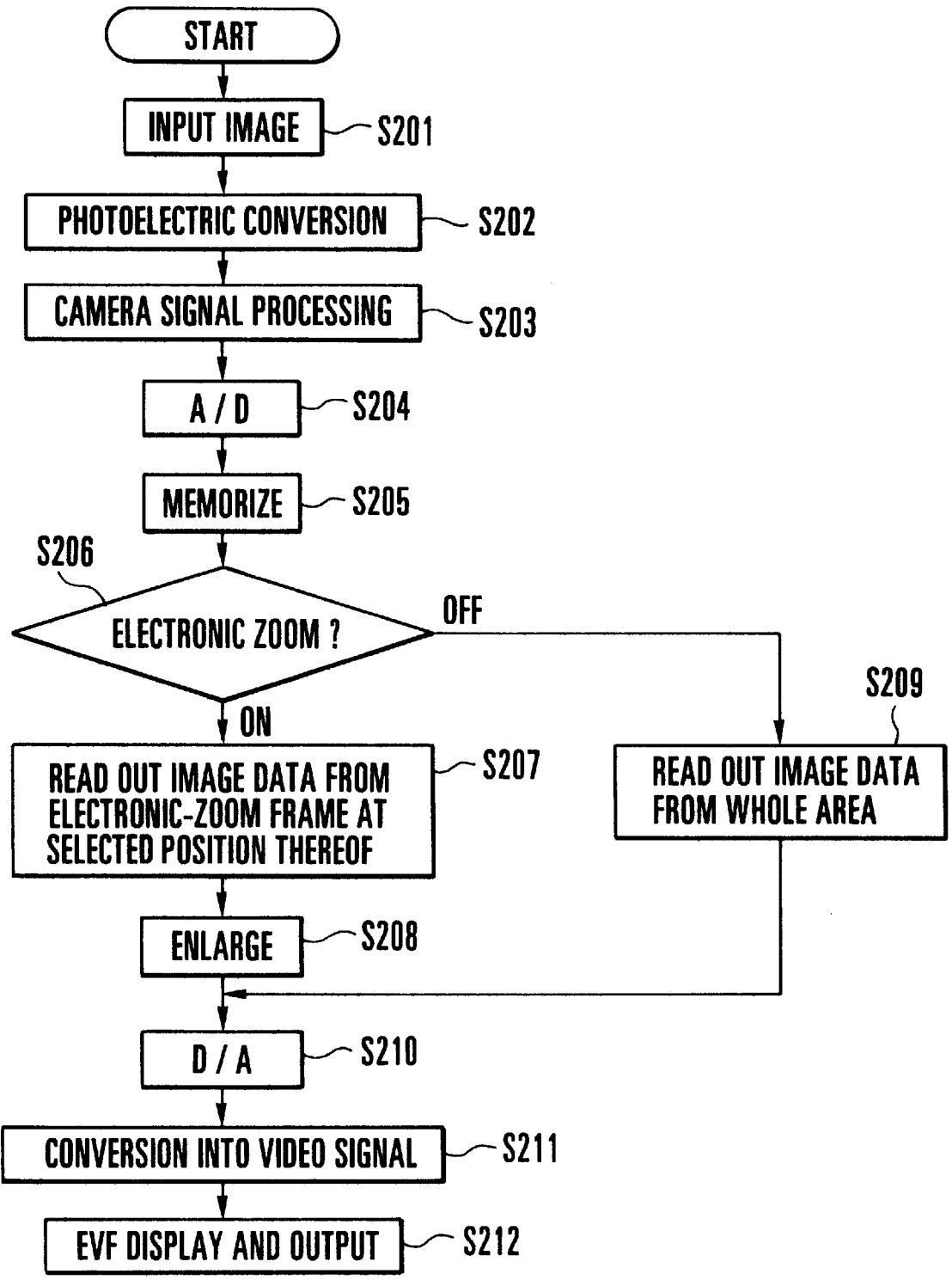
FIG. 49 is a flowchart of the operation of the ninth embodiment of the present invention.

The operation of the ninth embodiment will be described below with reference to FIG. 49. When a power supply is turned on, the image sensor 312 converts an optical image formed by the photographic lens 310 into an electrical signal (Steps S201 and S202), and the camera signal processing circuit 314 subjects the output of the image sensor 312 to camera signal processing (Step S203). The output of the camera signal processing circuit 314 is converted into a digital signal by the A/D converter 316 (Step S204), and the digital signal is temporarily memorized in the image memory 318 in units of one image plane (Step S205).

Figure 47:
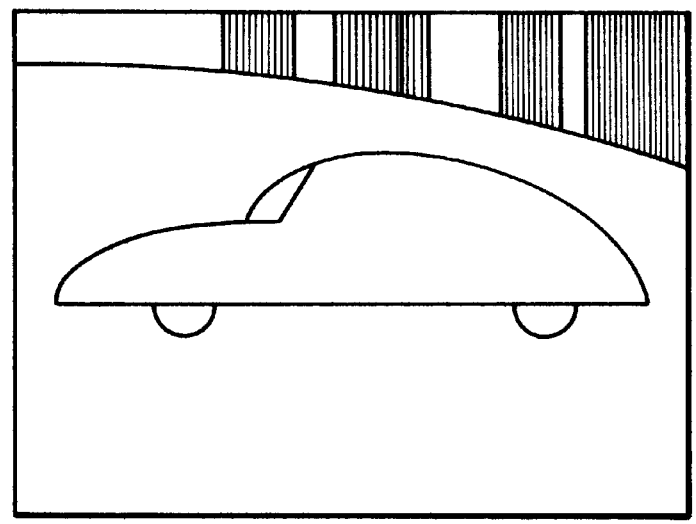
FIG. 47 shows an image example obtainable by electronically enlarging a central portion of the image shown in FIG. 46.

If it is determined in Step S206 that the electronic-zoom switch 332 is on, the system controlling circuit 334 determines which of the areas A, B, C, D and E is to be electronically zoomed, on the basis of the state of the electronic-zoom frame position selecting key 330. The image enlarging circuit 320 reads out, from the image memory 318, image data indicative of the image contained in the electronic-zoom frame located in a specified position, and displays the image data as an image enlarged up to a predetermined image size, for example, as shown in FIG. 47 (steps S207 and S208). On the other hand, if it is determined in Step S206 that the electronic-zoom switch 332 is off, the image enlarging circuit 320 reads out image data corresponding to the entire image plane from the image memory 318 and outputs the image data without modification (Step S209).

The D/A converter 322 converts the digital output of the image enlarging circuit 320 into an analog signal (step S210), and the video encoder 324 converts the output of the D/A converter 322 into a video signal of predetermined format (Step S211). The output of the video encoder 324 is applied to the electronic viewfinder 328 and is also outputted through the output terminal 326 to an external circuit (Step S212). The output video signal of the video encoder 324 becomes, when the electronic zoom is on, a signal representative of an enlarged video image of the image contained in the electronic-zoom frame located in the specified position.

Figure 46:
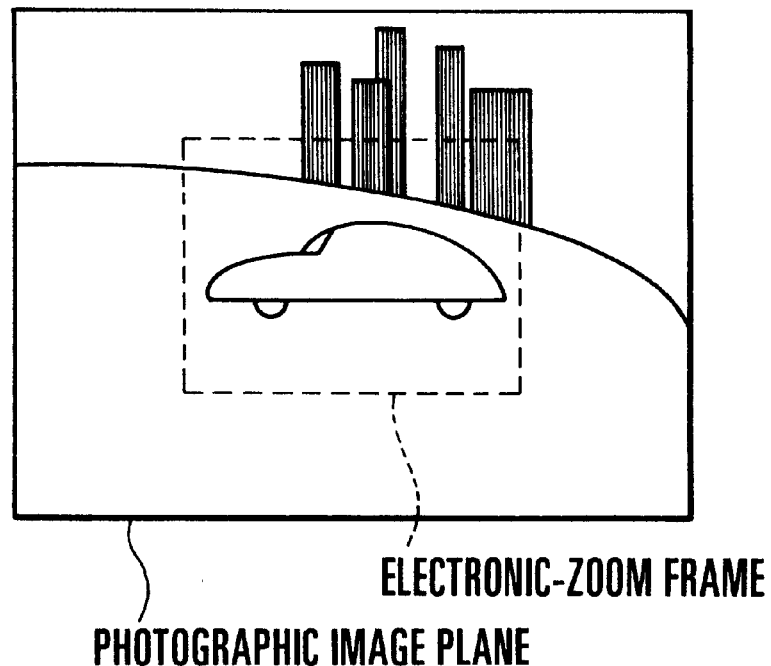
FIG. 46 shows one example of a photographic image.
Figure 50:
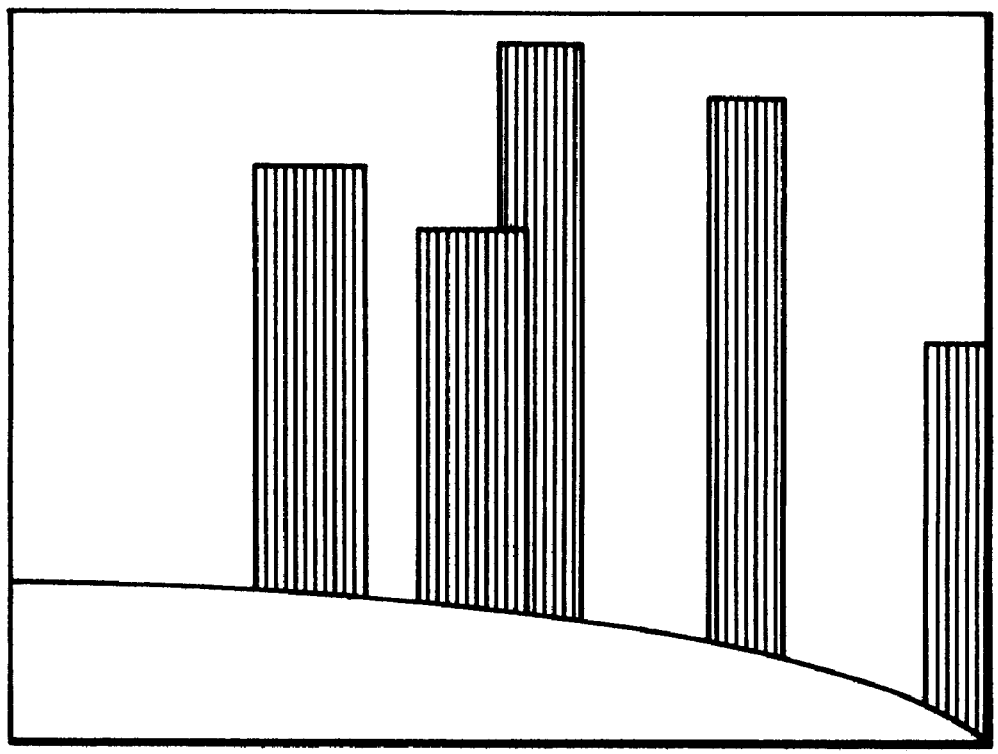
FIG. 50 shows an electronically zoomed image obtainable when the electronic-zoom frame is moved to the area C shown in FIG. 48.

For example, if the electronic-zoom frame is moved to the area C, the enlarged image shown in FIG. 50 is obtained from the photographic image shown in FIG. 46.

In the ninth embodiment, it is also possible to adopt an arrangement in which when the electronic-zoom switch 332 is off, the output of the camera signal processing circuit 314 is directly supplied to the video encoder 324, while if the electronic-zoom switch 332 is on, the output of the camera signal processing circuit 314 is made to pass through the circuits 316 to 322.

According to the ninth embodiment, if the electronic zoom is in operation, it is impossible to obtain image information outside of the electronic-zoom frame from the photographic image plane displayed in the electronic viewfinder 328 or the signal outputted from the output terminal 326. The image information outside of the electronic-zoom frame is occasionally needed as a material for determining whether the electronic zoom is to be turned off.

Figure 51:
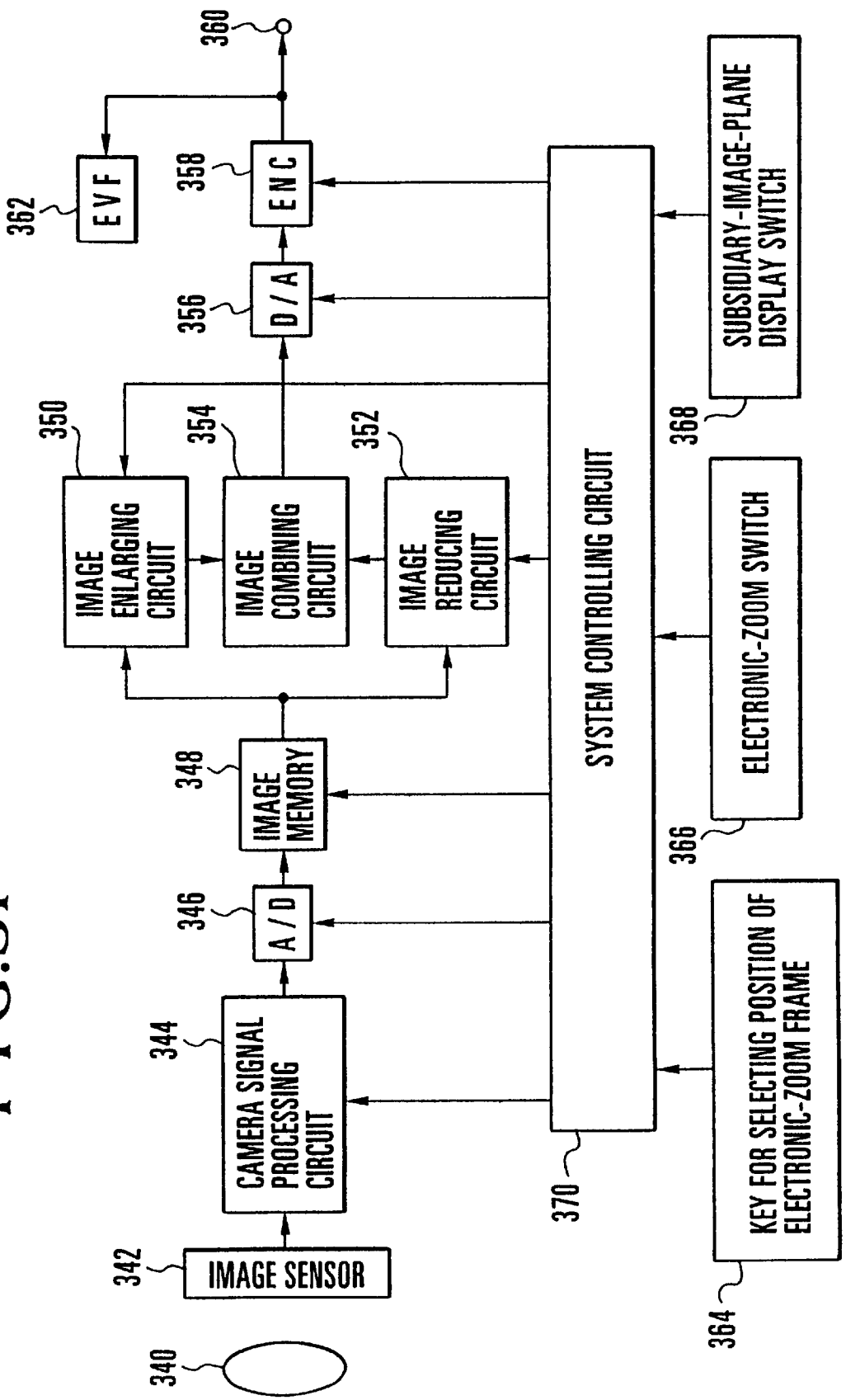
FIG. 51 is a block diagram schematically showing the arrangement of a tenth embodiment of the present invention.

A tenth embodiment which satisfies such a demand will be described below. FIG. 51 is a block diagram showing the arrangement of the tenth embodiment. The shown arrangement includes a photographic lens 340, an image sensor 342, a camera signal processing circuit 344, an A/D converter 346 for converting the analog output of the camera signal processing circuit 344 into a digital signal, and an image memory 348. These elements 340 to 348 are substantially identical to the elements 310 to 318 shown in FIG. 45.

The shown arrangement also includes an image enlarging circuit 350 for electronically enlarging a specified area of an image memorized in the image memory 348 to a predetermined size through coordinate transformation, and an image reducing circuit 352 for reducing the image memorized in the image memory 348 to a predetermined size. The image enlarging circuit 350 provides an output of equal magnification if the specified area corresponds to the entire size of the image plane. The shown arrangement also includes an image combining circuit 354 for combining (or selecting either one of) the output of the image enlarging circuit 350 and the output of the image reducing circuit 352.

The shown arrangement also includes a D/A converter 356 for converting the output data of the image combining circuit 354 into an analog signal, and a video encoder 358 for converting the image signal outputted from the D/A converter 356 into a predetermined video format, for example, a video signal conforming to the NTSC system. The output of the video encoder 358 is applied to an output terminal 360 and to an electronic viewfinder (EVF) 362. A video image recording device, such as a video tape recorder or a video cassette recorder, is connected to the output terminal 326.

The shown arrangement also includes an electronic-zoom frame position selecting key 364 similar to the electronic-zoom frame position selecting key 330, an electronic-zoom switch 366 similar to the electronic-zoom switch 332, a subsidiary-image-plane display switch 368 for specifying whether to display a photographic image in the form of a subsidiary image plane, and a system controlling circuit 370 for controlling the entire arrangement. Specifically, the system controlling circuit 370 controls the electronic zoom in accordance with the electronic-zoom frame position selecting key 364 and the electronic-zoom switch 366, and also controls the subsidiary-image-plane display of the photographic image in accordance with the subsidiary-image-plane display switch 368.

Referring to the feature of the tenth embodiment, when the electronic-zoom switch 366 is turned on, the image enlarging circuit 350 electronically enlarges the image contained in the area specified by the electronic-zoom frame position selecting key 364, in a manner similar to that explained in connection with the embodiment shown in FIG. 45. The image enlarging circuit 350 reduces the entire photographic image memorized in the image memory 348 to a predetermined size.

When the subsidiary-image-plane display switch 368 is turned on, the image combining circuit 354 combines a reduced image outputted from the image reducing circuit 352 with a predetermined portion of an enlarged image outputted from the image enlarging circuit 350, and outputs the combined image. When the subsidiary-image-plane display switch 368 is turned off, the image combining circuit 354 outputs the output image of the image enlarging circuit 350 without modification.

Figure 52:
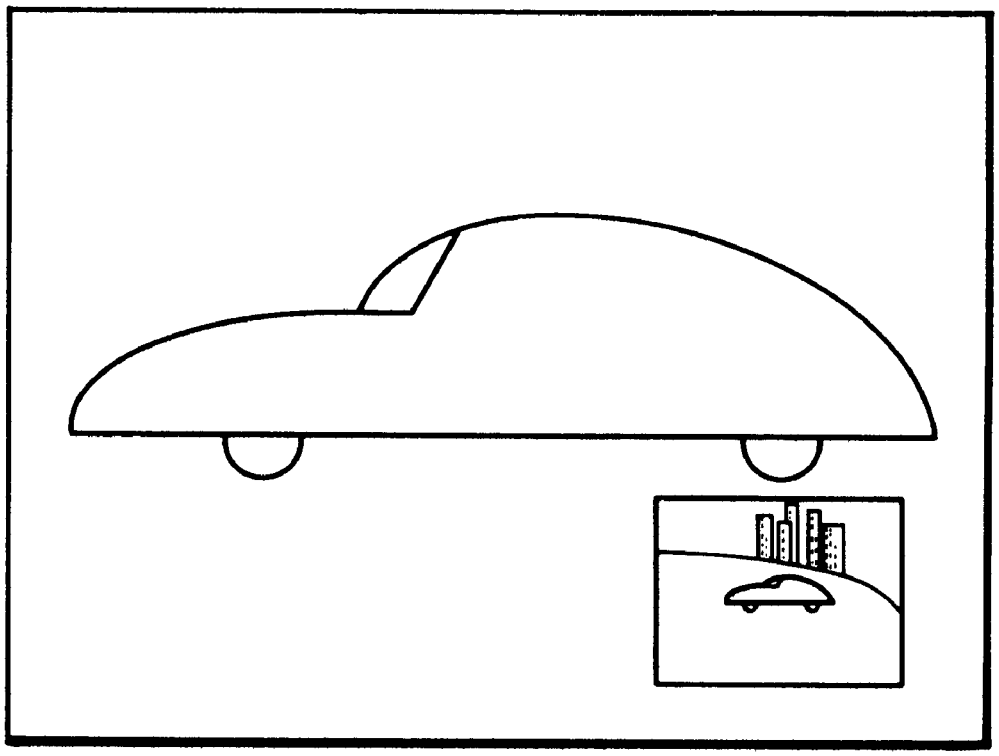
FIG. 52 shows a combined image according to the tenth embodiment of the present invention.

When both the electronic-zoom switch 366 and the subsidiary-image-plane display switch 368 are turned on, the image enlarging circuit 350, the image reducing circuit 352 and the image combining circuit 354 cooperate to cause the image combining circuit 354 to output an image such as that shown in FIG. 52. A user can obtain image information outside of the electronic-zoom area through the subsidiary image plane.

If a video signal indicative of only an electronically zoomed video image is to be outputted from the output terminal 360 to an external circuit, it is preferable to adopt an arrangement in which the output of the image enlarging circuit 350 is converted into a video signal conforming to the NTSC system or the like by another video encoder so that the output of this video encoder and the output of the video encoder 358 can be selectively supplied to the output terminal 360.

If a frame line corresponding to the electronic-zoom frame which is set is displayed in the subsidiary image plane, the usability of the electronic zoom is improved. To display such a frame line in the subsidiary image plane, it is preferable to write frame-line data into a portion in the image memory 348 which corresponds to an electronic-zoom frame position selected by the electronic-zoom frame position selecting key 364.

The ninth and tenth embodiments described above are arranged in such a manner that the position of the electronic-zoom frame can be altered. However, it is also possible to adopt an arrangement which is provided with means for setting the size of the electronic-zoom frame so that the size of the electronic-zoom frame can be altered.

As will be readily understood from the above description, according to the ninth and tenth embodiments, since the electronic-zoom frame can be moved, it is possible to track the movement of an object by moving not the entire image pickup apparatus but the electronic-zoom frame, whereby it is possible to suppress an image shake due to the image pickup apparatus. Accordingly, it is possible to utilize the electronic zoom more effectively.

Figure 53:
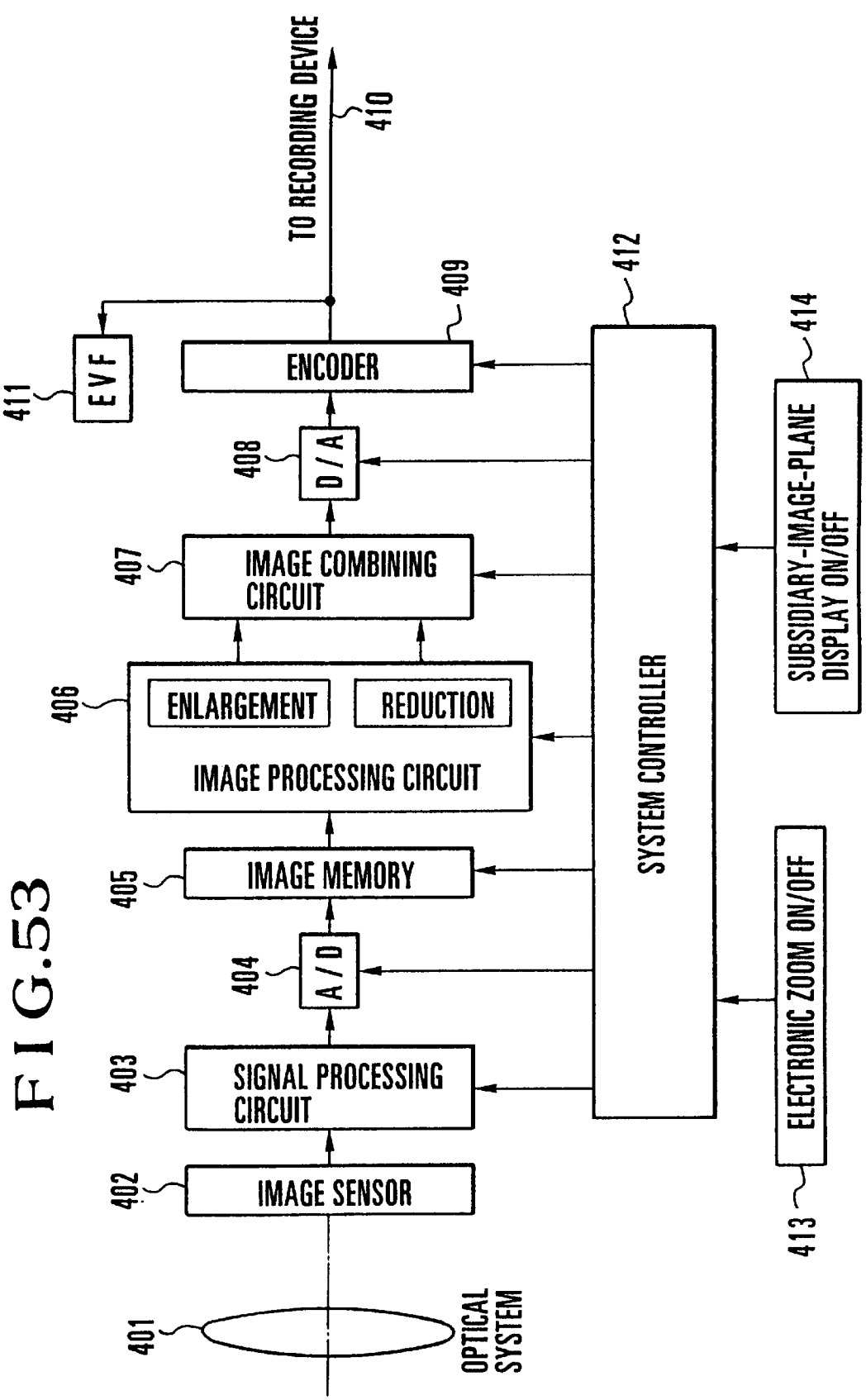
FIG. 53 is a block diagram showing the circuit arrangement of an image pickup apparatus according to an eleventh embodiment of the present invention.

FIG. 53 is a block diagram showing the circuit arrangement of an image pickup apparatus according to an eleventh embodiment of the present invention.

The arrangement shown in FIG. 53 includes an optical system 401 for forming an object image on the surface of an image sensor which will be described later, an image sensor 402 for performing photoelectric conversion of the object image provided by the optical system 401, a signal processing circuit 403 for processing a time-series signal relative to the object image, which is obtained from the image sensor 402, an A/D converter 404 for converting an electrical signal (analog signal) processed by the signal processing circuit 403 into a digital signal, and an image memory 405 for memorizing image data supplied from the A/D converter 404.

The shown arrangement also includes an image processing circuit 406 for enlarging and reducing an image, an image combining circuit 407 for combining an enlarged image and a reduced image, a D/A converter 408 for restoring a digital signal subjected to the above-described image processing to an analog signal, an encoder 409 for converting the analog signal obtained by the D/A conversion into a standard video signal 410 conforming to the NTSC system, and an electronic viewfinder (EVF) 411 for confirmation of a photographic image plane displayed therein.

A system controller 412 is provided for checking the operational state of each selecting member which will be described later and controlling each constituent element in accordance with the checked operational state, and can be easily realized by using a general-purpose microprocessor. An electronic-zoom function selecting member 413 is provided for specifying whether to make an electronic-zoom function operative (on) or inoperative (off), and a subsidiary-image-plane display selecting member 414 for specifying whether to display (on) an original image which is not enlarged, in the form of a subsidiary image plane or to inhibit display of the subsidiary image plane (off).

Figure 54:
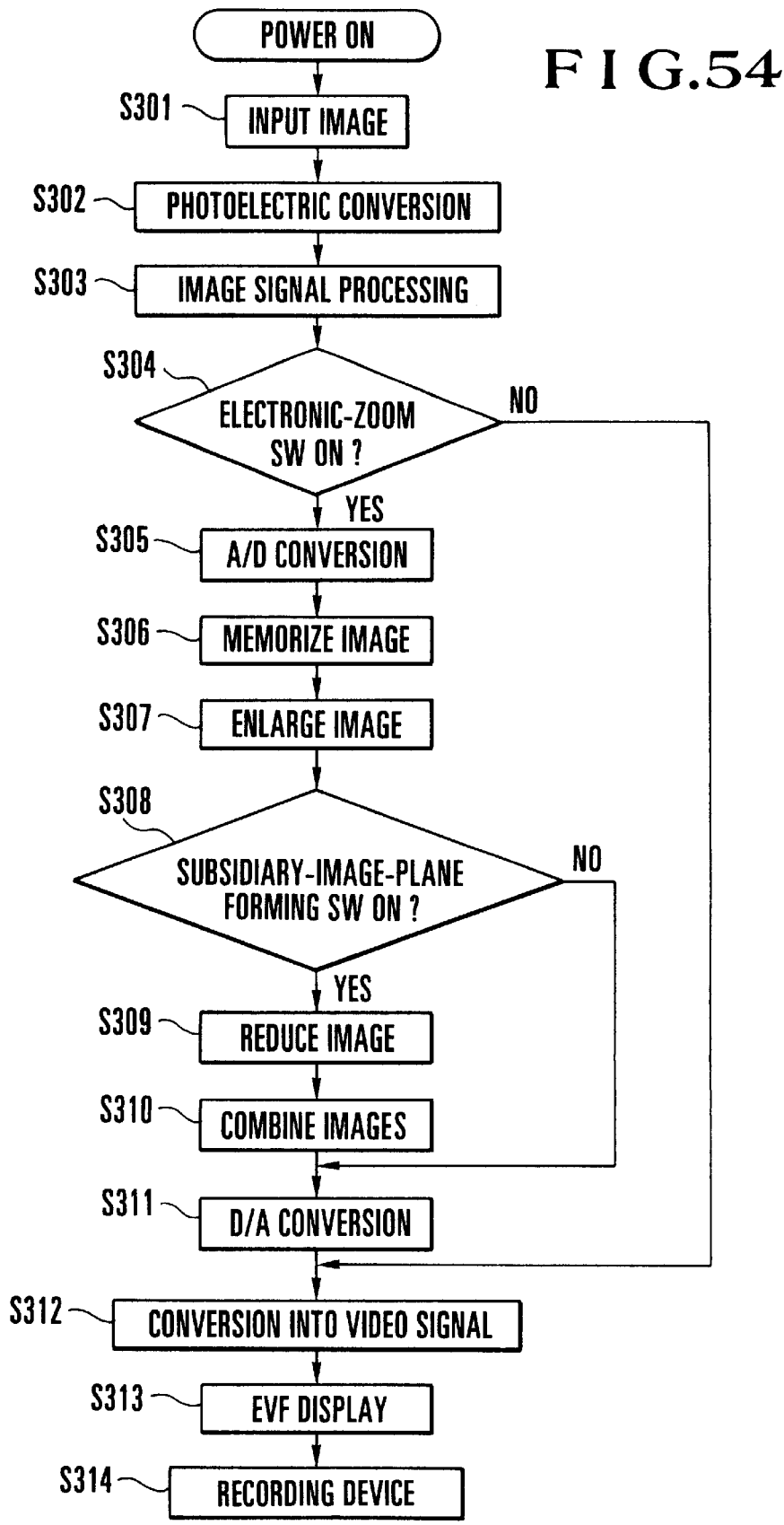
FIG. 54 is a flowchart showing the operation of the image pickup apparatus shown in FIG. 53.

FIG. 54 is a flowchart showing the operation of the image pickup apparatus having the above-described arrangement.

When a power switch (not shown) of the apparatus is turned on, an object image is inputted to the image sensor 402 through the optical system 401 (Step S301). The object image formed on the image sensor 402 is converted into an electrical signal by the image sensor 402 (Step S302). The signal processing circuit 403 which has received the electrical signal converts the signal into a time-series signal relative to the object image (Step S303).

Then, the system controller 412 checks the state of the electronic-zoom function selecting member 413 and determines whether the electronic-zoom function is on (Step S304). If it is determined that the electronic-zoom function is off, the process proceeds to Step S312. If it is determined that the electronic-zoom function is on, the process proceeds to Step S305, in which the time-series analog signal relative to the object image is converted into a digital signal by the A/D converter 404. Then, information for one image plane is temporarily memorized in the image memory 405 (Step S306), and the image processing circuit 406 performs the image processing of selecting a digital image signal indicative of the image contained in the electronic-zoom frame from the memorized digital signal and enlarging the image up to the full size of the image plane (Step S307).

Figure 56:
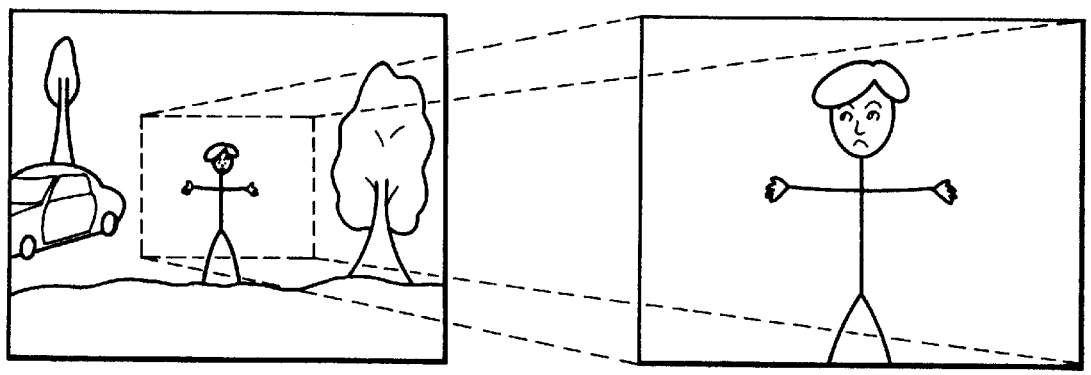
FIG. 56 is a view showing an original image which is not electronically zoomed and an image obtainable by enlarging a portion of the original image by electronic zoom.

The variation of the image at that time will be described below with reference to FIG. 56. The image contained in the electronic-zoom frame is selected from an image for one image plane, such as that shown in the left-hand part of FIG. 56, and is enlarged up to the full size of the image plane so that the image shown in the right-hand part of FIG. 56 is formed. This image processing can be easily realized by performing coordinate transformation radially from the center of the electronic-zoom frame toward the outside thereof. Accordingly, detailed description of the image processing is omitted herein.

Then, the system controller 412 checks the state of the subsidiary-image-plane display selecting member 414 for displaying an original image plane, which is not enlarged up to an electronically zoomed image plane, as a subsidiary image plane, and checks whether a subsidiary-image-plane display function for displaying the original image plane which is not enlarged is on (Step S308). If it is determined that the subsidiary-image-plane display function is off, the process proceeds to Step S311. If it is determined that the subsidiary-image-plane display function is on, the process proceeds to Step S309. In Step S309, the image processing circuit 406 performs the image processing of reducing the image signal memorized in the image memory 405 at a predetermined ratio. Then, the image combining circuit 407 combines the image obtained in Step S309 and the image obtained in Step S307 so that the subsidiary-image-plane display signal indicative of the original image which is not electronically zoomed is made to overlap the electronically zoomed image (Step S310).

Figure 55:
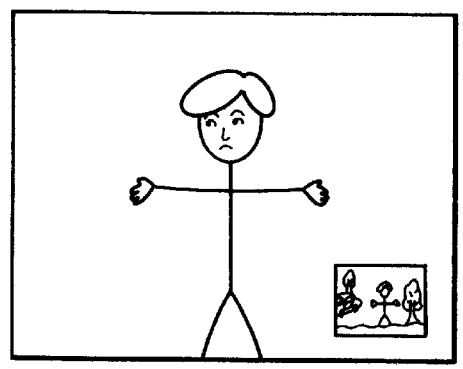
FIG. 55 is a view showing one example obtained by displaying an original image, which is not electronically zoomed, in the form of an subsidiary image plane within an electronically zoomed image plane in accordance with the eleventh embodiment of the present invention.

The state of the image at that time is shown in FIG. 55. The aforesaid image processing can be realized by performing coordinate transformation radially toward the center of the electronic-zoom frame.

Then, the combined digital image signal is converted into an analog signal by the D/A converter 408 (Step S311), and the analog signal is restored to the standard video signal 410 by the encoder 409 (Step S312). The thus-obtained image is displayed in the EVF 411 (Step S313), and a photographer confirms this image. Also, the image is recorded by the recording device (not shown) (Step S314).

If it is determined in Step S304 that the electronic-zoom function is off, the process proceeds to Step S312 as described previously and the time-series analog signal relative to the object image is immediately restored to the standard video signal 410 by the encoder 409. The thus-obtained normal image is supplied to the EVF 411 and to the recording device (Steps S313 and S314).

If it is determined in Step S308 that the subsidiary-image-plane display selecting member 414 is off, the process proceeds to Step S311, in which the enlarged-image digital signal is converted into an analog signal by the D/A converter 408. The analog signal is converted into the standard video signal 410 by the encoder 409 (Step S312). The thus-obtained image is supplied to the EVF 411 and to the recording device (Steps S313 and S314).

There is a great possibility that a temporally varying foreign object which is contained in image information outside of the electronic-zoom frame may enter the electronic-zoom frame. Also, if such a temporally varying foreign object enters the electronic-zoom frame, it will affect the movement of a target object within the electronic-zoom frame. Accordingly, during the image reducing processing of Step S309, it is also preferable to detect the temporally varying foreign object, as by selecting temporally immediately previous information and making a comparison. In this case, after the photographer has been informed of the detected portion, as by blinking or a variation in color, the process may proceed to Step S310.

According to the eleventh embodiment, the image pickup apparatus is provided with means for enlarging an image, means for reducing an image and means for combining image signals processed by the respective means, and is arranged so that a photographer can perform photography while confirming, in the EVF 411, image information outside of the electronic-zoom frame during the operation of the electronic-zoom function. Accordingly, it is possible to realize electronic-zoom photography capable of expanding an photographic opportunity, and the photographer can securely use the electronic zoom.

Figure 57:
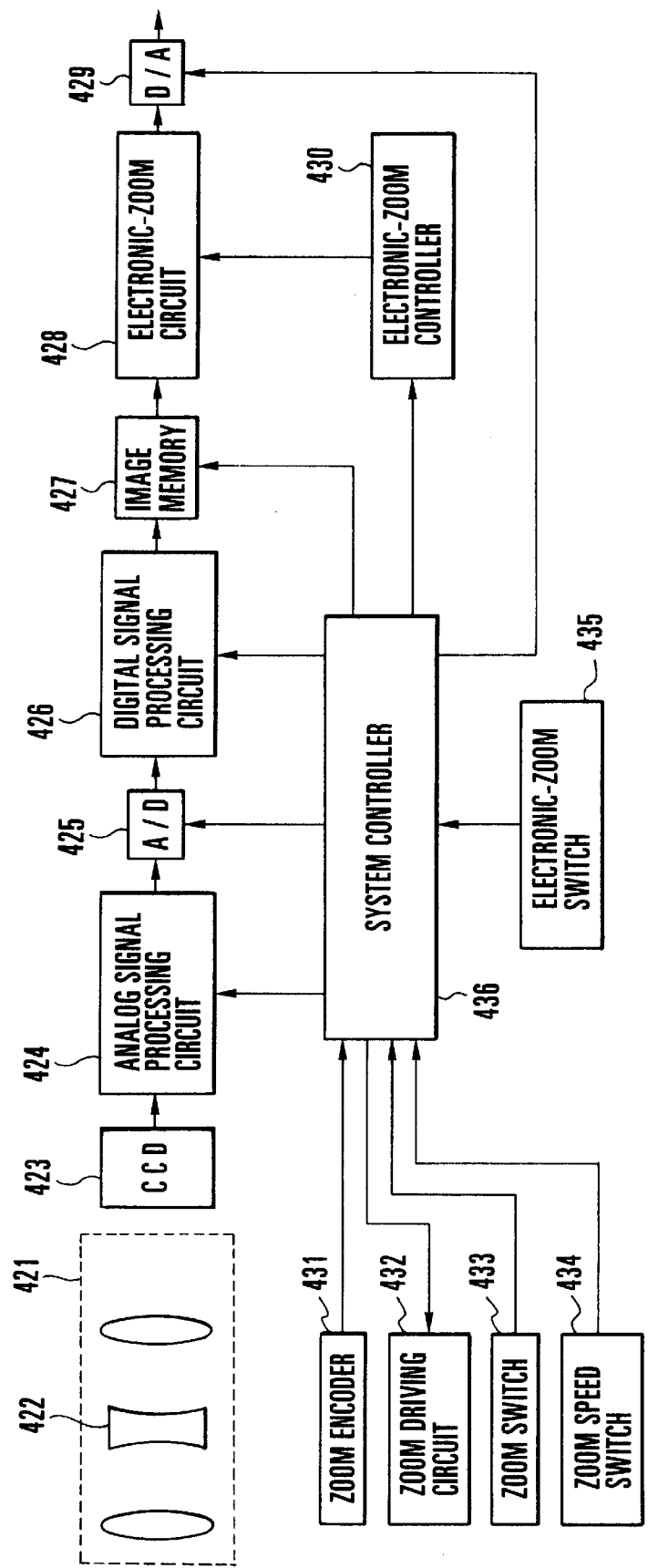
FIG. 57 is a block diagram showing the circuit arrangement of an image pickup apparatus according to a twelfth embodiment of the present invention.

FIG. 57 is a block diagram showing the circuit arrangement of an image pickup apparatus according to a twelfth embodiment of the present invention.

The arrangement shown in FIG. 17 includes a photographic lens 421 which is formed as a lens assembly provided with a variator lens 422, a CCD 423 which is an image sensor for performing photoelectric conversion of an object image passing through the photographic lens 421, an analog signal processing circuit 424 for processing an analog signal supplied from the CCD 423, an A/D converter 425 for converting an analog signal supplied from the analog signal processing circuit 424 into a digital signal, a digital signal processing circuit 426 for processing an input digital signal, and an image memory 427 for temporarily storing, as image data, a signal supplied from the digital signal processing circuit 426.

An electronic-zoom circuit 428 is controlled by an electronic-zoom controller 430, and has the function of cutting out a predetermined area (image frame) from the image data memorized in the image memory 427 and enlarging the image data contained in the predetermined area up to the full size of an image plane. The electronic-zoom circuit 428 also has the function of outputting the memorized image data from the image memory 427 without performing an enlarging operation.

A D/A converter 429 converts the digital signal from the electronic-zoom circuit 428 into an analog signal, and outputs the analog signal to an electronic viewfinder (EVF) (not shown) and to a recording device (not shown).

A system controller 436 controls the analog signal processing circuit 424, the A/D converter 425, the digital signal processing circuit 426 and the image memory 427. Further, the system controller 436 detects the state of a zoom switch 433 and the state of a zoom speed switch 434 and controls a zoom driving circuit 432 to cause the variator lens 422 to move in the direction of the optical axis thereof, thereby executing optical zooming. Also, the system controller 436 detects the state of an electronic-zoom switch 435. If the electronic-zoom switch 435 is off, the system controller 436 does not execute electronic zooming, whereas if the electronic-zoom switch 435 is on, the system controller 436 controls the electronic-zoom controller 430 in accordance with the respective states of a zoom encoder 431, the zoom switch 433 and the zoom speed switch 434, thereby executing electronic zooming according to each individual condition.

Figure 58:
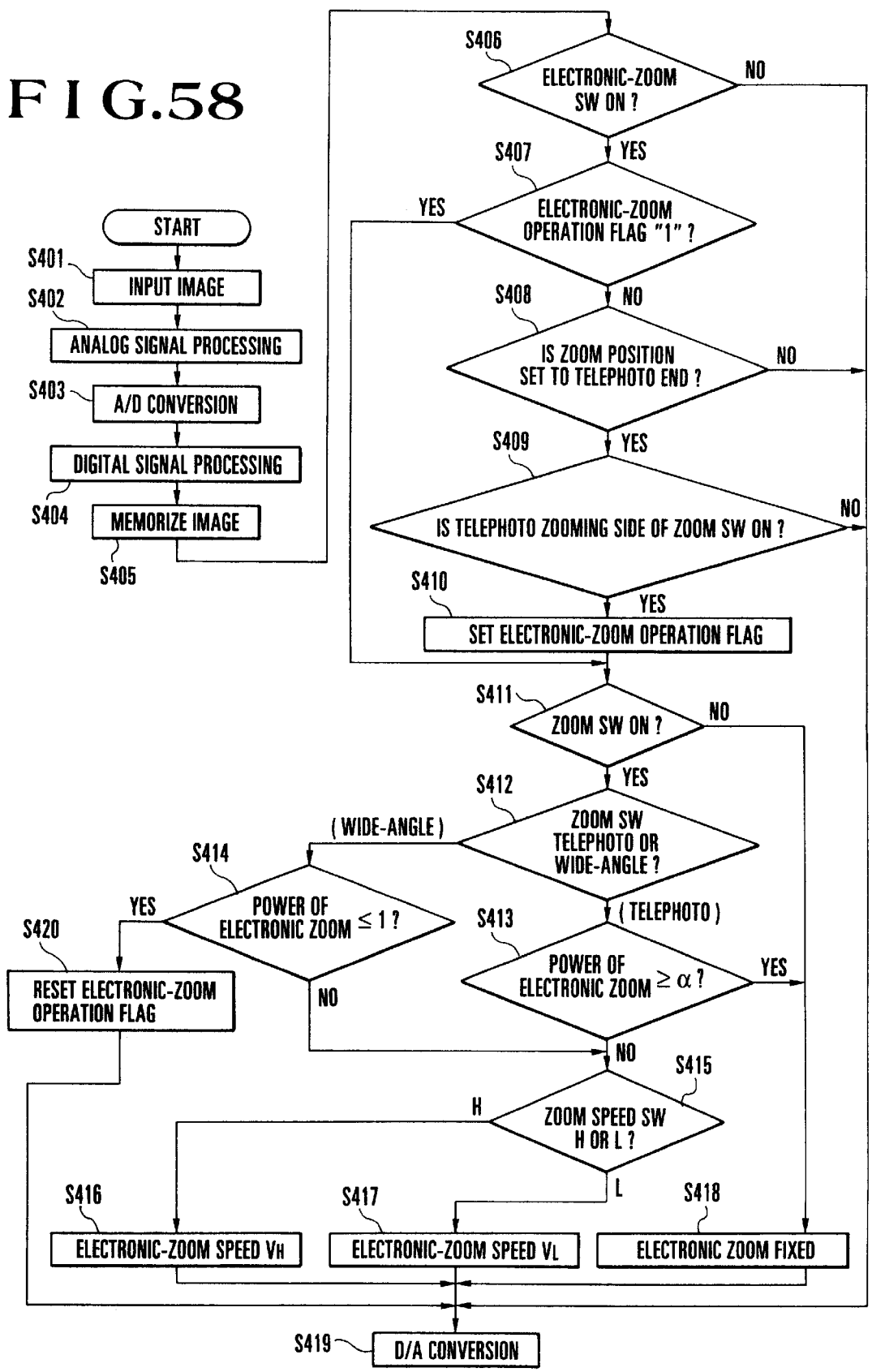
FIG. 58 is a flowchart showing the operation of the image pickup apparatus shown in FIG. 57.

FIG. 58 is a flowchart showing the operation of the image pickup apparatus having the above-described arrangement.

First, an image is inputted to the CCD 423 through the photographic lens 421 (Step S401), and the electrical signal formed by photoelectric conversion in the CCD 423 is processed by the analog signal processing circuit 424 (Step S402). The signal outputted from the analog signal processing circuit 424 is converted into a digital signal by the A/D converter 425 (Step S403). The digital signal is processed by the digital signal processing circuit 426 (step S404), and the resultant digital signal is memorized in the image memory 427 (Step S405).

In Step S406, it is checked whether the electronic-zoom switch 435 is on or off. If the electronic-zoom switch 435 is off, the process proceeds to Step S419, in which no electronic zooming is performed and the image data memorized in the image memory 427 in Step S405 is immediately converted into an analog signal by the D/A converter 429. The image data is outputted to the electronic viewfinder (EVF) (not shown) and to the recording device (not shown).

On the other hand, if it is determined in Step S406 that the electronic-zoom switch 435 is on, the process proceeds to Step S407. In Step S407, it is checked whether the electronic zoom is in its operative state, by making reference to the state of an electronic-zoom operation flag. If the electronic zoom is in the operative state, the process proceeds to Step S411. If the electronic zoom is not in the operative state, the process proceeds to Step S408, in which it is determined whether the zoom position (the position of the variator lens 422) is a telephoto end, through the zoom encoder 431. If the current zoom position is not the telephoto end, the process proceeds to Step S419, in which the image data memorized in the image memory 427 in Step S405 is converted into an analog signal by the D/A converter 429. The image data is outputted to the electronic viewfinder (EVF) (not shown) and to the recording device (not shown). On the other hand, if it is determined in Step S408 that the current zoom position is the telephoto end, the process proceeds to Step S409, in which it is checked whether the zoom switch 433 is operated so that further driving toward the telephoto side can be executed. If the zoom switch 433 is not operated so that further driving toward the telephoto side can be executed, the process proceeds to Step S419, in which, as described above, the image data memorized in the image memory 427 in Step S405 is converted into an analog signal by the D/A converter 429. The image data is outputted to the electronic viewfinder (EVF) (not shown) and to the recording device (not shown). If the zoom switch 433 is operated so that further driving toward the telephoto side can be executed, the process proceeds to Step S410, in which the electronic-zoom operation flag is set.

Then, in Step S411, it is determined whether the zoom switch 433 has been pressed. If the zoom switch 433 has not been pressed, the process proceeds to Step S418, in which electronic zooming is executed at the same enlargement ratio as the previous one. If the zoom switch 433 has been pressed, the process proceeds to Step S412, in which it is checked whether the zoom switch 433 is operated so that driving toward the telephoto side can be executed or so that driving toward the wide-angle side can be executed. If the zoom switch 433 has been pressed so that driving toward the telephoto side can be executed, the process proceeds to Step S413, in which it is determined whether the power of electronic zooming at that time is not less than a predetermined power $\alpha$. If the power of electronic zooming at that time is not less than the predetermined power $\alpha$, the process proceeds to Step S418, in which the enlargement ratio is set to an enlargement ratio corresponding to the electronic-zooming power $\alpha$.

If the zoom switch 433 has been pressed so that driving toward the wide-angle side can be executed, the process proceeds to Step S414, in which it is determined whether the power of electronic zooming at that time is not greater than "1". If the power of electronic zooming at that time is not greater than "1", the process proceeds to Step S420, in which the electronic-zoom operation flag is reset. Then, the process proceeds to Step S419.

If it is determined in Step S413 that the electronic-zoom power is less than $\alpha$, or if it is determined in Step S414 that the electronic-zoom power exceeds "1", the process proceeds to Step S415. In Step S415, the state of the zoom speed switch 434 is checked to determine which of a high speed $V_H$ and a lower speed $V_L$ has been selected as the zoom speed. If the high speed $V_H$ has been selected as the zoom speed, the process proceeds to Step S416, in which the speed of electronic zooming (power varying) is increased. If the zoom speed switch 434 is set for the low speed $V_L$, the process proceeds to Step S417, in which the speed of electronic zooming (power varying) is decreased.

Then, the process proceeds to Step S419 from any of Steps S416, S417, S418 and S420 to Step S419, in which the electronically zoomed image is converted into an analog signal by the D/A converter 429. The analog signal is outputted to the electronic viewfinder (EVF) (not shown) and to the recording device (not shown).

Figure 59B:
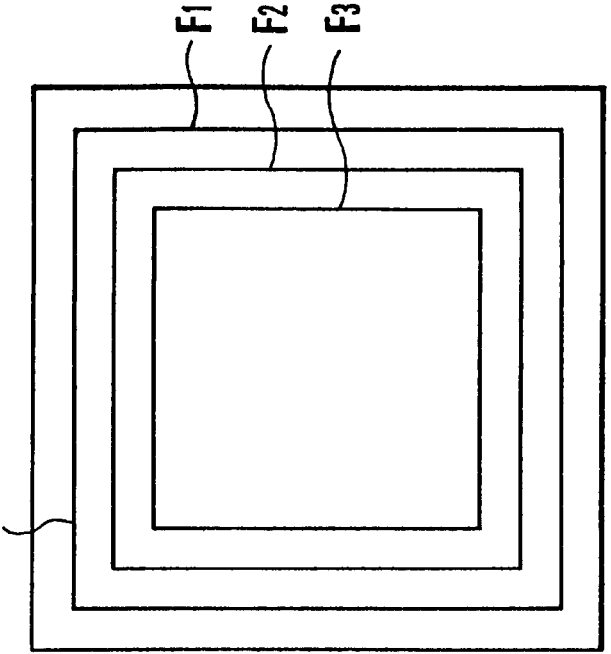
FIGS. 59(a) and 59(b) are views showing variations in an image-plane cutting frame for the purpose of varying the speed of the electronic zoom according to the twelfth embodiment of the present invention.
Figure 59A:
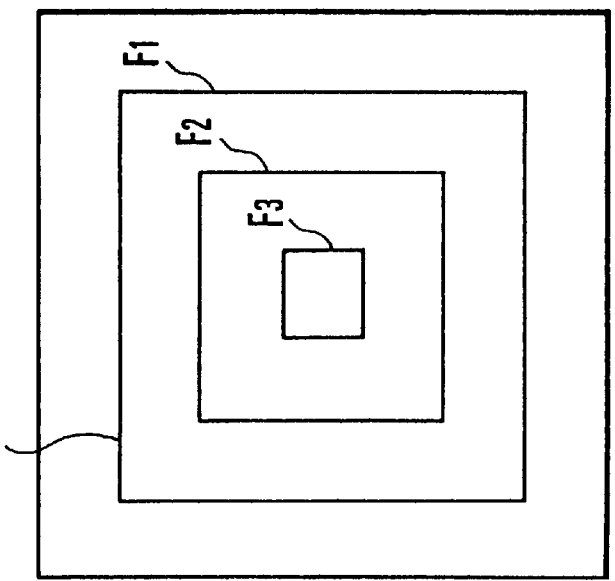

The (power-varying) speed of the electronic zoom can be varied by changing the rate of variation of an image cutting frame, as shown in FIGS. 59(*a*) and 59(*b*). That is, it is possible to increase the power-varying speed of the electronic zoom by increasing the rate of variation of the image cutting frame (refer to FIG. 59(*a*)), while it is possible to decrease the power-varying speed of the electronic zoom by increasing the rate of variation of the image cutting frame (refer to FIG. 59(*b*)), it is possible to increase the power-varying speed of the electronic zoom.

In the twelfth embodiment, although two different optical-zoom speeds are used, n optical-zoom speeds may be employed. If n optical-zoom speeds are employed, n electronic-zoom speeds may be prepared or the number of electronic-zoom speeds may be set to n/2, n/3 and so on.

According to the above-described twelfth embodiment, the image pickup apparatus is provided with a function which causes the zoom speed of the electronic zoom to vary according to the driving speed of the optical zoom which is variable in two or more steps in zoom speed. Accordingly, it is possible to smoothly vary the angle of view during a switching from the optical zoom to the electronic zoom or during a switching from the electronic zoom to the optical zoom.

As described above, according to the above-described eleventh embodiment, the image pickup apparatus is provided with image reducing means for electronically reducing to a predetermined size an image for one image plane formed by an image signal supplied from signal processing means, and image combining means for combining the image reduced by the image reducing means with a portion of an image enlarged by electronic-zoom means and outputting a combined image to display means, so that an original image plane which is not electronically zoomed is displayed at real time in the form of a subsidiary image plane on a portion of an image enlarged by electronic zooming.

Accordingly, the eleventh embodiment makes it possible for a photographer to confirm image information outside of the electronic-zoom frame during electronic zooming. Accordingly, it is possible to realize electronic-zoom photography capable of expanding an photographic opportunity, and the photographer can securely use the electronic zoom.

According to the twelfth embodiment, the image pickup apparatus is provided with electronic-zoom speed setting means for varying, if the optical zoom is switched to the electronic zoom, the zoom speed of the electronic-zoom means in accordance with a zoom speed detected by state-of-optical-zoom detecting means, so that the electronic-zoom speed can be varied according to the driving speed of the optical zoom which can be varied in zoom speed.

Accordingly, it is possible to smoothly vary the angle of view during a switching from the optical zoom to the electronic zoom or during a switching from the electronic zoom to the optical zoom.

Figure 60:
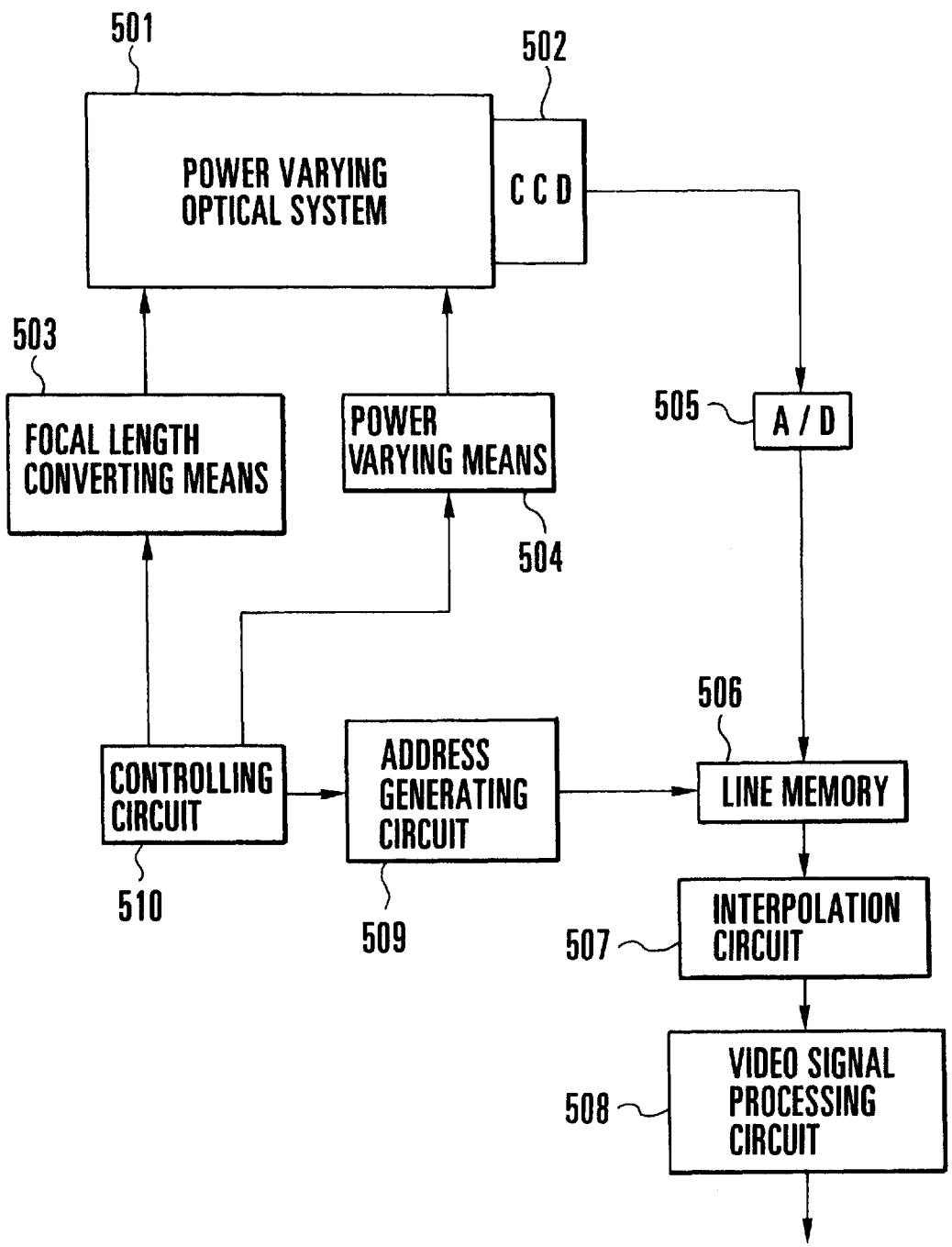
FIG. 60 is a block diagram showing the circuit arrangement and the optical system of a camera having a zoom function according to a thirteenth embodiment of the present invention.

FIG. 60 is a block diagram showing the circuit arrangement and the optical system of a camera having a zoom function according to a thirteenth embodiment of the present invention.

The arrangement shown in FIG. 60 includes a power varying optical system 501 whose focal length is variable, an image sensor 502 such as a CCD, focal-length converting means 503, such as a wide-angle attachment, for discontinuously converting the focal length, power varying means 504 having the function of continuously varying the focal length of the power varying optical system 501, an A/D conversion circuit 505 for converting an analog signal into a digital signal, a line memory 506, an interpolation circuit 507, a video signal processing circuit 508, an address generating circuit 509 for generating a readout address, and a control circuit 510 for controlling the focal-length converting means 503, the power varying means 504, the address generating circuit 509 and other associated elements.

In the above-described arrangement, a signal from the image sensor 502 is converted into a digital signal by the A/D conversion circuit 505, and the digital signal is stored in the line memory 506.

If a portion of an image plane is to be cut out and used in an enlarged state, i.e., if so-called electronic zooming is to be performed, the address generating circuit 509 generates an address information signal for reading out a required area in accordance with a signal outputted from the control circuit 510.

On the basis of the address information, the information memorized in a required portion of the line memory 506 is outputted to the interpolation circuit 507, in which the information is subjected to appropriate interpolation. The output of the interpolation circuit 507 is converted into a video signal by the video signal processing circuit 508, and the video signal is suppled to a recording system (not shown).

Figure 61:
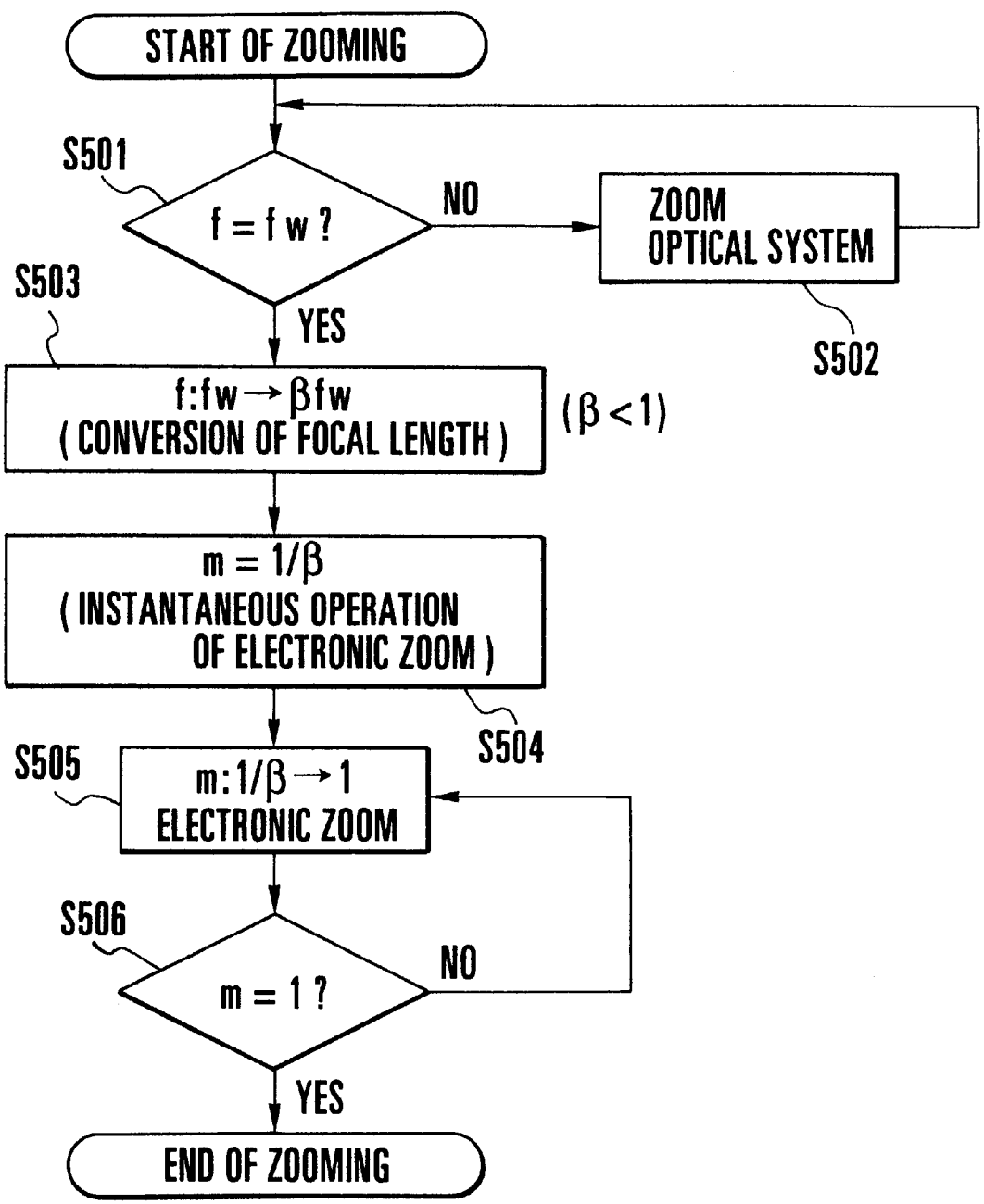
FIG. 61 is a flowchart showing the operation of performing zooming from a telephoto end to a wide-angle side (an ultra-wide-angle end) in the thirteenth embodiment of the present invention.

FIG. 61 is a flowchart showing the operation of the camera during zooming from its telephoto end to its wide-angle side (its ultra-wide-angle end). Such an operation will be described below with reference to the flowchart of FIG. 61.

Ordinary zooming is performed by the power varying means 504 until the power varying optical system 501 reaches the wide-angle end (Steps S501→S502→S501). When the power varying optical system 501 reaches the wide-angle end, the focal length is discontinuously and instantaneously varied from the wide-angle end toward a far wider-angle side (the ultra-wide-angle side) by the focal-length converting means 503 (Step S503). As means for instantaneously varying the focal length, a wide-angle attachment may be inserted before the front face of the power varying optical system 501 or an arrangement for moving a part different from an ordinary power varying part may also be adopted.

In Step S503, if nothing but the above-described processing is done, the angle of view will vary discontinuously.

For this reason, at the same time, the electronic zoom is instantaneously operated so that the angle of view of the electronic zoom is made equal to the angle of view at the wide-angle end (steps S504→S505→S506). Accordingly, it is possible to prevent discontinuity from occurring in the variation of the angle of view during zooming.

In practice, however, since a slight time is required to vary the focal length from the wide-angle end to the ultra-wide-angle end, there is the problem that an image is disturbed during this time. To solve the problem, it is desirable that, during the predetermined time required to vary the focal length, an image obtained before the variation of the focal length be held in a memory and the output of the memory be used as an image representative of the variation of the angle of view.

By performing zooming from the wide-angle end toward the ultra-wide-angle end by means of the electronic zoom, it is possible to vary continuously the angle of view from the wide-angle end to the ultra-wide-angle end.

On the other hand, if zooming from the ultra-wide-angle side to the wide-angle side is to be performed, zooming from the ultra-wide-angle end to the angle of view equivalent to the wide-angle end is performed by using the electronic zoom. When the wide-angle end is reached, the electronic zoom is switched to optical zooming based on the power varying optical system 501 and the electronic zoom is cancelled. Subsequently, the optical zooming toward the telephoto end is performed by the power varying means 504.

As is apparent from the above description, by effectively combining focal length converting means capable of discontinuously varying a focal length with an electronic-zoom function, it is possible to achieve a field-of-view varying effect equivalent to the effect of the variable angle of view of a zoom lens which can optically zoom up to an ultra-wide-angle range. Accordingly, a user can smoothly perform photography even during zooming between the wide-angle end and the ultra-wide-angle side.

Figure 62:
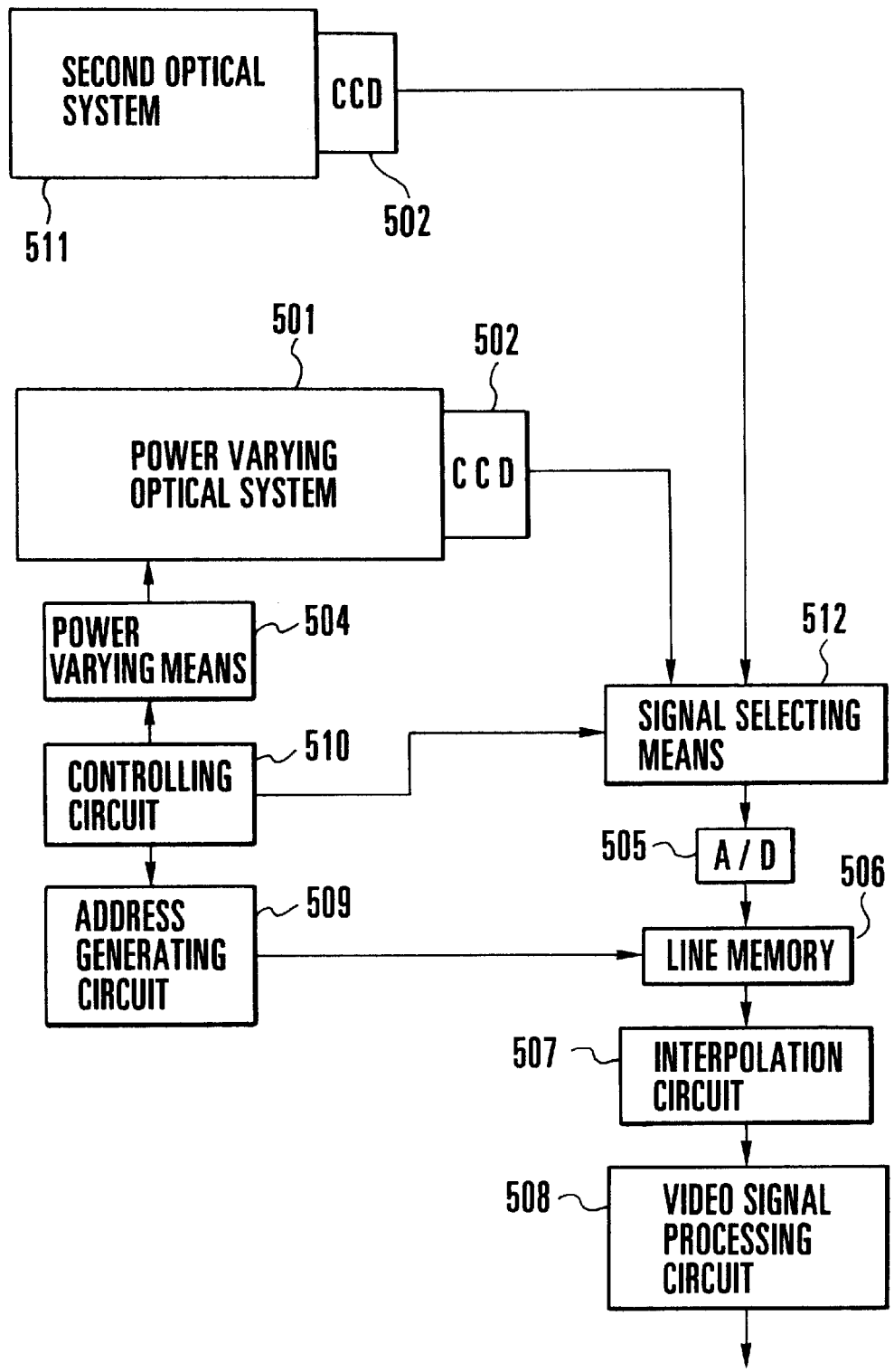
FIG. 62 is a block diagram showing the circuit arrangement and the optical system of a camera having a zoom function according to a fourteenth embodiment of the present invention.

FIG. 62 is a block diagram showing the circuit arrangement and the optical system of a camera having a zoom function according to a fourteenth embodiment of the present invention. In FIG. 62, the same reference numerals are used to denote parts which are identical to those shown in FIG. 60.

The arrangement shown in FIG. 62 includes a second optical system 511 having a focal length shorter than the focal length of the power varying optical system 501 which is set to the wide-angle end, and signal selecting means 512 for selecting either one of the output signals of the two optical systems 501 and 511 as a signal to be processed.

If a user selects zooming from the wide-angle end toward a far wider-angle side during the use of the power varying optical system 501, the output of the second optical system 511 is selected by the signal selecting means 512.

However, this output is not a signal output indicative of the whole of the scene photographed by the second optical system 511, but is a signal output which has been electronically zoomed up to a size which is equivalent to the size of a video image which is provided by the power varying optical system 501 at the wide-angle end thereof.

If zooming toward a far wider-angle side is be performed, the power of the electronic zoom may be progressively decreased.

On the other hand, if zooming from the ultra-wide-angle side toward the telephoto side is to be performed, the electronic zoom is used to perform zooming from the ultra-wide-angle side up to an angle of view equivalent to that of the second optical system 511 at the wide-angle end. When the angle of view equivalent to that of the second optical system 511 at the wide-angle end is reached, the electronic zoom is switched to the power varying optical system 501 so that optical zooming up to the telephoto end can be continuously performed by the power varying means 504.

As is apparent from the above description, by effectively combining two optical systems having discontinuously different focal lengths with an electronic-zoom function, it is possible to continuously vary the angle of view between the ultra-wide-angle side and the telephoto side. Accordingly, the user can smoothly perform photography even during zooming between the wide-angle end and the ultra-wide-angle side.

Of course, it is also possible to adopt an arrangement capable of performing zooming from the telephoto end toward an ultra-telephoto side by means of the electronic zoom.

It is to be noted that, in the above-described fourteenth embodiments, it is necessary to satisfy the following expression:

$$1/\beta \leq z \qquad (11)$$

where $\beta(<1)$ represents the ratio of the focal length of the power varying optical system 501 at the wide-angle end thereof to the focal length of the second optical system 511 at the wide-angle end thereof or the magnification required for conversion between the focal lengths of the two optical systems 501 and 511, and $Z(>1)$ represents the power of the electronic zoom.

If the power of the electronic zoom is smaller than the lower limit of the expression (11), it is impossible to continuously vary the angle of view even with the electronic zoom.

As is apparent from the above description, according to the thirteenth embodiment, there is provided an arrangement which is provided with control means for causing, if zooming from the wide-angle end of a power varying optical system toward a far wider-angle side is specified, focal length varying means to function to set a focal length to an ultra-wide-angle side and, at the same time, causing electronic-zoom means to operate to vary the power of an electronic zoom continuously up to the ultra-wide-angle side in the state of keeping the size of an output image equal to that of an image obtainable from the power varying optical system. The electronic-zoom means is combined with means for varying discontinuously and instantaneously the focal length from the wide-angle end toward a far wider-angle side (ultra-wide-angle side), so that zooming between a telephoto end and the ultra-wide-angle side can be continuously performed.

According to the fourteenth embodiment, there is provided an arrangement which is provided with control means for selecting, if zooming toward a far wider-angle side from the wide-angle end of a first optical system having a power varying function is specified, an image obtained from a second optical system having a focal length shorter than the focal length of the first optical system at the wide-angle end thereof and, at the same time, causing electronic-zoom means to operate to vary the power of an electronic zoom continuously up to the ultra-wide-angle side in the state of keeping the size of an output image equal to that of an image obtainable from the first optical system. The electronic-zoom means is combined with a second optical system having a focal length shorter than the focal length of the first optical system at the wide-angle end thereof, so that zooming between a telephoto end and the ultra-wide-angle side can be continuously performed.

Accordingly, it is possible to continuously vary the angle of view between the wide-angle end and the ultra-wide-angle side, so that the user can smoothly perform photography even during zooming between the wide-angle end and the ultra-wide-angle side.

What is claimed is:

1. An image pickup apparatus comprising:

an image pickup device for generating an electrical signal from an optical image formed by a zoom lens;

aberration information memorizing means for memorizing distortional aberration information about the zoom lens;

focal length detection means for detecting a focal length of the zoom lens; and signal processing means for processing the electrical signal based on the distortional aberration information and the focal length so as to correct distortional aberration based on a center of an image plane when the zoom lens is in a predetermined focal length zone, and to correct the distortional aberration based on an arbitrary image height when the zoom lens is not in the predetermined focal length zone.

* * * * *

UNITED STATES PATENT AND TRADEMARK OFFICE
CERTIFICATE OF CORRECTION

PATENT NO. : 5,905,530

DATED : May 18, 1999

INVENTOR(S) : Hideo YOKOTA, et al.

It is certified that error appears in the above-identified patent and that said Letters Patent is hereby corrected as shown below:

COLUMN 6:

Line 10, "an" (first occurrence) should read --a--.

COLUMN 12:

Line 21, "a" should read --an--.

COLUMN 13:

Line 27, "zmin" should read --Zmin--.
Line 28, "the the" should read --the--.

COLUMN 19:

Line 35, "is" should read --are--.

COLUMN 26:

Line 57, "[step S241]" should read --[Step S241]--.

UNITED STATES PATENT AND TRADEMARK OFFICE
CERTIFICATE OF CORRECTION

PATENT NO. : 5,905,530

DATED : May 18, 1999

INVENTOR(S) : Hideo YOKOTA, et al.

Page 2 of 2

It is certified that error appears in the above-identified patent and that said Letters Patent is hereby corrected as shown below:

<u>COLUMN 33</u>:

Line 45, "an" should read --a--.

Signed and Sealed this

Sixth Day of February, 2001

Attest:

Q. TODD DICKINSON

Attesting Officer

Director of Patents and Trademarks